(12) United States Patent
Jon et al.

(10) Patent No.: US 10,783,320 B2
(45) Date of Patent: Sep. 22, 2020

(54) DEVICE, METHOD, AND GRAPHICAL USER INTERFACE FOR EDITING SCREENSHOT IMAGES

(71) Applicant: Apple Inc., Cupertino, CA (US)

(72) Inventors: Tiffany S. Jon, Cupertino, CA (US); Chanaka G. Karunamuni, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/978,115

(22) Filed: May 12, 2018

(65) Prior Publication Data

US 2019/0147026 A1 May 16, 2019

Related U.S. Application Data

(60) Provisional application No. 62/506,682, filed on May 16, 2017.

(51) Int. Cl.
  *G06F 17/00*   (2019.01)
  *G06F 40/169*  (2020.01)
  *G06T 11/60*   (2006.01)
  *G06T 7/11*    (2017.01)
  (Continued)

(52) U.S. Cl.
  CPC ........ *G06F 40/169* (2020.01); *G06F 3/04845* (2013.01); *G06F 40/171* (2020.01); *G06T 7/11* (2017.01); *G06T 11/60* (2013.01); *G06T 2207/20132* (2013.01)

(58) Field of Classification Search
  CPC .. G06F 17/241; G06F 17/242; G06F 3/04845; G06F 40/169; G06F 3/0486; G06F 3/04886; G06F 3/04883; G06F 3/0483; G06F 3/0482; G06F 40/171; G06T 7/11; G06T 2207/20132; G06T 11/60
  See application file for complete search history.

(56) References Cited

U.S. PATENT DOCUMENTS

| 7,454,711 | B2 * | 11/2008 | Angiulo | G06F 16/958 715/760 |
| 7,752,575 | B2 * | 7/2010 | Anglin | G06F 16/957 715/853 |

(Continued)

OTHER PUBLICATIONS

"Screenshot Crop & Share", Android Apps on Google Play, Mar. 26, 2017, pp. 1-3.

(Continued)

*Primary Examiner* — Laurie A Ries
(74) *Attorney, Agent, or Firm* — Fernando & Partners, LLP

(57) ABSTRACT

An electronic device: while displaying content, detect a screenshot capture input; and, in response to detecting the screenshot capture input: capture a screenshot image of the displayed content; and display a thumbnail representation of the screenshot image overlaid on the displayed content. The electronic device also: detects a respective input directed to the thumbnail representation of the screenshot image; and, in response to detecting the respective input, and in accordance with a determination that the respective input corresponds to a selection input, displays a screenshot editing interface provided to edit the screenshot image, where the screenshot editing interface includes the screenshot image.

20 Claims, 57 Drawing Sheets

(51) Int. Cl.
*G06F 3/0484* (2013.01)
*G06F 40/171* (2020.01)

(56) References Cited

U.S. PATENT DOCUMENTS

| | | | | |
|---|---|---|---|---|
| 8,701,002 | B2* | 4/2014 | Grossman | G06F 17/2288 |
| | | | | 715/704 |
| 8,984,390 | B2* | 3/2015 | Aymeloglu | G06F 21/62 |
| | | | | 715/207 |
| 9,063,638 | B1* | 6/2015 | Schrock | G06F 3/0484 |
| 9,811,250 | B2* | 11/2017 | Louch | G06F 3/04842 |
| 10,061,756 | B2* | 8/2018 | Gunawardena | G06F 16/48 |
| 10,572,135 | B1* | 2/2020 | Fieldman | G06Q 10/107 |
| 2006/0053365 | A1* | 3/2006 | Hollander | G06F 16/954 |
| | | | | 715/201 |
| 2007/0118794 | A1* | 5/2007 | Hollander | G06F 40/169 |
| | | | | 715/205 |
| 2007/0283277 | A1* | 12/2007 | Hayakawa | G06F 3/0481 |
| | | | | 715/748 |
| 2009/0164606 | A1* | 6/2009 | Epifania | G06F 16/957 |
| | | | | 709/219 |
| 2010/0070842 | A1* | 3/2010 | Aymeloglu | G06F 17/2288 |
| | | | | 715/207 |
| 2011/0163971 | A1* | 7/2011 | Wagner | G06F 3/04817 |
| | | | | 345/173 |
| 2012/0079429 | A1* | 3/2012 | Stathacopoulos | H04N 21/4826 |
| | | | | 715/830 |
| 2012/0144283 | A1* | 6/2012 | Hill | G06F 40/169 |
| | | | | 715/211 |
| 2012/0198386 | A1* | 8/2012 | Hautala | G06F 3/0481 |
| | | | | 715/838 |
| 2012/0271657 | A1* | 10/2012 | Anderson | G06F 17/243 |
| | | | | 705/4 |
| 2013/0093786 | A1* | 4/2013 | Tanabe | H04N 5/76 |
| | | | | 345/619 |
| 2013/0212534 | A1* | 8/2013 | Knight | G06F 3/04817 |
| | | | | 715/838 |
| 2014/0189576 | A1* | 7/2014 | Carmi | G06F 3/0481 |
| | | | | 715/781 |
| 2014/0229426 | A1* | 8/2014 | Gootee, III | G06F 30/13 |
| | | | | 707/608 |
| 2014/0358919 | A1* | 12/2014 | Chandra | G06F 16/285 |
| | | | | 707/737 |
| 2015/0128017 | A1* | 5/2015 | Fithian | G06F 17/2235 |
| | | | | 715/205 |
| 2015/0277571 | A1* | 10/2015 | Landau | G06F 3/04842 |
| | | | | 715/863 |
| 2015/0278180 | A1* | 10/2015 | Nicholas, Jr. | G06F 17/241 |
| | | | | 715/230 |
| 2016/0344972 | A1* | 11/2016 | Missig | H04N 5/772 |
| 2017/0034244 | A1* | 2/2017 | Eschbach | H04L 67/06 |
| 2017/0132742 | A1* | 5/2017 | Deluca | G06T 1/0021 |
| 2017/0223268 | A1* | 8/2017 | Shimmoto | H04N 5/23238 |
| 2017/0277625 | A1* | 9/2017 | Shtuchkin | G06F 11/3688 |
| 2017/0364246 | A1* | 12/2017 | Van Os | G06F 3/0482 |
| 2018/0088764 | A1* | 3/2018 | Lu | G06F 3/04842 |
| 2018/0129657 | A1* | 5/2018 | Guest | G06F 3/04842 |

OTHER PUBLICATIONS

Huber, "Screenshot Crop & Share", Retrieved from Internet on Apr. 24, 2017, 3 pages.

* cited by examiner

```
┌─────────────────────────────────────────────────────────────────┐
│ Prior to detecting the respective input directed to the thumbnail representation of   ├─734
│ the screenshot image, detect, via the one or more input devices, a subsequent          │
│ screenshot capture input; and                                                          │
│                                                                                        │
│ In response to detecting the subsequent screenshot capture input:                      │
│     Capture a second screenshot image of content displayed on the display; and         │
│     Display, on the display, a group of thumbnail representations that represents      │
│ a first thumbnail representation corresponding to the screenshot image and the         │
│ second thumbnail representation corresponding to the second screenshot image           │
│   ┌─────────────────────────────────────────────────────────────┐                     │
│   │     The respective input is directed to the group of thumbnail   ├─736            │
│   │ representations, and                                              │                │
│   │     The screenshot editing interface includes the second screenshot image │        │
│   └─────────────────────────────────────────────────────────────┘                     │
│   ┌─────────────────────────────────────────────────────────────┐                     │
│   │     Detect, via the one or more input devices, a navigation input that  ├─738     │
│   │ corresponds to navigating among screenshot images in the screenshot       │         │
│   │ editing interface; and                                                    │         │
│   │     In response to detecting the navigation input, update the screenshot │          │
│   │ editing interface by displaying the screenshot image                      │         │
│   └─────────────────────────────────────────────────────────────┘                     │
└─────────────────────────────────────────────────────────────────┘
```

```
┌─────────────────────────────────────────────────────────────────┐
│     The content is displayed within an application window, and                 ├─740
│     Detect, via the one or more input devices, a sequence of inputs that        │
│ corresponds to dragging and dropping the thumbnail representation into the      │
│ application window; and                                                         │
│     In response to detecting the sequence of user inputs, displaying the       │
│ screenshot image within the application window                                  │
└─────────────────────────────────────────────────────────────────┘
```

```
┌─────────────────────────────────────────────────────────────────┐
│     The content includes a first content sub-portion displayed within a first region  ├─742
│ associated with a first application and a second content sub-portion displayed         │
│ within a second region associated with a second application, and                       │
│     Detect, via the one or more input devices, a sequence of inputs that               │
│ corresponds to dragging and dropping the thumbnail representation into the first       │
│ region; and                                                                            │
│     In response to detecting the sequence of user inputs, display the screenshot       │
│ image within the first region                                                          │
└─────────────────────────────────────────────────────────────────┘
```

Figure 7D

```
┌─────────────────────────────────────────────────────────────────────┐
│  In response to detecting the respective input directed to the thumbnail    │──744
│  representation of the screenshot image, and in accordance with a determination │
│  that the respective input corresponds to a request to cease to display the thumbnail │
│  representation, cease to display the thumbnail representation of the screenshot │
│  image overlaid on the content displayed on the display                     │
└─────────────────────────────────────────────────────────────────────┘
```

```
┌─────────────────────────────────────────────────────────────────────┐
│  After handling the screenshot image, detect, via the one or more input devices, a │──746
│  subsequent screenshot capture input; and                                   │
│                                                                             │
│  In response to detecting the subsequent screenshot capture input:          │
│      Capture a second screenshot image of the content displayed on the display; │
│  and                                                                        │
│      Display, on the display, a second thumbnail representation of the second │
│  screenshot image overlaid on the content displayed on the display and captured │
│  within the screenshot image;                                               │
│      In accordance with a determination that the timeout period has expired,│
│  cease to display the second thumbnail representation of the second screenshot │
│  image overlaid on the content displayed on the display                     │
└─────────────────────────────────────────────────────────────────────┘
```

Figure 7E

DEVICE, METHOD, AND GRAPHICAL USER INTERFACE FOR EDITING SCREENSHOT IMAGES

RELATED APPLICATION

This application claims priority to U.S. Provisional Patent Application No. 62/506,682, filed on May 16, 2017, entitled "Device, Method, and Graphical User Interface for Editing Screenshot Images," the entire contents of which are incorporated herein by reference.

TECHNICAL FIELD

This relates generally to electronic devices with touch-sensitive surfaces, including but not limited to electronic devices with touch-sensitive surfaces that enable screenshot image editing.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interface objects on a display.

Example manipulations include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for editing screenshot images. Such methods and interfaces optionally complement or replace conventional methods for editing screenshot images. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at a device with one or more processors, non-transitory memory, a display, and one or more input devices. The method includes: while displaying content on the display, detecting, via the one or more input devices, a screenshot capture input; and, in response to detecting the screenshot capture input: capturing a screenshot image of the content displayed on the display; and displaying, on the display, a thumbnail representation of the screenshot image overlaid on the content displayed on the display and captured within the screenshot image. The method also includes: detecting, via the one or more input devices, a respective input directed to the thumbnail representation of the screenshot image; and, in response to detecting the respective input directed to the thumbnail representation of the screenshot image, and in accordance with a determination that the respective input corresponds to a selection input, displaying, on the display, a screenshot editing interface provided to edit the screenshot image, where the screenshot editing interface includes the screenshot image.

In accordance with some embodiments, a method is performed at a device with one or more processors, non-transitory memory, a display, and one or more input devices. The method includes: displaying, on the display, a first sub-portion of content within an application interface; while displaying the first sub-portion of the content, detecting, via the one or more input devices, a screenshot capture input; and, in response to detecting the screenshot capture input: capturing a screenshot image of the first sub-portion of the content within the application interface; and displaying, on the display, a screenshot editing interface provided to edit the screenshot image, where the screenshot editing interface includes the screenshot image of the first sub-portion of the content within an image area and one or more expansion affordances provided to expand the screenshot image in a corresponding direction. The method also includes: while displaying the screenshot editing interface, detecting, via the one or more input devices, an expansion input that corresponds to expanding the screenshot image in one or more dimensions; and, in response to detecting the expansion input, modifying the screenshot image by displaying a second sub-portion of the content within the image area in addition to the first sub-portion of the content, where the second sub-portion of the content was not displayed within the application interface before detecting the screenshot capture input.

In accordance with some embodiments, an electronic device includes a display, one or more input devices, one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of an electronic device with a display and one or more input devices, cause the device to perform or cause performance of the operations of any of the methods described herein. In accordance with some embodiments, a graphical user interface on an electronic device with a display, one or more input devices, a non-transitory memory, and one or more processors configured to execute one or more programs stored in the non-transitory memory, including one or more of the elements displayed in any of the methods described above, which are updated in response to inputs, as described in any of the methods described herein. In accordance with some embodiments, an electronic device includes: a display, one or more input devices; and means for performing or causing performance of the operations of any of the methods described herein. In accordance with some embodiments, an information processing apparatus, for use in an electronic device with a display and one or more input devices, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for editing screenshot images, thereby increasing the effectiveness, efficiency, and user satisfaction with such devices. Such methods and interfaces may complement or replace conventional methods for editing screenshot images.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7E illustrate a flow diagram of a method of editing a screenshot image interface in accordance with some embodiments.

DESCRIPTION OF EMBODIMENTS

Typically, performing a screenshot operation is an unintuitive, non-user-friendly experience. Furthermore, screenshot images are typically saved to a background clipboard unbeknownst to an unsophisticated user. Accordingly, in embodiments described below, after performing a screenshot capture input, a thumbnail representation of the screenshot image is displayed over the current application interface in order to provide a visual cue indicating that the screenshot capture input was successful. Additionally, in embodiments described below, a screenshot editing interface is displayed in order to provide a seamless user experience that requires less time and user inputs when modifying screenshot images. This also reduces power usage and improves battery life of the device by enabling the user to use the device more quickly and efficiently.

Saving and/or sharing a lengthy text message thread or a web page that spans multiple scroll operations can be a cumbersome experience. Accordingly, in embodiments described below, after performing a screenshot capture input, the screenshot editing interface provides a seamless and intuitive user experience that requires less time and user inputs when expanding screenshot images. This also reduces power usage and improves battery life of the device by enabling the user to use the device more quickly and efficiently.

Figure 8A:
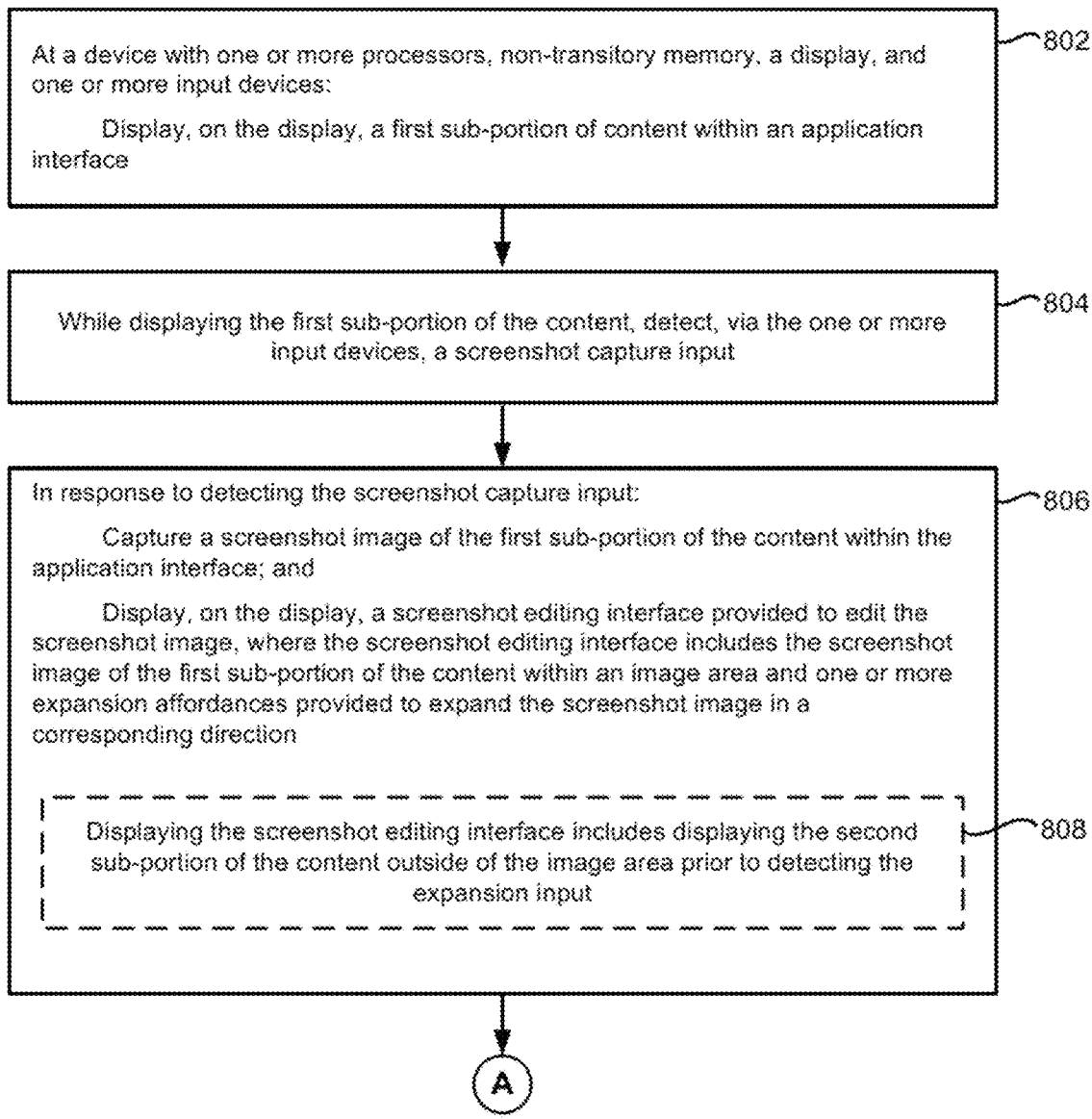
FIGS. 8A-8C illustrate a flow diagram of a method of expanding a screenshot image within a screenshot editing interface in accordance with some embodiments.
Figure 8B:
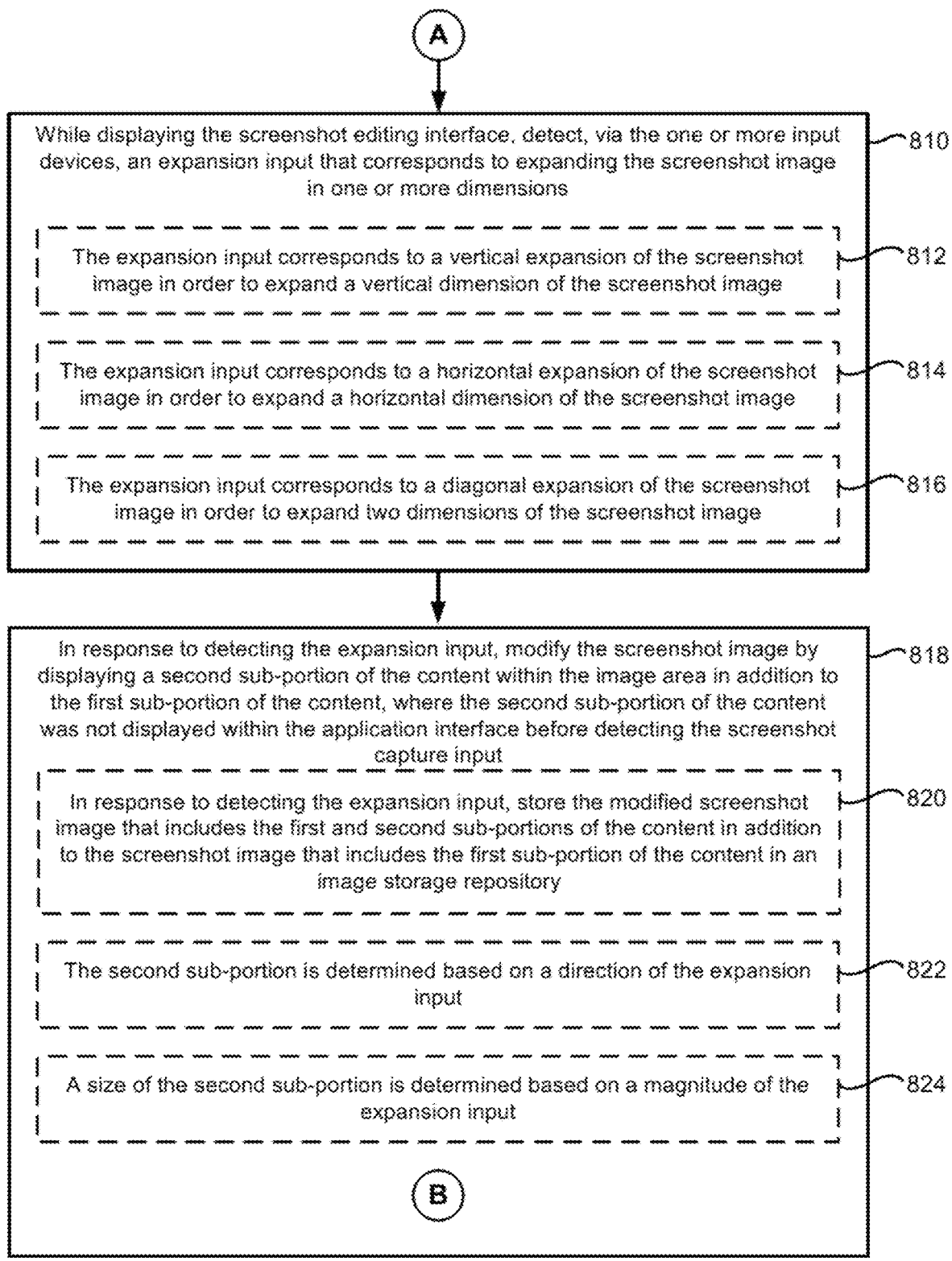
Figure 8C:
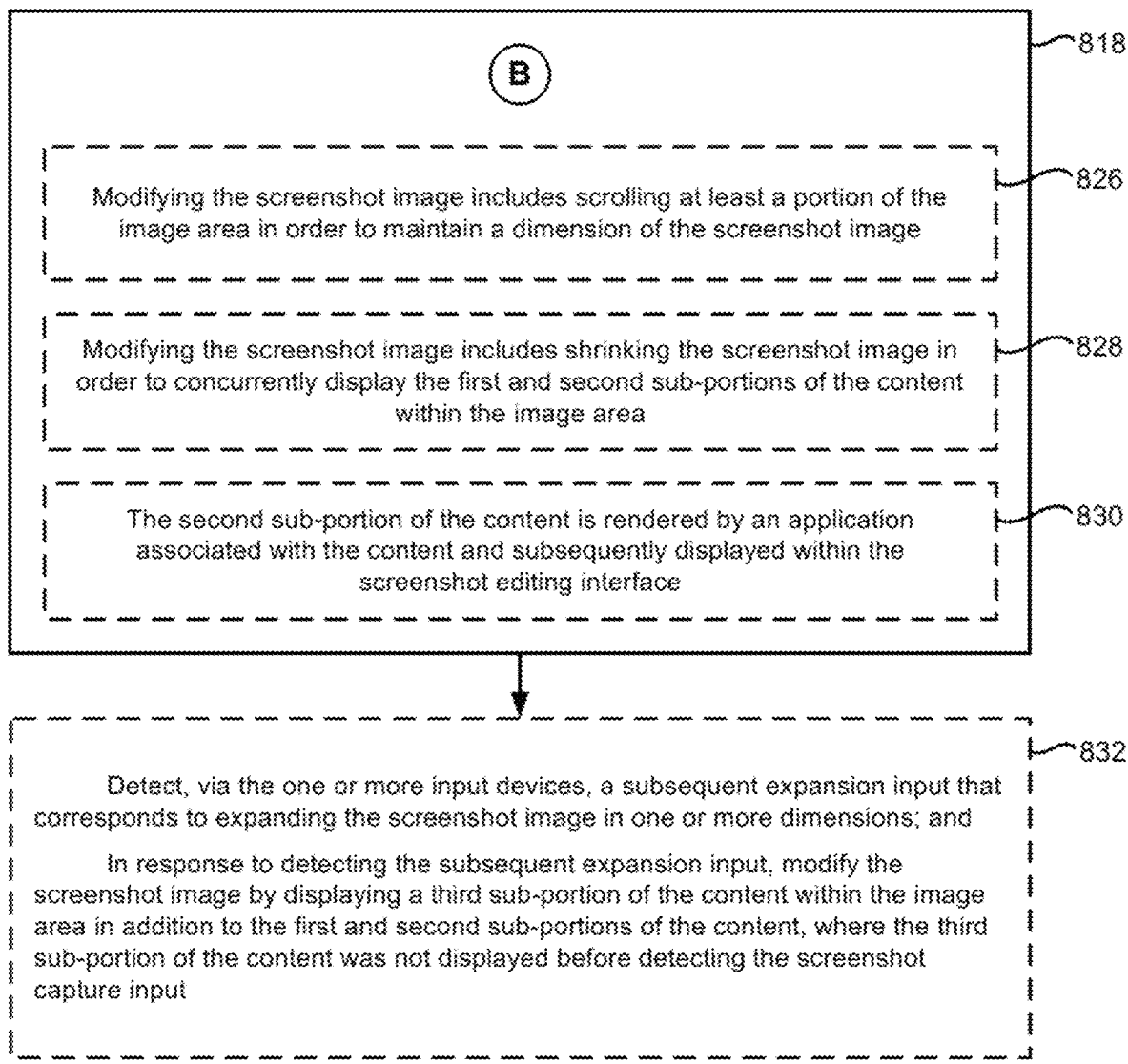

Below, FIGS. 1A-1B, 2-3, and 4A-4B provide a description of example devices. FIGS. 7A-7E illustrate a flow diagram of a method of editing a screenshot image. The user interfaces in FIGS. 5A-5CC are used to illustrate the process in FIGS. 7A-7E. FIGS. 8A-8C illustrate a flow diagram of a method of expanding a screenshot image. The user interfaces in FIGS. 6A-6N are used to illustrate the process in FIGS. 8A-8C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
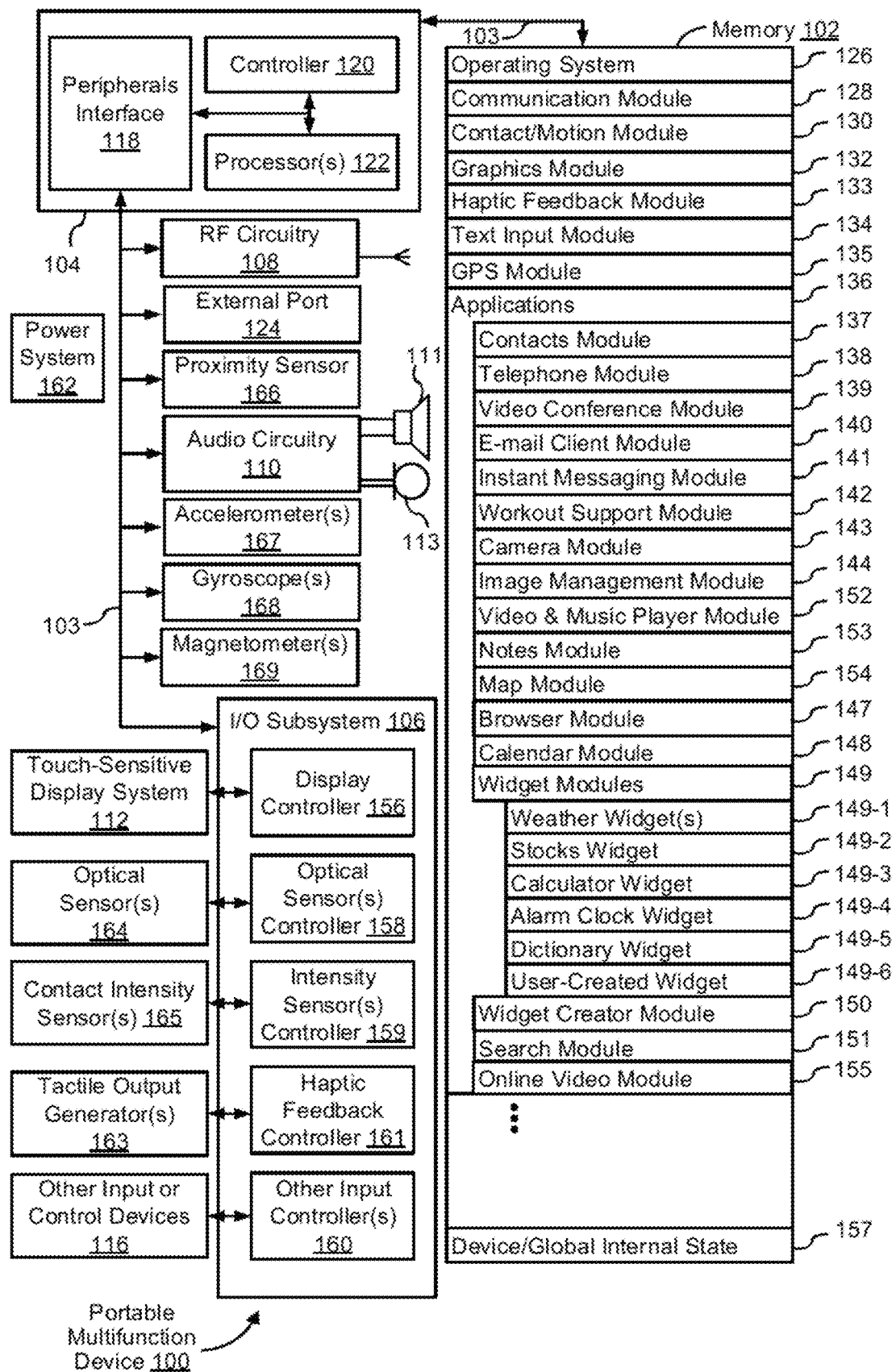
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

Figure 3:
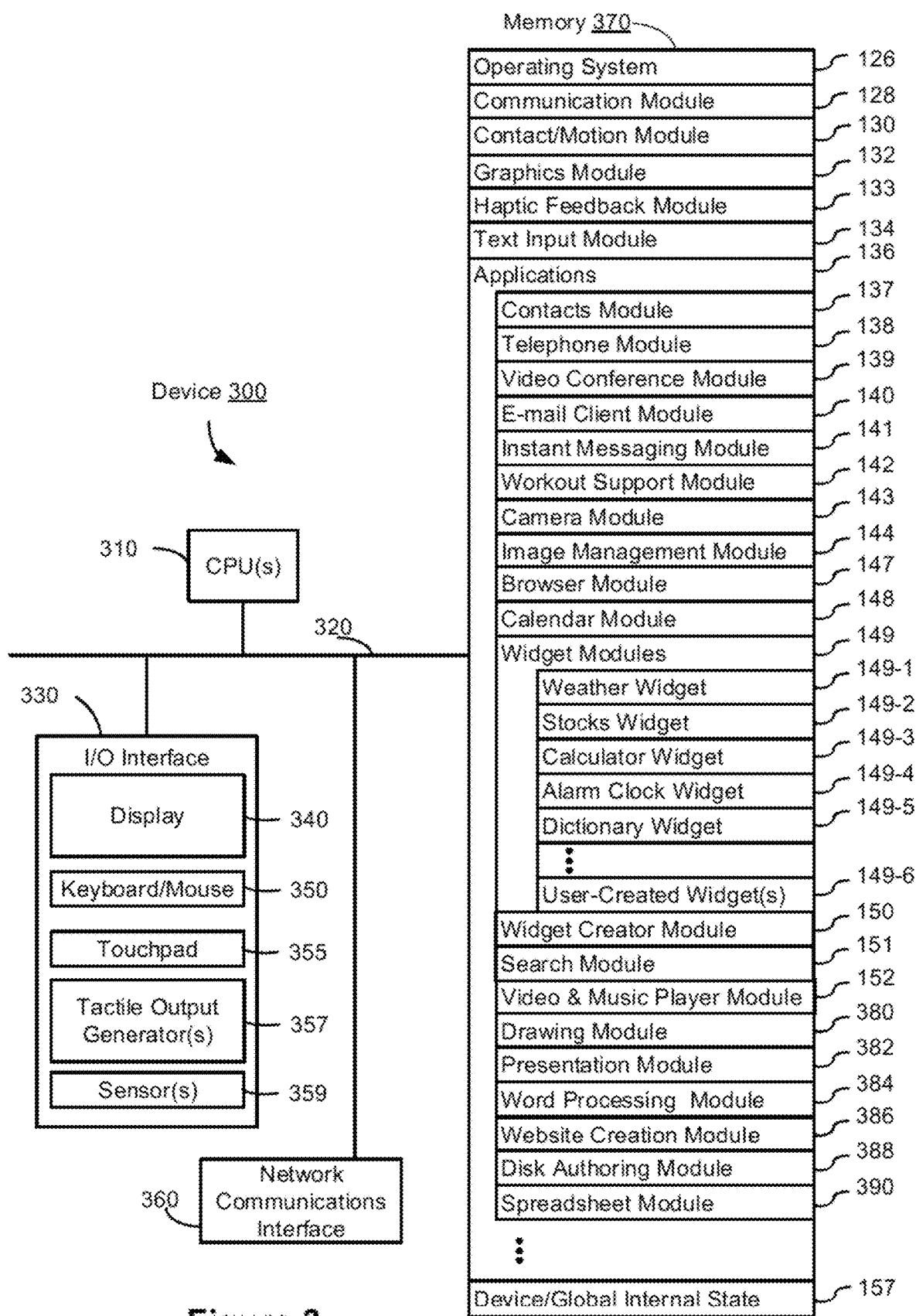
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 163 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
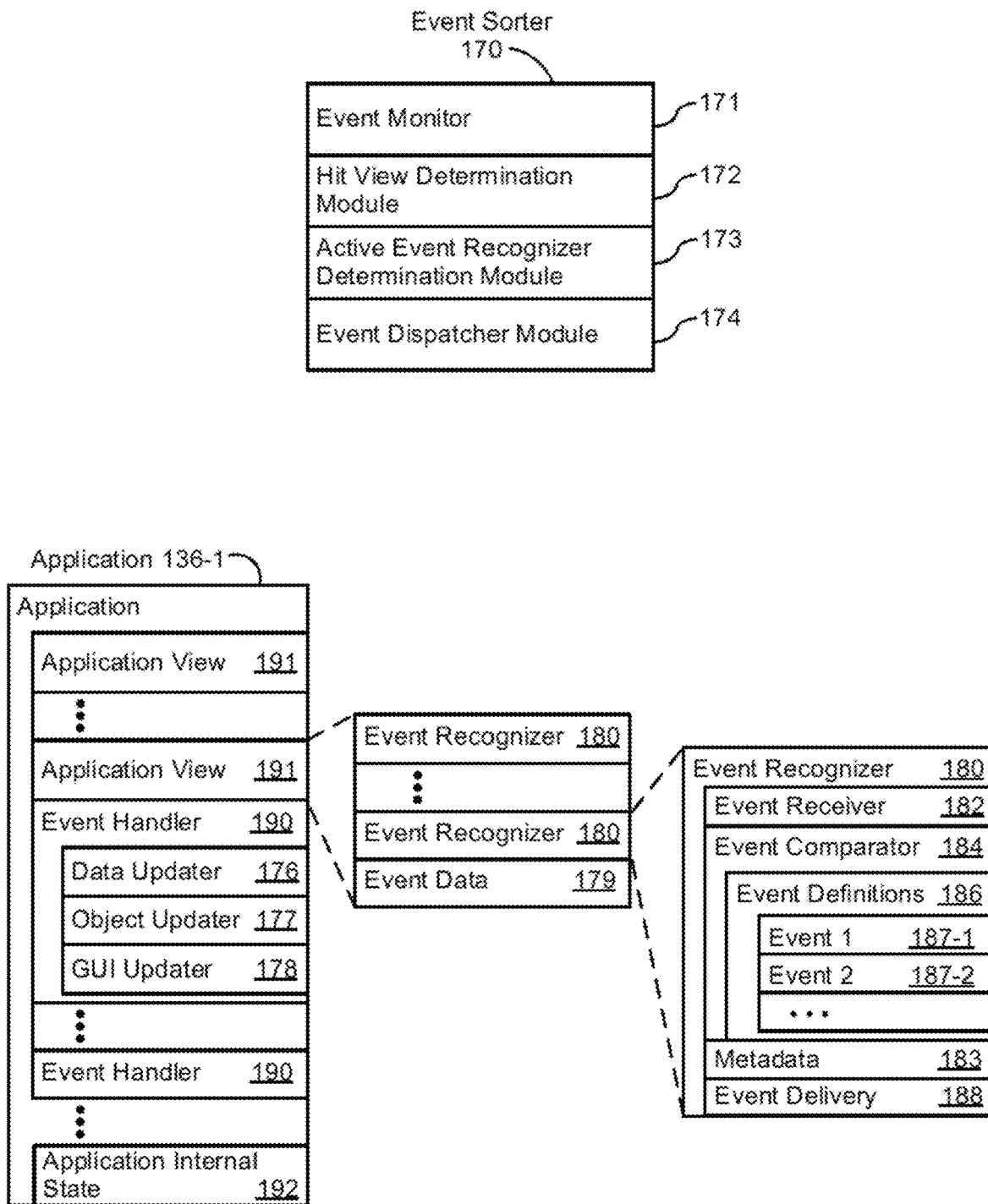
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In some embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in a respective event, such as event 1 (187-1) or event 2 (187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, the event definition of a respective event, such as event 1 (187-1) or event 2 (187-2), includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event, such as event 1 (187-1) or event 2 (187-2) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
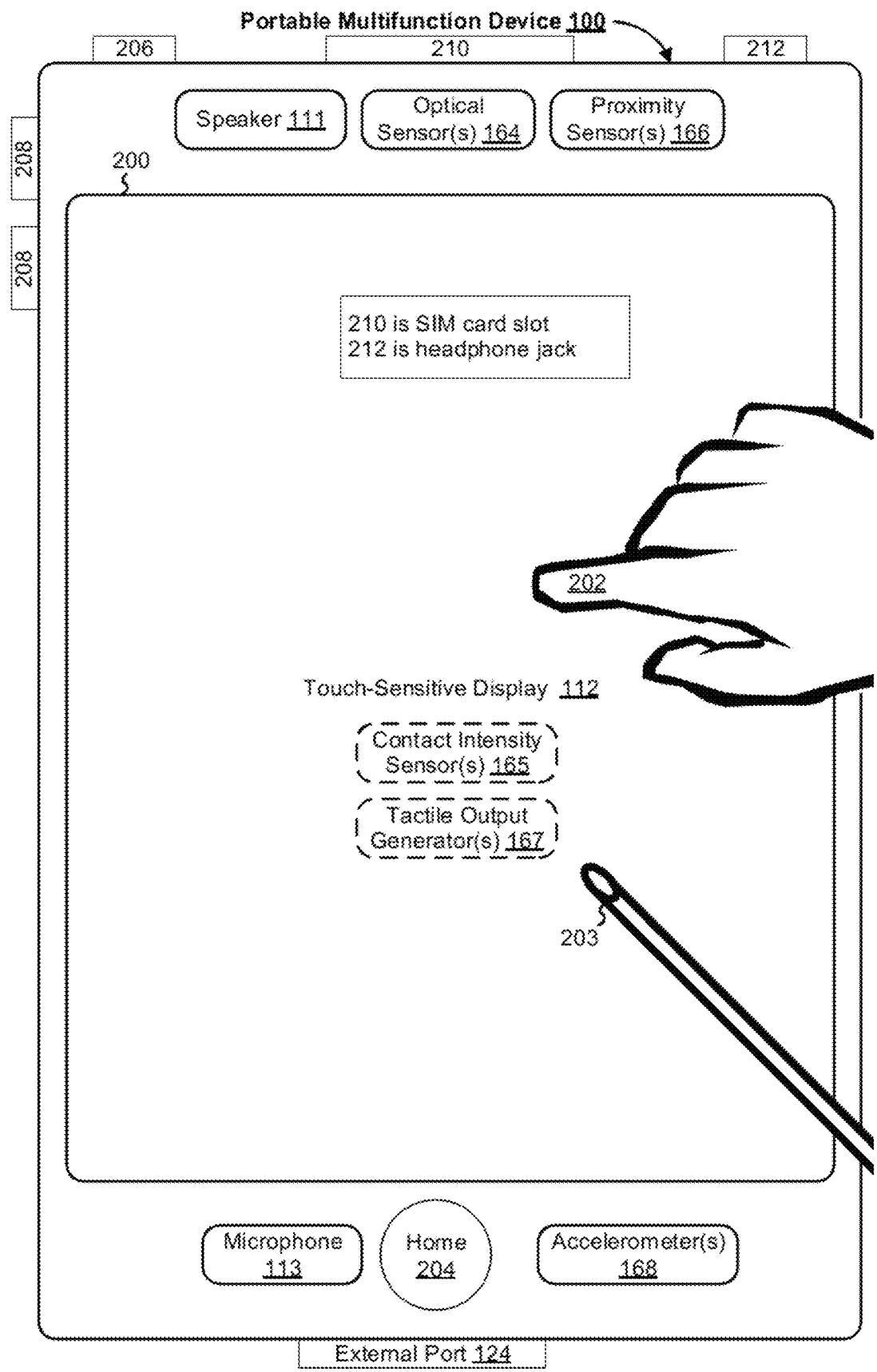
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
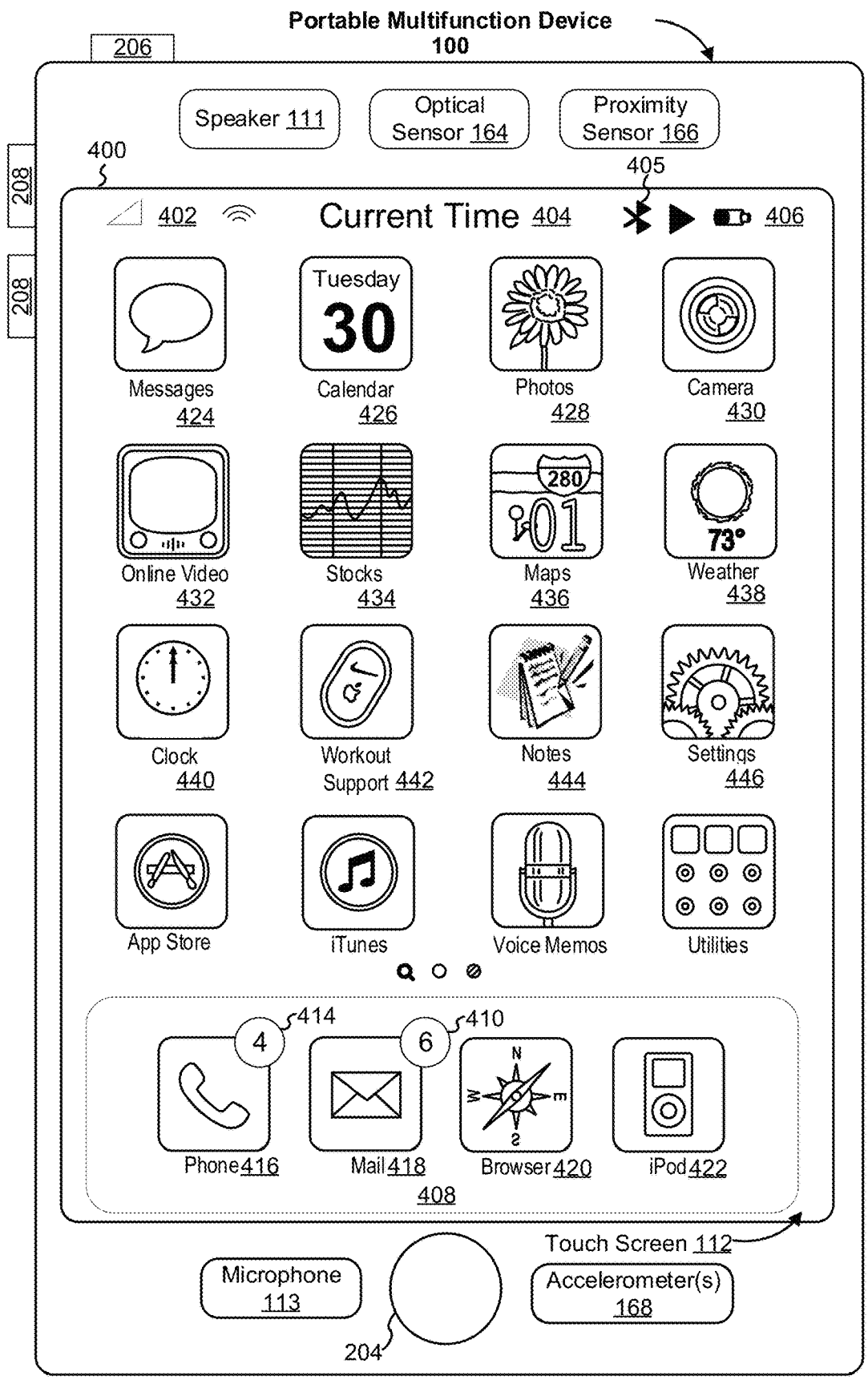
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser"; and

Icon 422 for video and music player module 152, also referred to as iPod (trademark of Apple Inc.) module 152, labeled "iPod"; and Icons for other applications, such as:

Icon 424 for IM module 141, labeled "Text";

Icon 426 for calendar module 148, labeled "Calendar";

Icon 428 for image management module 144, labeled "Photos";

Icon 430 for camera module 143, labeled "Camera";

Icon 432 for online video module 155, labeled "Online Video";

Icon 434 for stocks widget 149-2, labeled "Stocks";

Icon 436 for map module 154, labeled "Map";

Icon 438 for weather widget 149-1, labeled "Weather";

Icon 440 for alarm clock widget 169-6, labeled "Clock";

Icon 442 for workout support module 142, labeled "Workout Support";

Icon 444 for notes module 153, labeled "Notes"; and

Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
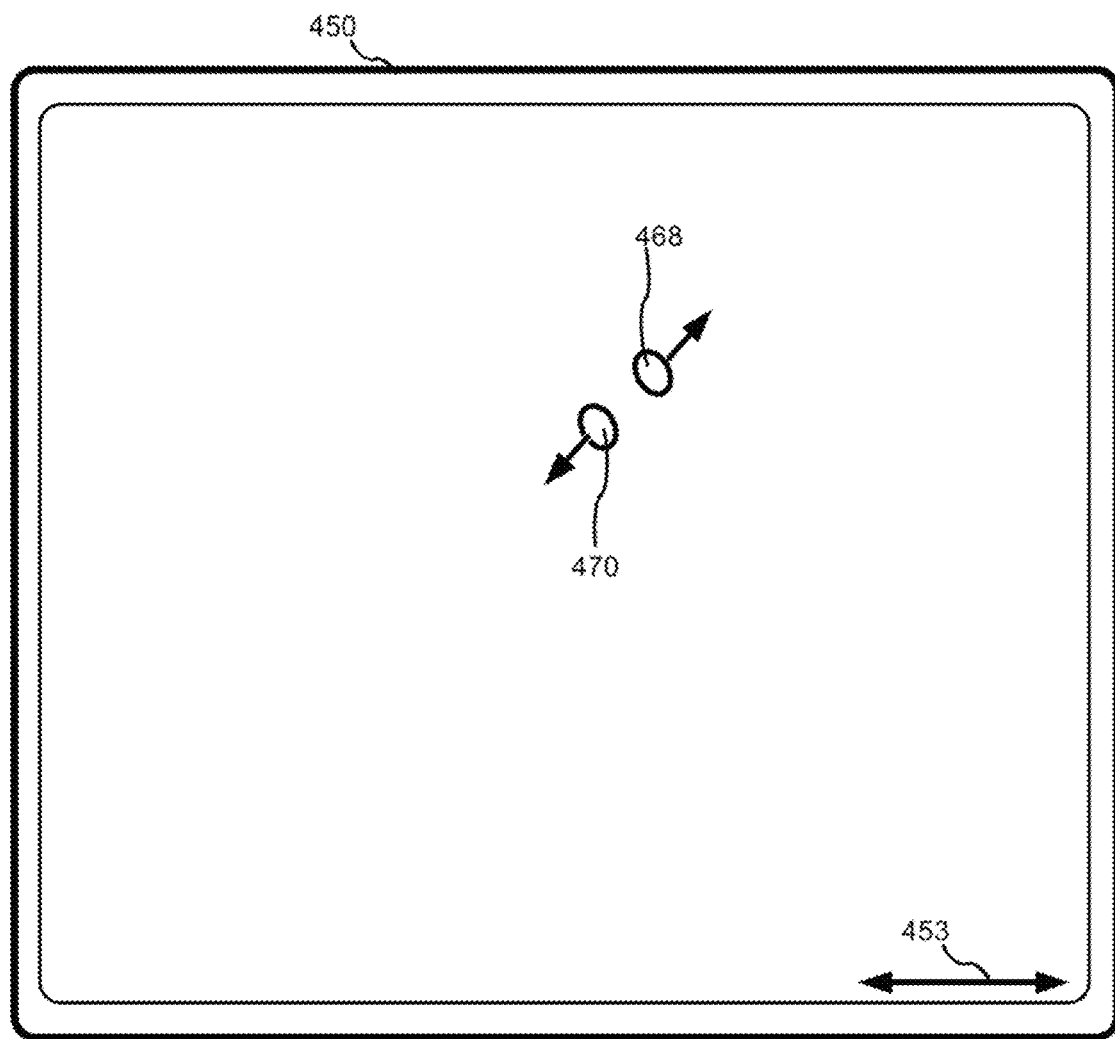
FIG. 4B illustrates an example user interface for a multifunction device with a touch-sensitive surface that is separate from the display in accordance with some embodiments.
Figure 4B:
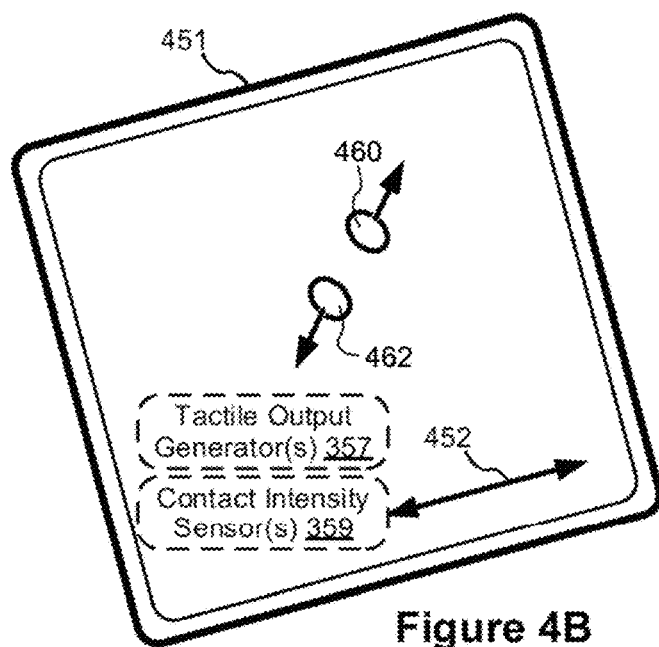

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 359 for generating tactile outputs for a user of device 300.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed toward embodiments of user interfaces ("UI") and associated processes that may be implemented on an electronic device, such as a portable multifunction device (PMD) 100 with a display, a touch-sensitive surface, and optionally one or more sensors to detect intensity of contacts with the touch-sensitive surface, or a device 300 with one or more processors, non-transitory memory, a display, and one or more input devices.

Figure 5A:
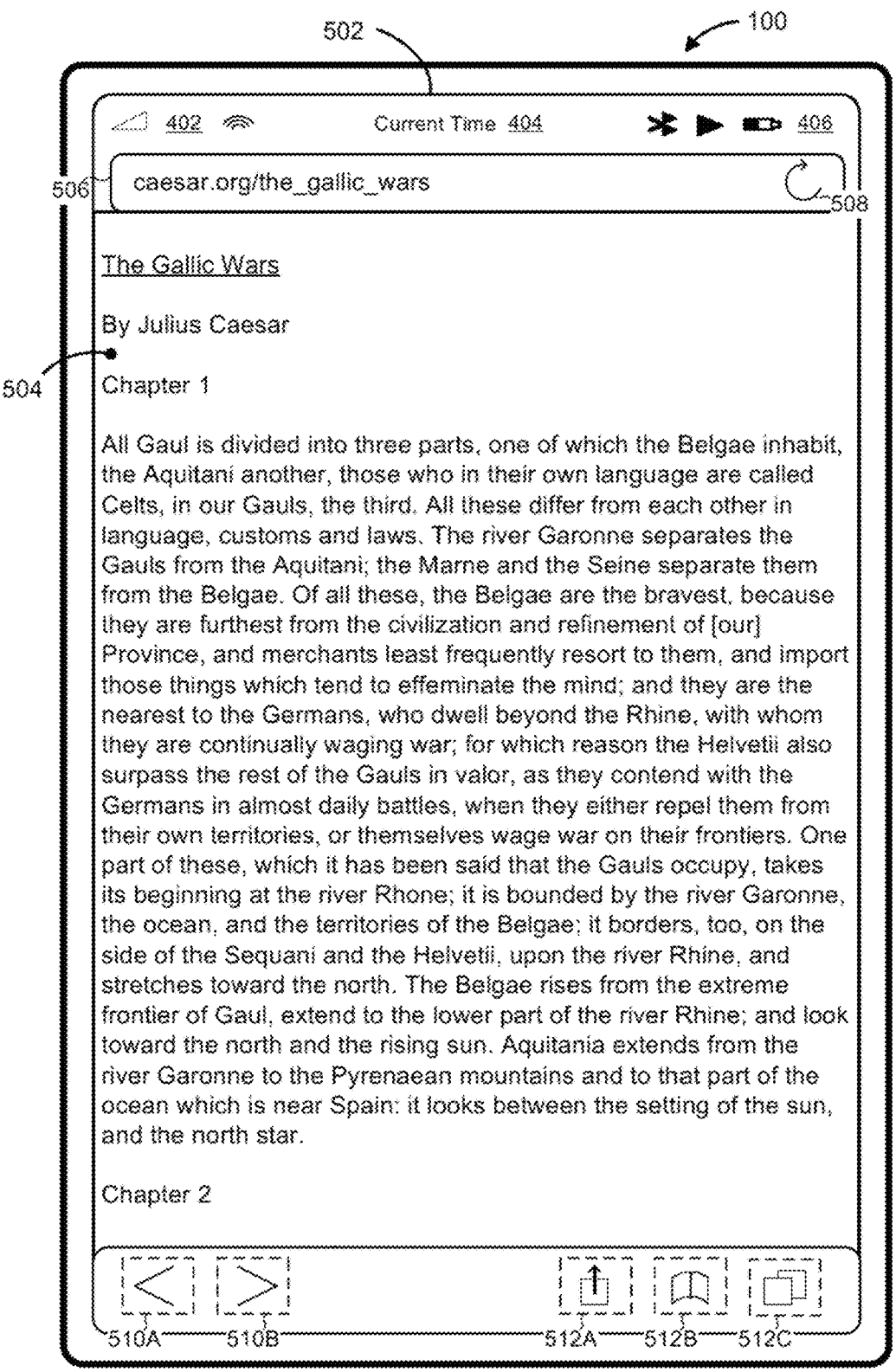
FIGS. 5A-5CC illustrate example user interfaces for editing a screenshot image in accordance with some embodiments.
Figure 5B:
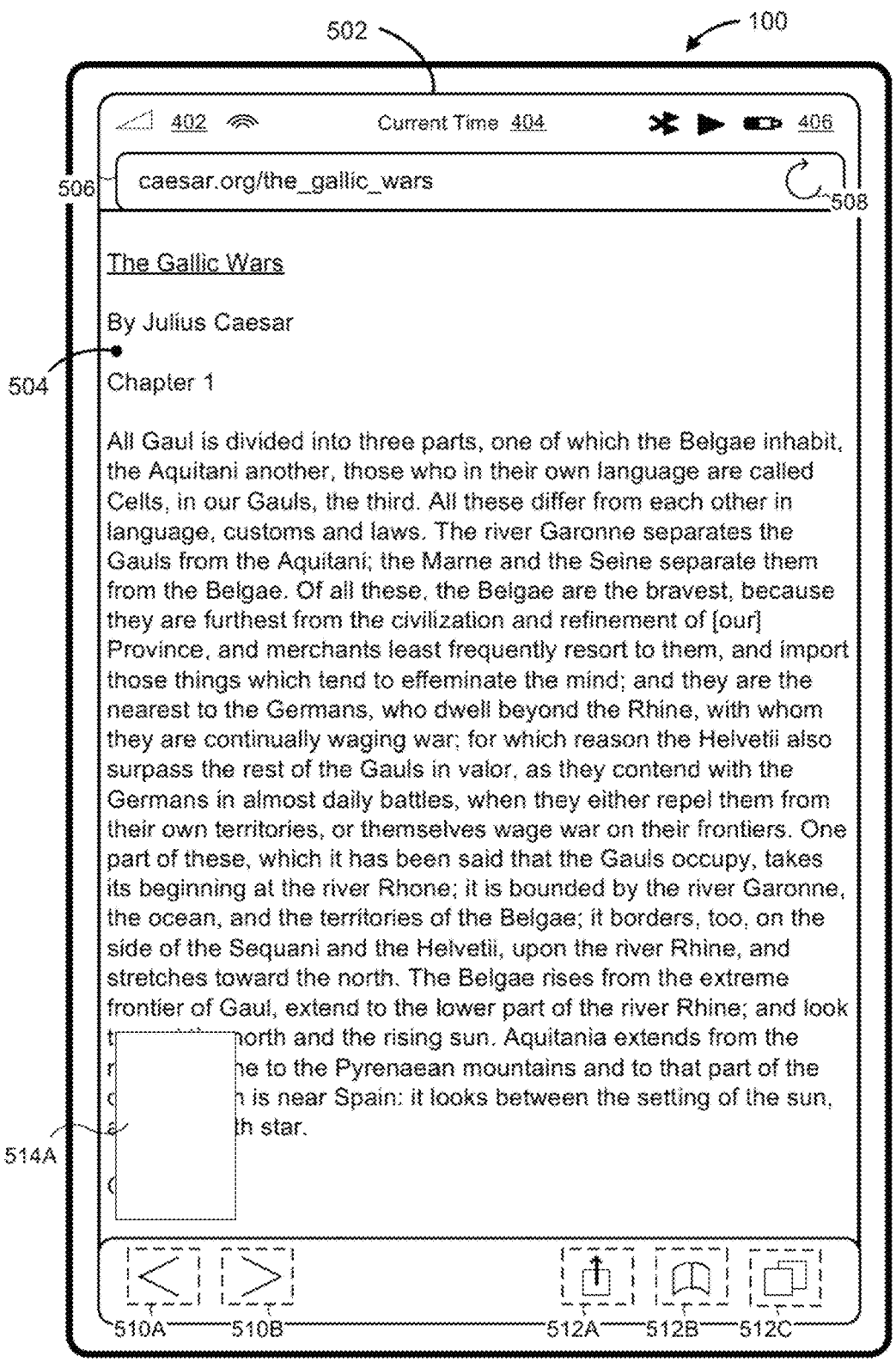
Figure 5C:
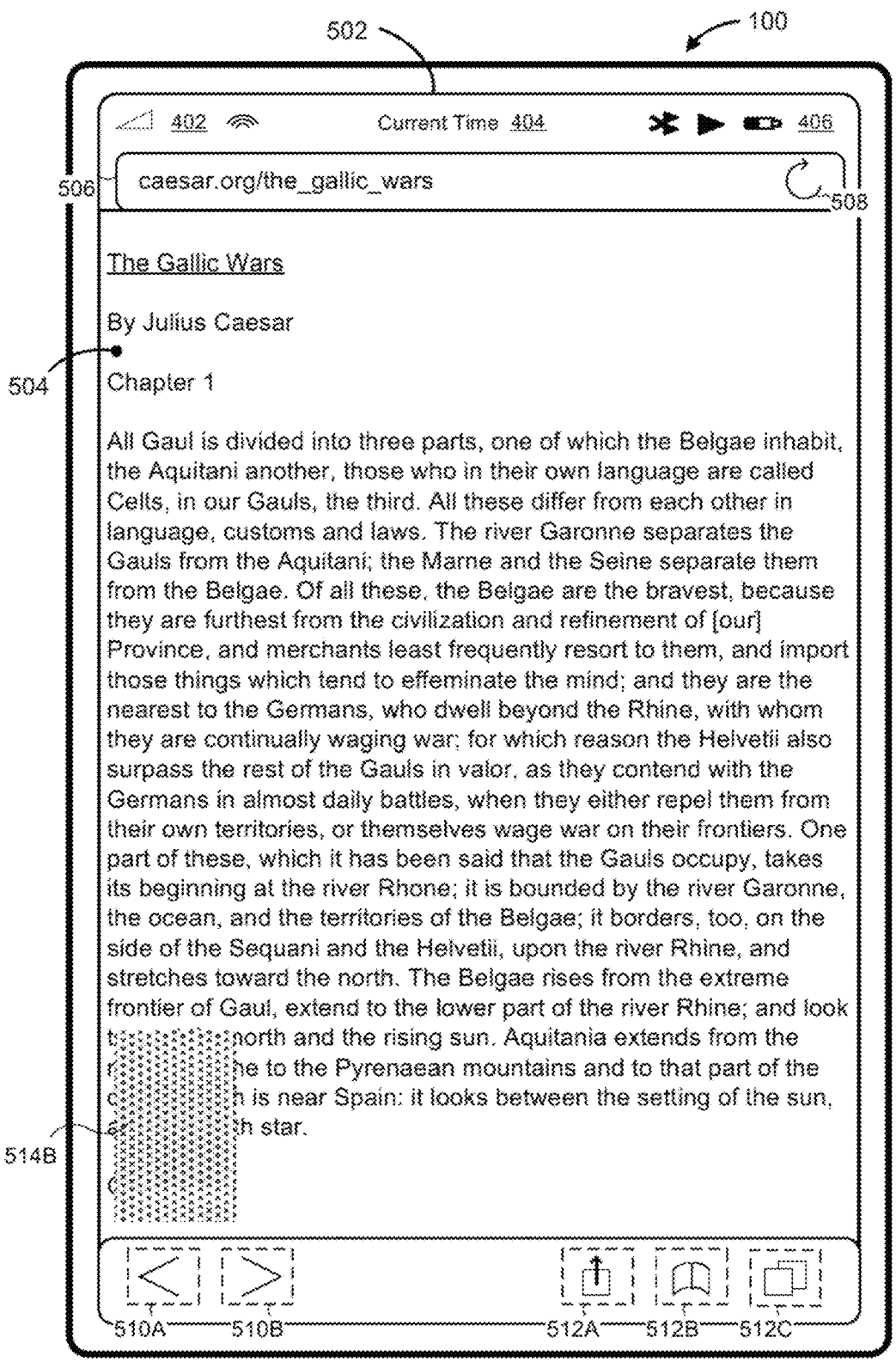
Figure 6A:
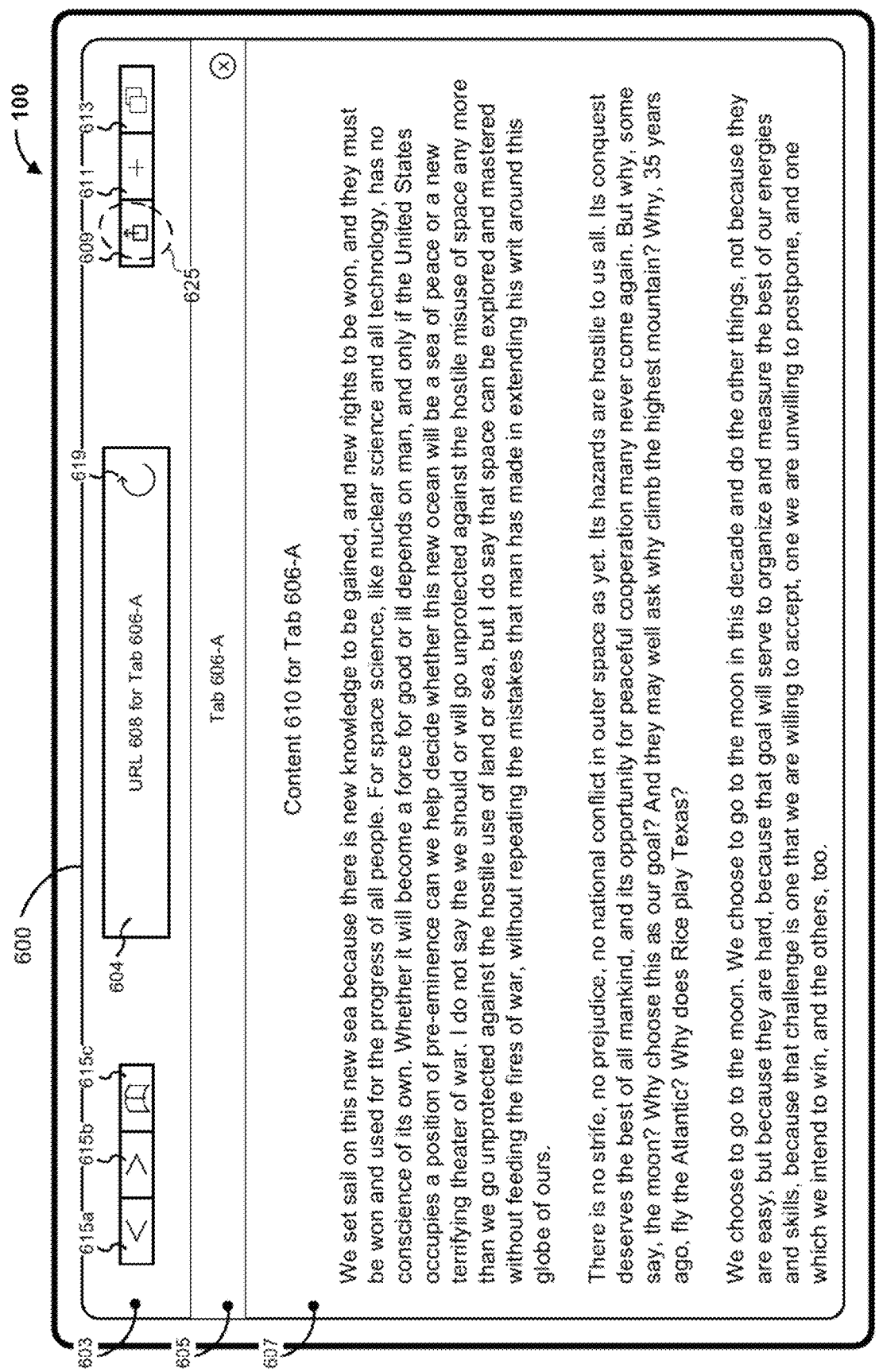
FIGS. 6A-6N illustrate example user interfaces for expanding a screenshot image in accordance with some embodiments.

FIGS. 5A-5CC illustrate example user interfaces for editing a screenshot image within a screenshot editing interface in accordance with some embodiments. The user interfaces in these figures are used to illustrate the processes described below, including the process in FIGS. 7A-7E. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 5A illustrates displaying a web browser interface 502 associated with a web browser application executed by the device 100. As shown in FIG. 5A, the web browser interface 502 includes: a content region 504 associated with a web page, an address bar 506 displaying a URL (e.g., caesar.org/the gallic wars) for the web page, a refresh affordance 508, and a toolbar region with a plurality of affordances 510A, 510B, 512A, 512B, and 512C.

According to some embodiments, in response to activation (e.g., selection with a contact) of the affordance 510A (e.g., the back affordance), the device 100 updates the web browser interface 502 to display a previous web page. According to some embodiments, in response to activation (e.g., selection with a contact) of the affordance 510B (e.g., the next affordance), the device 100 updates the web browser interface 502 to display a next web page. According to some embodiments, in response to activation (e.g., selection with a contact) of the affordance 512A (e.g., the share affordance), the device 100 displays a transport interface overlaid on the web browser interface 502 provided to share the web page via one or more communication means, such as email, SMS, etc., and/or to perform one of a plurality of operations on the web page such as a copy operation, a print operation, etc. (e.g., similar to the transport interface 570 in FIG. 5L and the transport interface 650 in FIG. 6B). According to some embodiments, in response to activation (e.g., selection with a contact) of the affordance 512B (e.g., the bookmark affordance), the device 100 replaces display of the web browser interface 502 with a bookmark management interface for viewing and/or modifying bookmarked web pages, favorited web pages, and/or a saved reading list of web pages. According to some embodiments, in response to activation (e.g., selection with a contact) of the affordance 512C (e.g., the tabs affordance), the device 100 replaces display of the web browser interface 502 with a tab management interface for viewing and/or modifying web browser tabs.

FIGS. 5A-5D show a sequence in which a thumbnail representation of a screenshot image is overlaid on the web browser interface. For example, the device 100 detects a screenshot capture input such as a predefined gesture, voice command, key combination (e.g., print screen key, power+ home button combination, etc.), and/or the like. FIG. 5B illustrates displaying a thumbnail representation 514A of a screenshot image 534 in a first state (e.g., a first opacity and/or sharpness level or a first fade-in state) overlaid on the web browser interface 502 in response to detecting the screenshot capture input. For example, the screenshot image 534 corresponds to the web browser interface 502 displayed in FIG. 5A. For example, the screenshot image 534 is shrunk to generate the thumbnail representation 514A based on predefined dimensions, a predefined aspect ratio, and/or a predefined resolution.

In some embodiments, the device 100 displays the thumbnail representation of the screenshot image at a location overlaid on the web browser interface 502 that satisfies an occlusion criterion. In one example, the selected location that satisfies the occlusion criterion occludes the least number of pixels of the web browser interface 502. In another example, the selected location that satisfies the occlusion criterion occludes the least number of pixels of the content displayed within the content region 504.

According to some embodiments, in response to detecting the screenshot capture input, the device 100 displays the thumbnail representation of the screenshot image overlaid on the web browser interface 502. According to some embodiments, in response to detecting the screenshot capture input, the device 100 displays the thumbnail representation of the screenshot image overlaid on the web browser interface 502 according to a predefined animation such as the fade-in animation in FIGS. 5B-5D where the opacity of the thumbnail representation of the screenshot image decreases and/or sharpness of the thumbnail representation of the screenshot image increases. In some embodiments, in response to detecting the screenshot capture input, the device 100 also saves/stores the screenshot image in an image storage repository (e.g., the camera roll or image/media directory).

Figure 5D:
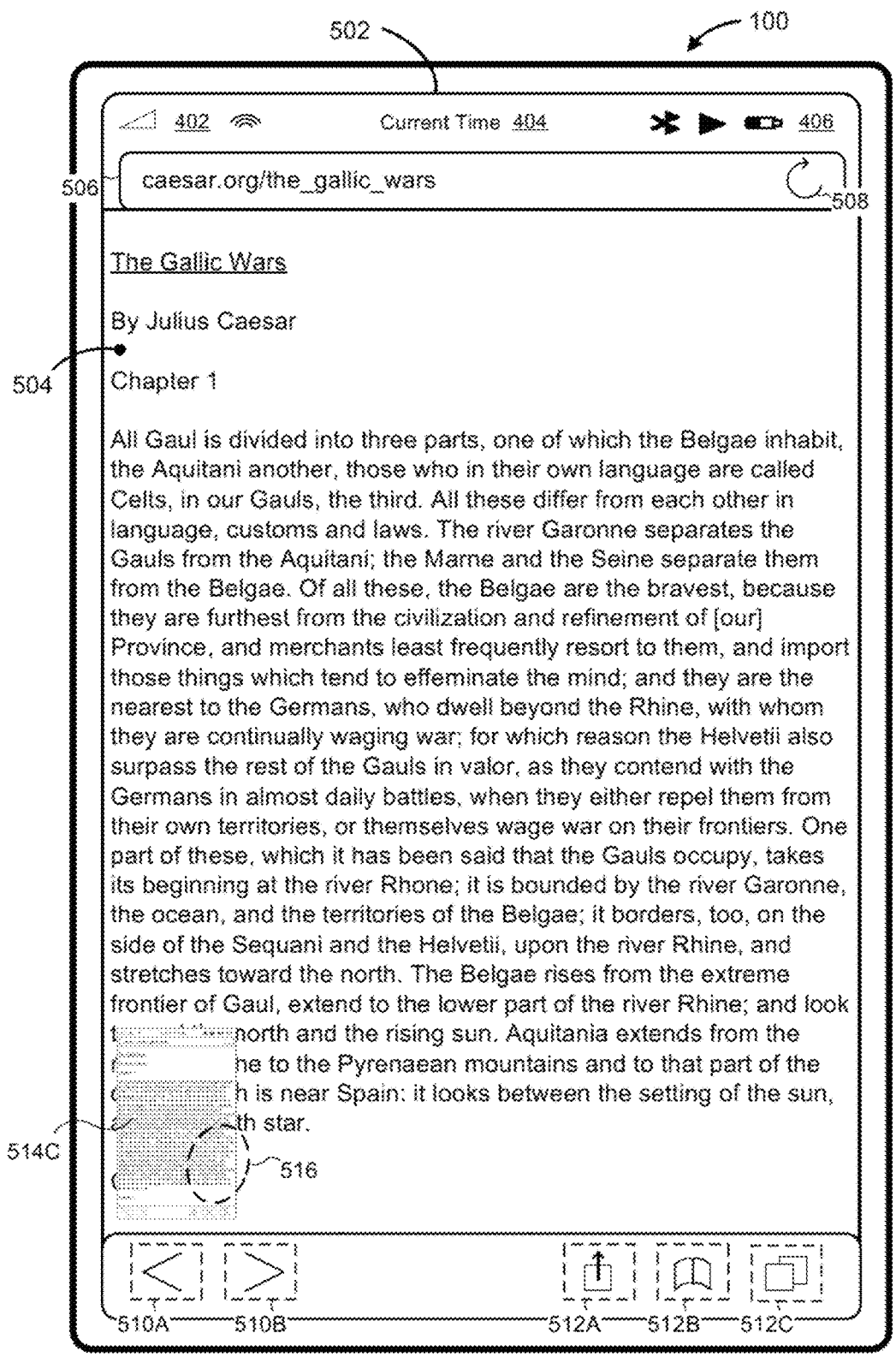

FIG. 5C illustrates displaying a thumbnail representation 514B of the screenshot image 534 in a second state (e.g., a second opacity and/or sharpness level or a second fade-in state) overlaid on the web browser interface 502. FIG. 5D illustrates displaying a thumbnail representation 514C of the screenshot image 534 in a third state (e.g., a third opacity and/or sharpness level or a third fade-in state) overlaid on the web browser interface 502.

Figure 5E:
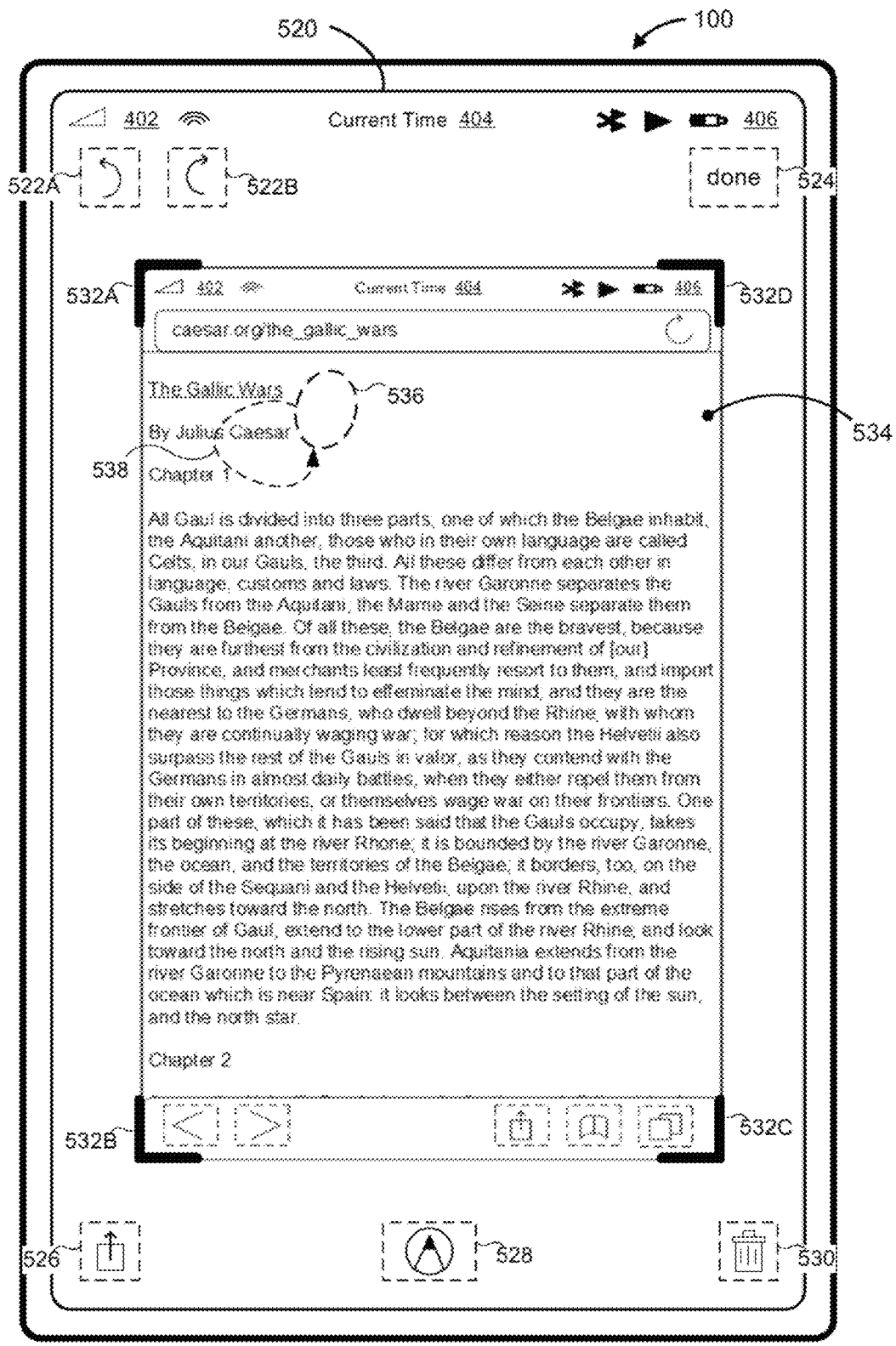

FIGS. 5D-5K show a sequence in which a screenshot image is edited (e.g., modified and/or annotated) within a screenshot editing interface. FIG. 5D also illustrates detecting a contact 516 (e.g., a tap/selection gesture) at a location that corresponds to the thumbnail representation 514C of the screenshot image 534. FIG. 5E illustrates replacing display of the web browser interface 502 with a screenshot editing interface 520 in response to the selection of the thumbnail representation 514C of the screenshot image 534 in FIG. 5D.

As shown in FIG. 5E, the screenshot editing interface 520 includes the screenshot image 534 within an image area bounded by cropping interface elements (e.g., crop handles) 532A, 532B, 532C, and 532D (sometimes collectively referred to herein as the "cropping interface elements 532").

As shown in FIG. 5E, the screenshot editing interface 520 includes affordances 522A, 522B, 524, 526, 528, and 530. According to some embodiments, in response to activation (e.g., selection with a contact) of the affordance 522A (e.g., the undo affordance), the device 100 reverts one or more previous modifications to the screenshot image 534. According to some embodiments, in response to activation (e.g., selection with a contact) of the affordance 522B (e.g., the redo affordance), the device 100 reapplies one or more previously reverted modifications to the screenshot image 534. According to some embodiments, in response to activation (e.g., selection with a contact) of the affordance 524 (e.g., the done affordance), the device 100 replaces display of the screenshot editing interface 520 with the web browser interface 502 in FIG. 5A. In some embodiments, the device 100 also saves/stores the modified screenshot image in addition to the unmodified screenshot image in an image storage repository (e.g., the camera roll or image/media content library) in response to the selection of the affordance 524. In some embodiments, the device 100 periodically saves/stores intermediate versions of the modified screenshot image in the image storage repository prior to detecting selection of the affordance 524.

According to some embodiments, in response to activation (e.g., selection with a contact) of the affordance 526 (e.g., the share affordance), the device 100 displays a transport interface overlaid on the screenshot editing interface 520 provided to share the screenshot image 534 via one or more communication means, such as email, SMS, etc., and/or to perform one of a plurality of operations on the web page such as a copy operation, a print operation, etc. (e.g., similar to the transport interface 570 in FIG. 5L and the transport interface 650 in FIG. 6B). According to some embodiments, in response to activation (e.g., selection with a contact) of the affordance 528 (e.g., the markup affordance), the device 100 displays a plurality of markup tools and a color/appearance palate within the screenshot editing interface 520 (e.g., as shown in FIGS. 5F-5G).

According to some embodiments, in response to activation (e.g., selection with a contact) of the affordance 530 (e.g., the deletion affordance), the device 100 causes the modified screenshot image to be deleted from the image storage repository. In some embodiments, the device 100 also deletes the unmodified screenshot image from the image storage repository in response to the selection of the affordance 530. In some embodiments, the device 100 replaces display of the screenshot editing interface 520 with the web browser interface 502 in FIG. 5A in response to the selection of the affordance 530.

FIG. 5E also illustrates detecting a first annotation input with a contact 536 according to motion path 538 (e.g., a circular tap-and-drag motion) in order to circle the word "Caesar" within the screenshot image 534. FIG. 5F illustrates displaying a first annotation 540 (e.g., circling the word "Caesar") over the screenshot image 534 in response to detecting the first annotation input in FIG. 5E.

Figure 5F:
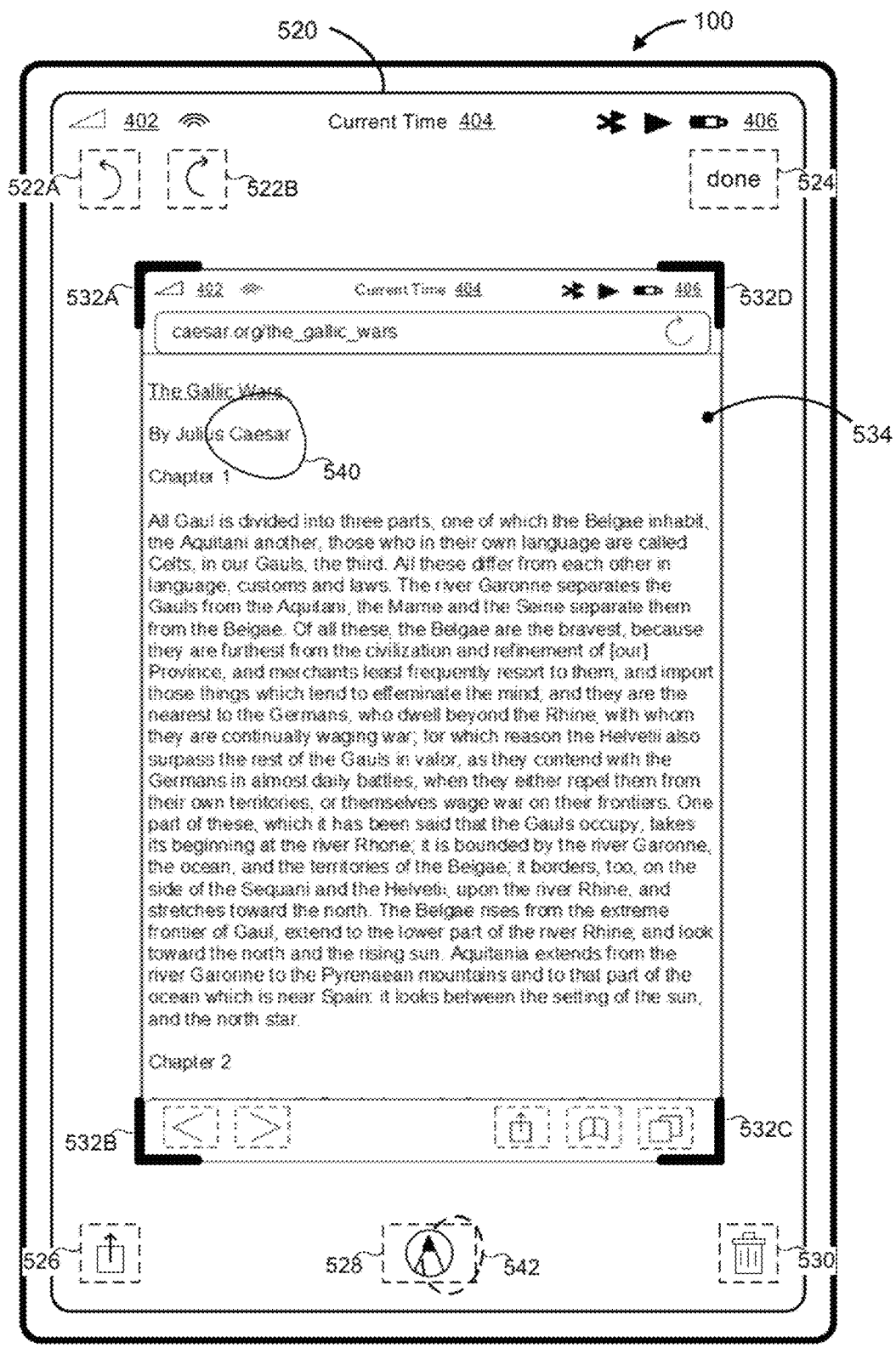
Figure 5G:
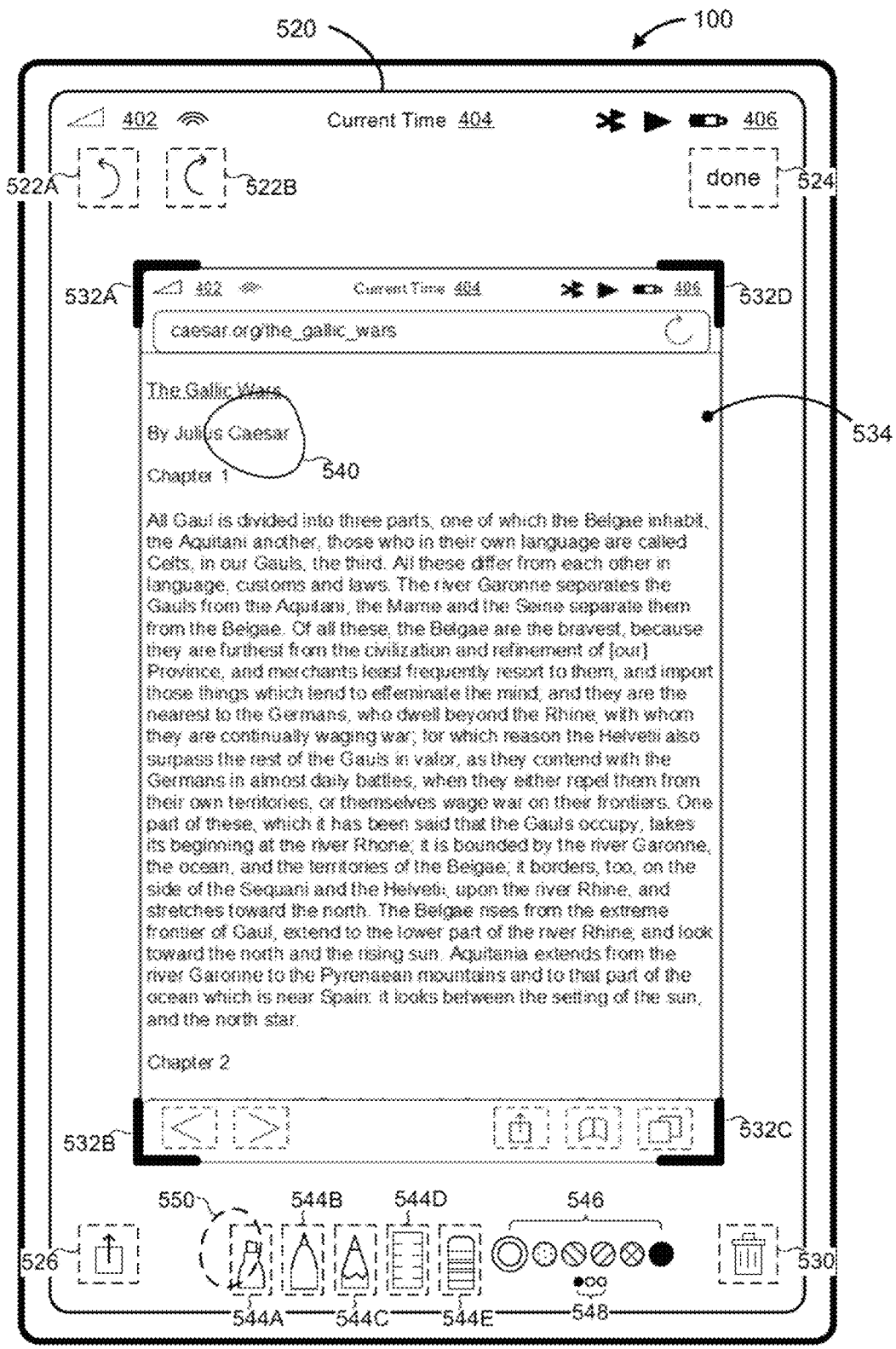

FIG. 5F also illustrates detecting a contact 542 (e.g., a tap/selection gesture) at a location that corresponds to the affordance 528. FIG. 5G illustrates replacing display of the affordance 528 with a plurality of markup tools and a color/appearance palate in response to the selection of the affordance 528 in FIG. 5F. As shown in FIG. 5G, the plurality of markup tool includes a highlighter/underline tool affordance 544A, a pen/marker tool affordance 544B, a pencil tool affordance 544C, a ruler tool affordance 544D, and an eraser tool affordance 544E (sometimes collectively referred to herein as the "markup tool affordances 544").

Figure 5H:
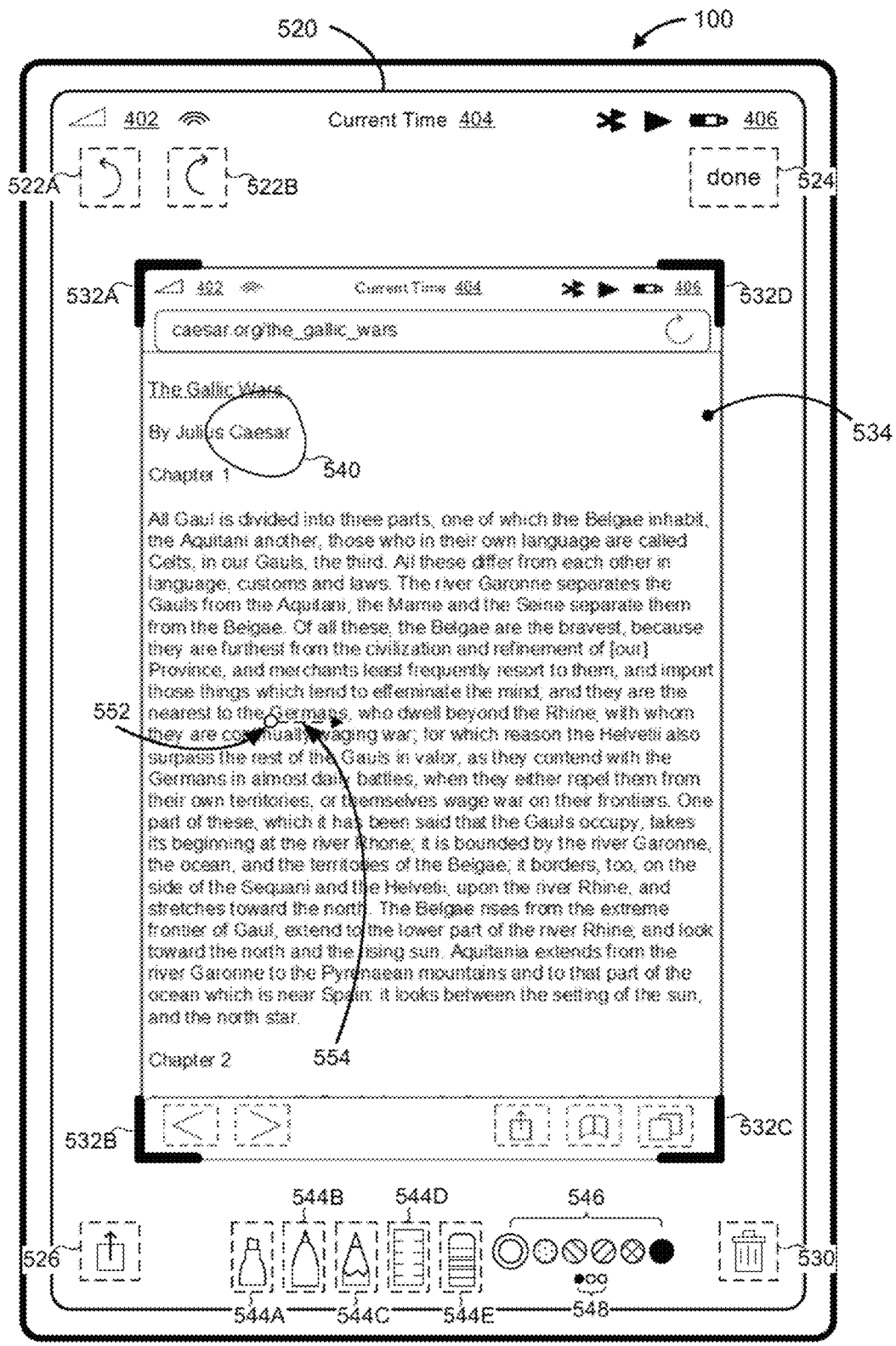
Figure 5I:
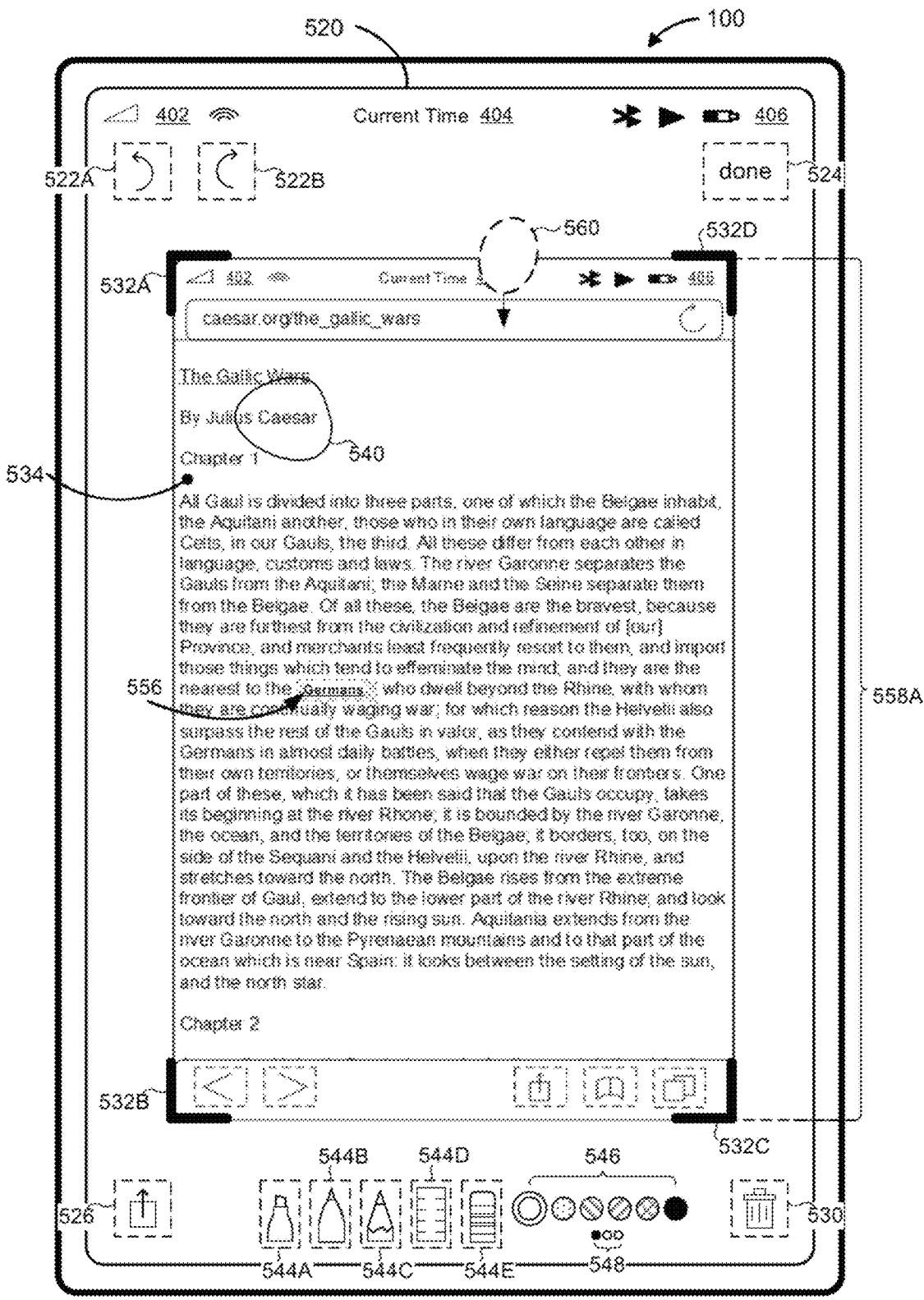

According to some embodiments, selection of one of the markup tool affordances 544 causes a subsequent annotation to be displayed over the screenshot image 534 based on the selected one of the markup tool affordances 544 (e.g., as shown in FIGS. 5G-5I).

As shown in FIG. 5G, the color/appearance palate 546 includes a first set of user-selectable colors and/or appearance patterns for annotating the screenshot image 534. As shown in FIG. 5G, the palate indicators 548 indicates that the color/appearance palate 546 includes additional sets of user-selectable colors and/or appearance patterns in addition to the first set of user-selectable colors and/or appearance patterns. For example, the additional sets of user-selectable colors and/or appearance patterns are accessed by swiping left-to-right or right-to-left over the first set of user-selectable colors and/or appearance patterns. In another example, the additional sets of user-selectable colors and/or appearance patterns are accessed by selecting one of the palate indicators 548.

FIG. 5G also illustrates detecting a contact 550 (e.g., a tap/selection gesture) at a location that corresponds to the highlighter/underline tool affordance 544A. FIG. 5H illustrates detecting a second annotation input with a contact 552 according to motion vector 554 (e.g., a substantially horizontal tap-and-drag motion) in order to highlight and/or underline the word "Germans" within the screenshot image 534. FIG. 5I illustrates displaying a second annotation 556 (e.g., highlighting and/or underlining the word "Germans") over the screenshot image 534 in response to detecting the second annotation input in FIG. 5H.

Figure 5J:
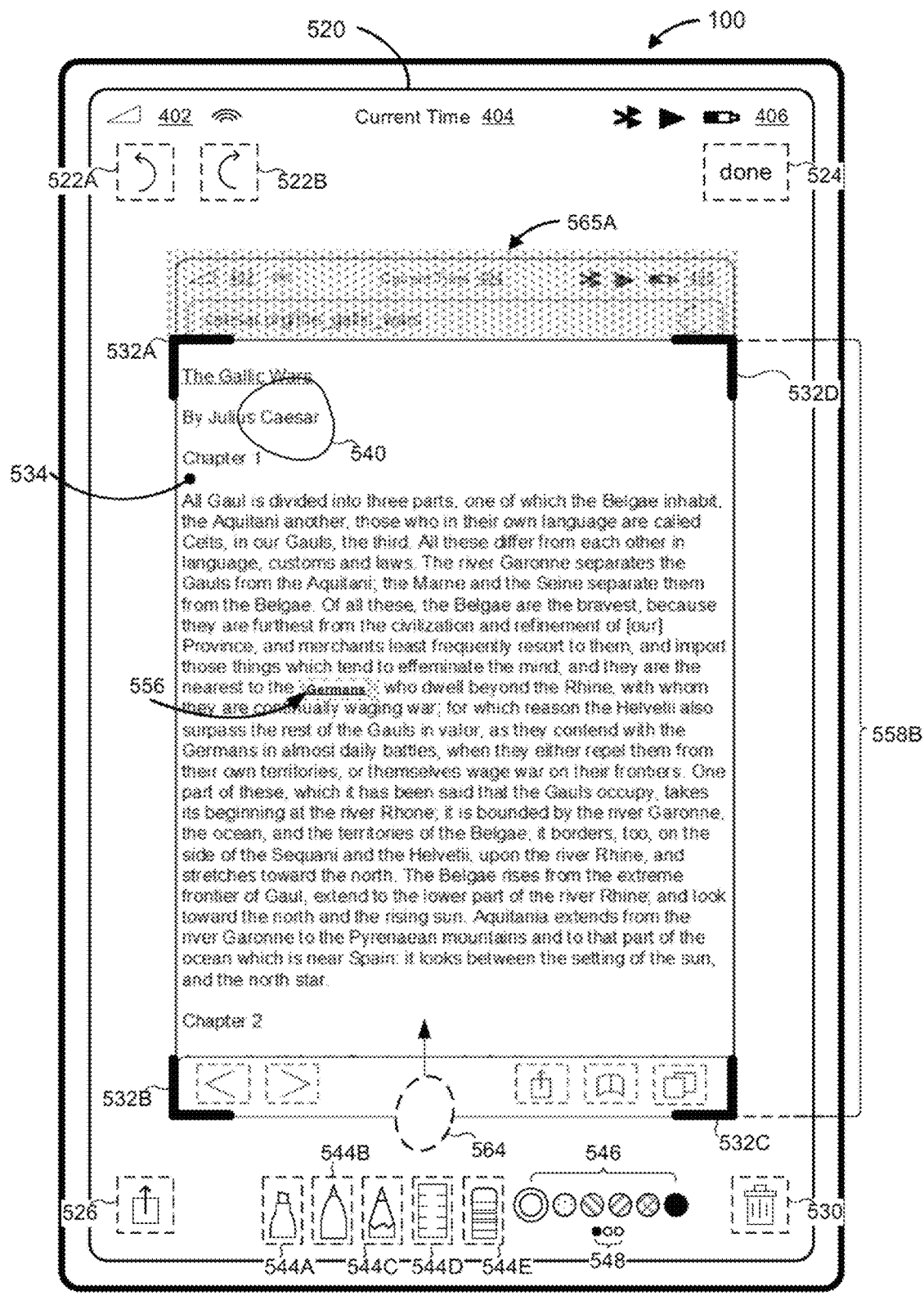

FIG. 5I also illustrates detecting a first cropping input in a downward direction from a top edge of the screenshot image 534 with a contact 560 (e.g., a tap-and-drag gesture). As shown in FIG. 5I, a first dimension (e.g., height) of the screenshot image 534 has a first value 558A. FIG. 5J illustrates displaying a cropped-out portion 565A of the screenshot image 534 in response to detecting the first cropping input in FIG. 5I. For example, the cropped-out portion 565A has an opacity value and/or a blur value that is greater than the screenshot image 534. As shown in FIG. 5J, the first dimension (e.g., height) of the screenshot image 534 has a second value 558B that is less than the first value 558A in FIG. 5I. According to some embodiments, the device 100 adjusts the cropped-out portion 565A based on the locations of the chrome region (e.g., the display region that includes the indicator(s) 402, the time 404, and the battery status indicator 406), the address bar 506, and the content region 504.

Figure 5K:
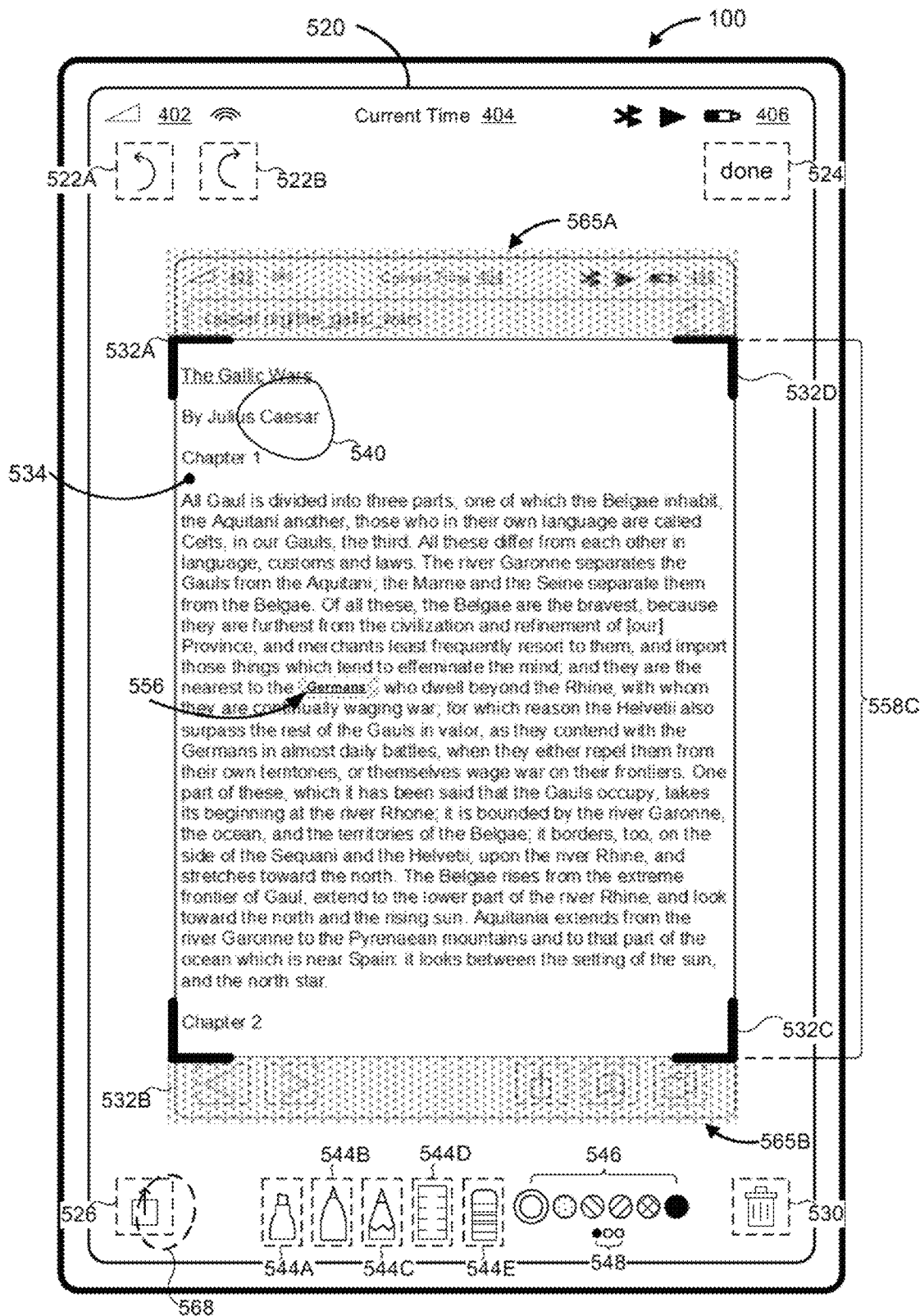

FIG. 5J also illustrates detecting a second cropping input in an upward direction from a bottom edge of the screenshot image 534 with a contact 564 (e.g., a tap-and-drag gesture). FIG. 5K illustrates displaying a cropped-out portion 565B of the screenshot image 534 in response to detecting the second cropping input in FIG. 5J. For example, the cropped-out portion 565B has an opacity value and/or a blur value that is greater than the screenshot image 534. As shown in FIG. 5K, the first dimension (e.g., height) of the screenshot image 534 has a third value 558C that is less than the first value 558A in FIG. 5I and the second value 558B in in FIG. 5J. According to some embodiments, the device 100 adjusts the cropped-out portion 565B based on the locations of the toolbar region and the content region 504.

Figure 5L:
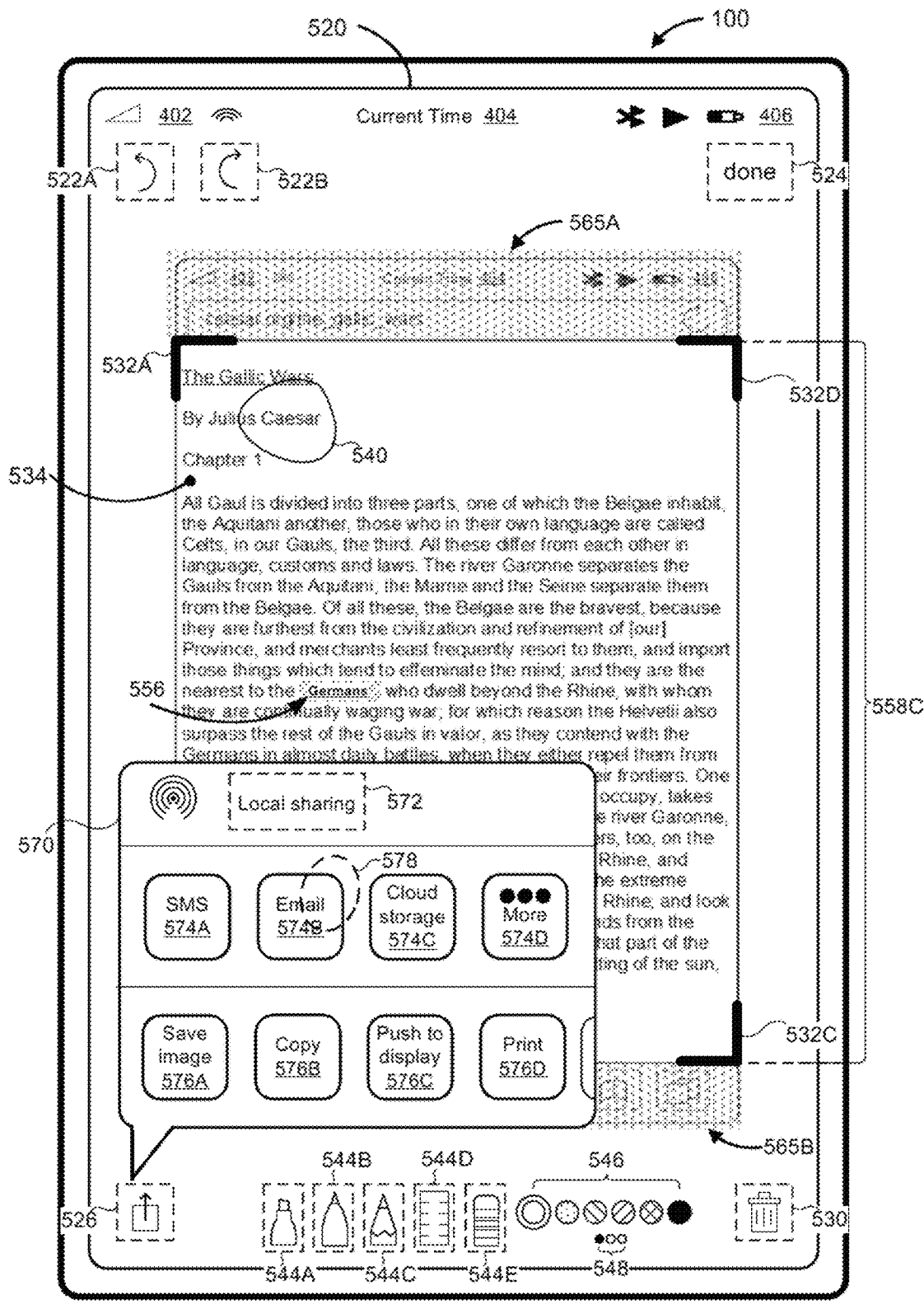
Figure 5M:
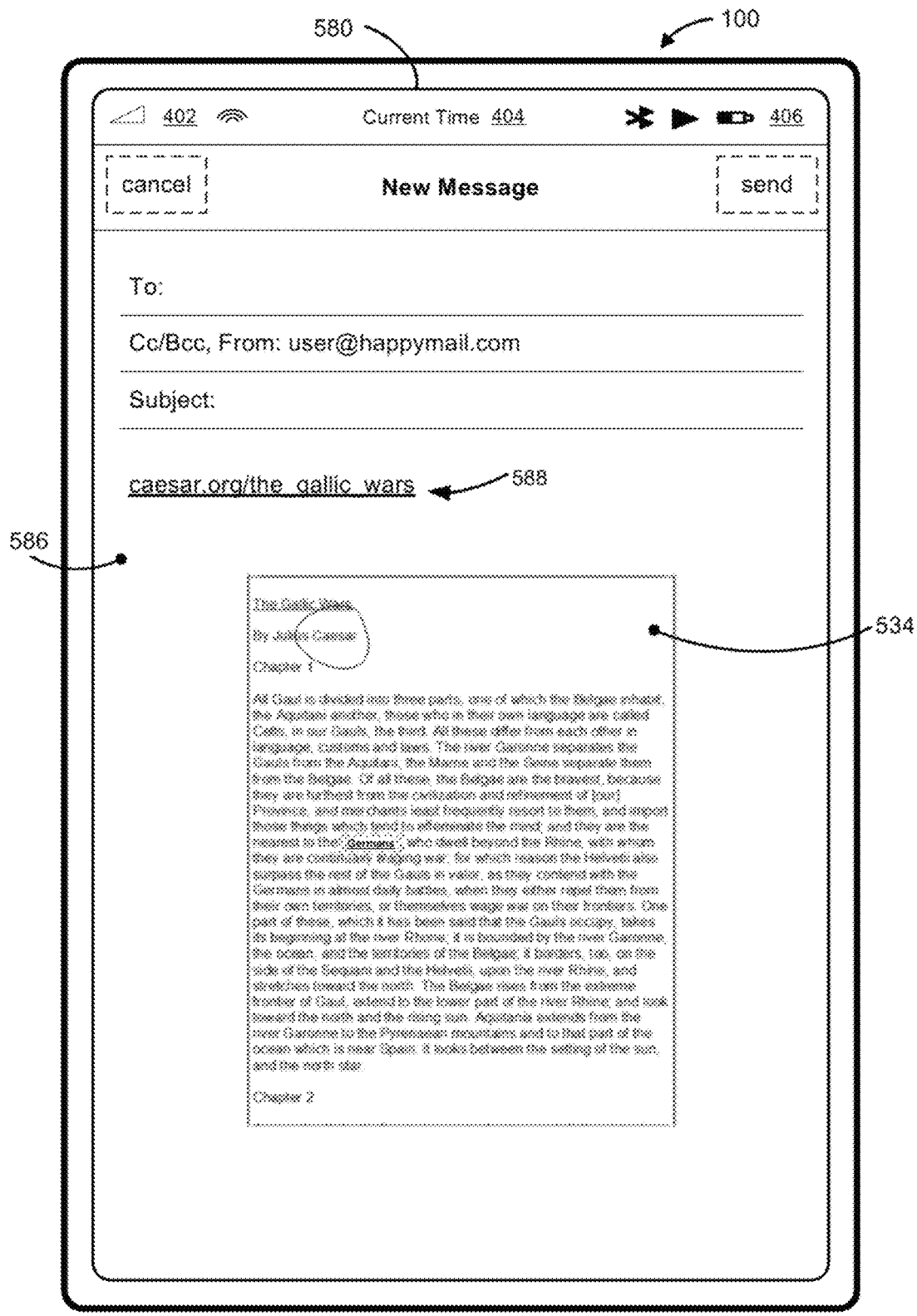

FIGS. 5K-5M show a sequence in which the edited screenshot image is shared via an email. FIG. 5K also illustrates detecting a contact 568 (e.g., a tap/selection gesture) at a location corresponding to the affordance 526 (e.g., the share affordance). FIG. 5L illustrates displaying a transport interface 570 over the screenshot editing interface 520 in response to detecting selection of the affordance 526 in FIG. 5K. As shown in FIG. 5L, the transport interface 570 includes a local sharing affordance 572 provided to share the screenshot image 534 (e.g., as modified in FIGS. 5E-5K) via a local interface (e.g., BLUETOOTH, NFC, WiFi, and/or the like), sharing affordances 574A, 574B, 574C, and 574D (sometimes collectively referred to herein as the "sharing affordances 574") provided to share the screenshot image 534 (e.g., as modified in FIGS. 5E-5K) via corresponding communication means (e.g., SMS, email, cloud storage, and others), and operation affordances 576A, 576B, 576C, and 576D (sometimes collectively referred to herein as the "operation affordances 576") provided to perform corresponding operations on the screenshot image 534 (e.g., as modified in FIGS. 5E-5K).

FIG. 5L also illustrates detecting a contact 578 (e.g., a tap/selection gesture) at a location corresponding to the sharing affordance 574B (e.g., the email sharing affordance). FIG. 5M illustrates replacing display of the screenshot editing interface 520 with an email composition interface 580 in response to the selection of the sharing affordance 574B in FIG. 5L. As shown in FIG. 5M, the email composition interface 580 includes an email content/body region 586 with the screenshot image 534 (e.g., as modified in FIGS. 5E-5K) and a link 588 (e.g., a URI or URL) to the web page displayed in the web browser 502 in FIG. 5A.

Figure 5N:
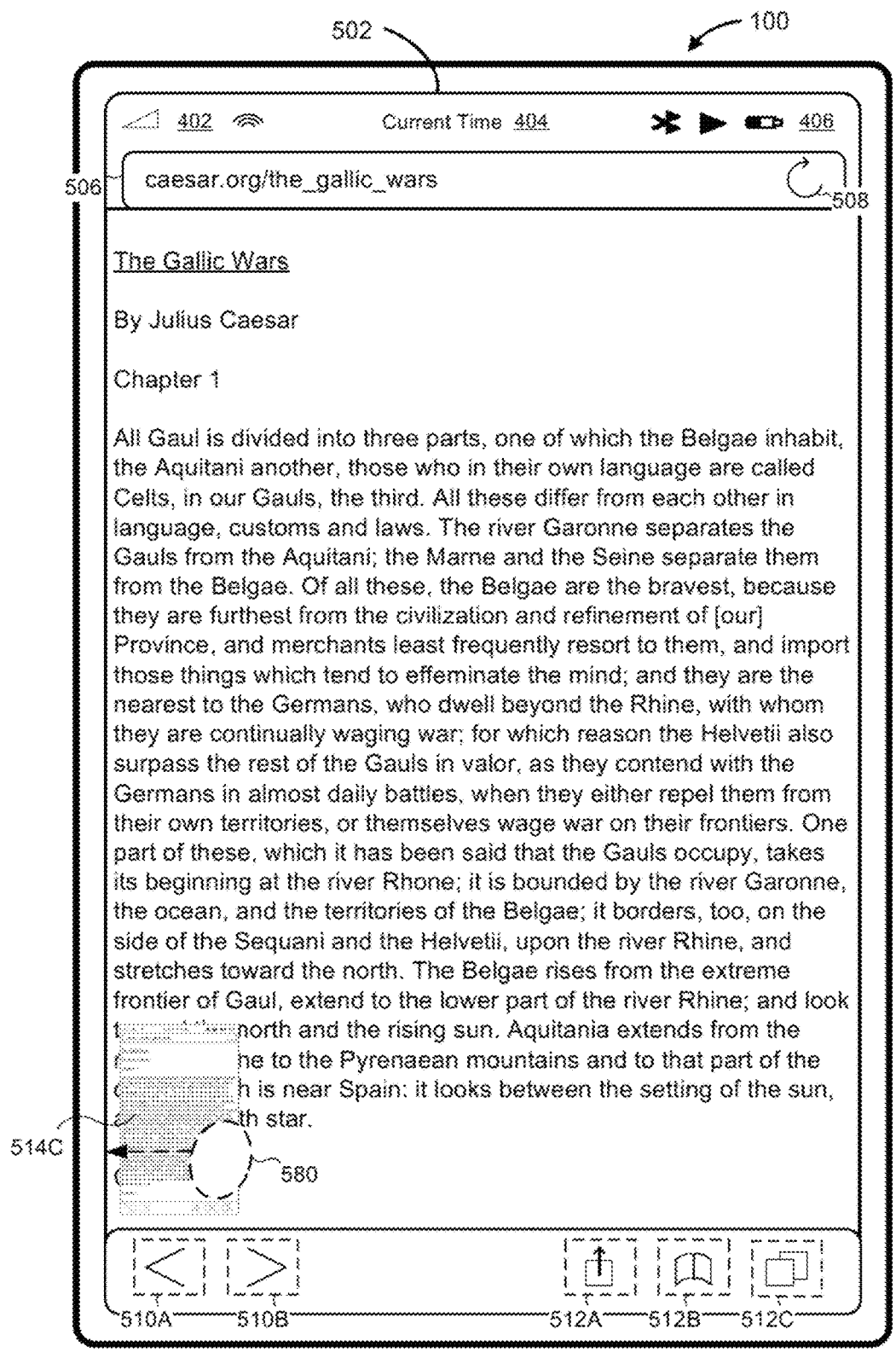
Figure 5O:
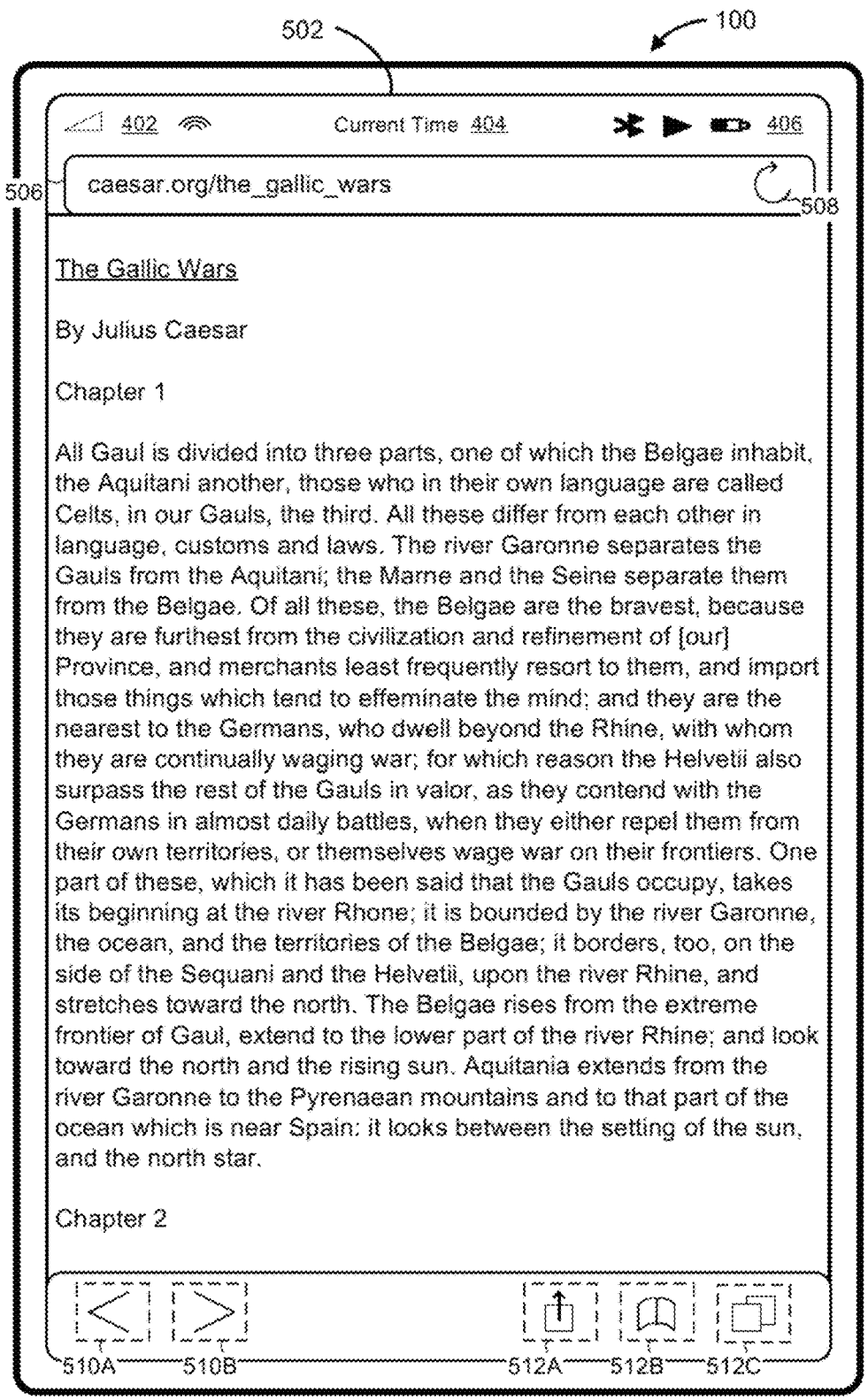

FIGS. 5N-5O show a sequence in which the thumbnail representation of the screenshot image ceases to be displayed over the web browser interface. The web browser interface 502 in FIG. 5N is similar to and adapted from the web browser interface 502 in FIG. 5D. As such, FIG. 5D and FIG. 5N include similar user interfaces and elements labeled with the same reference number in both figures have the same function, with only the differences described herein for the sake of brevity. FIG. 5N illustrates detecting a right-to-left swipe gesture over the thumbnail representation 514C of the screenshot image 534 with a contact 580 (e.g., a tap-and-drag gesture). FIG. 5O illustrates ceasing to display the thumbnail representation 514C of the screenshot image 534 over web browser interface 502 in response to detecting the right-to-left swipe gesture over the thumbnail representation 514C of the screenshot image 534 in FIG. 5N.

Figure 5P:
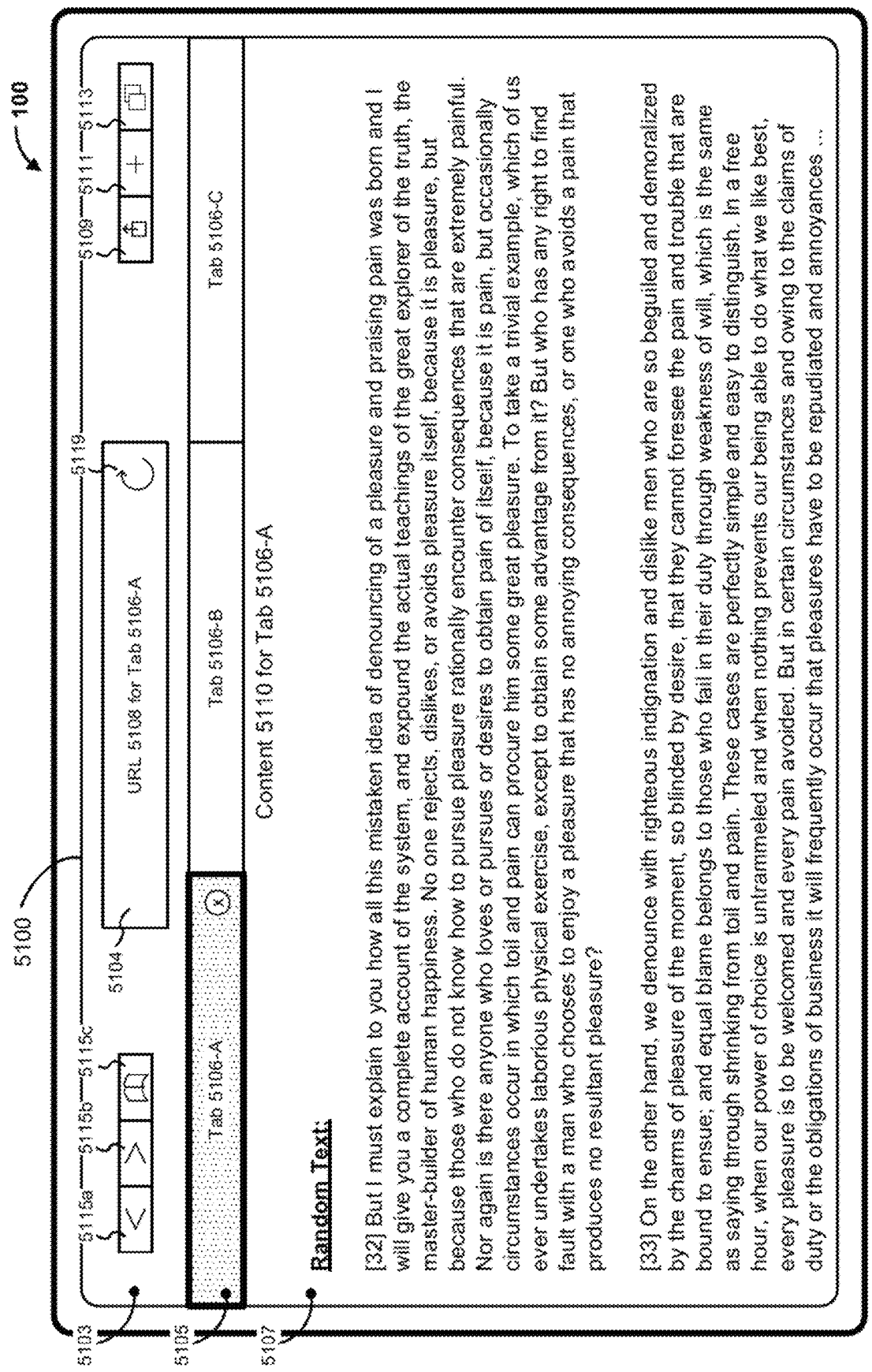

FIG. 5P illustrates displaying a web browser interface 5100 associated with a web browser application executed by the device 100. As shown in FIG. 5P, the web browser interface 5100 includes a toolbar region 5103, a tab bar region 5105, and a content region 5107. In FIG. 5P, the toolbar region 5103 includes a back affordance 5115*a* provided to display a previous web page in response to selection thereof (e.g., with a contact), a next affordance 5115*b* provided to display a next web page in response to selection thereof, and a book mark affordance 5115*c* provided to replace display of the web browser interface 5100 with a bookmark management interface in response to selection thereof.

In FIG. 5P, the toolbar region 5103 also includes an address bar 5104 displaying URL 5108 for tab 5106-A and a refresh affordance 5119 provided to refresh/reload the current web page in response to selection thereof (e.g., with a contact). In FIG. 5P, the toolbar region 5103 further includes a sharing affordance 5109 provided to display a transport interface over the web browser interface 5100 in response to selection thereof (e.g., similar to the transport interface 570 in FIG. 5L and the transport interface 650 in FIG. 6B), an add tab affordance 5111 provided to add a tab to the web browser interface 5100 in response to selection thereof (e.g., with a contact), and a tab view affordance 5113 provided to replace display of the web browser interface 5100 with a tab management interface in response to selection thereof.

In FIG. 5P, the tab bar region 5105 includes a plurality of user-selectable tabs 5106-A, 5106-B, and 5106-C (sometimes collectively referred to herein as the "tabs 5106") provided to display associated content within the content region 5107 in response to selection thereof. As shown in FIG. 5P, the tab 5106-A is currently selected, and the content region 5107 includes content 5110 for the tab 5106-A.

Figure 5Q:
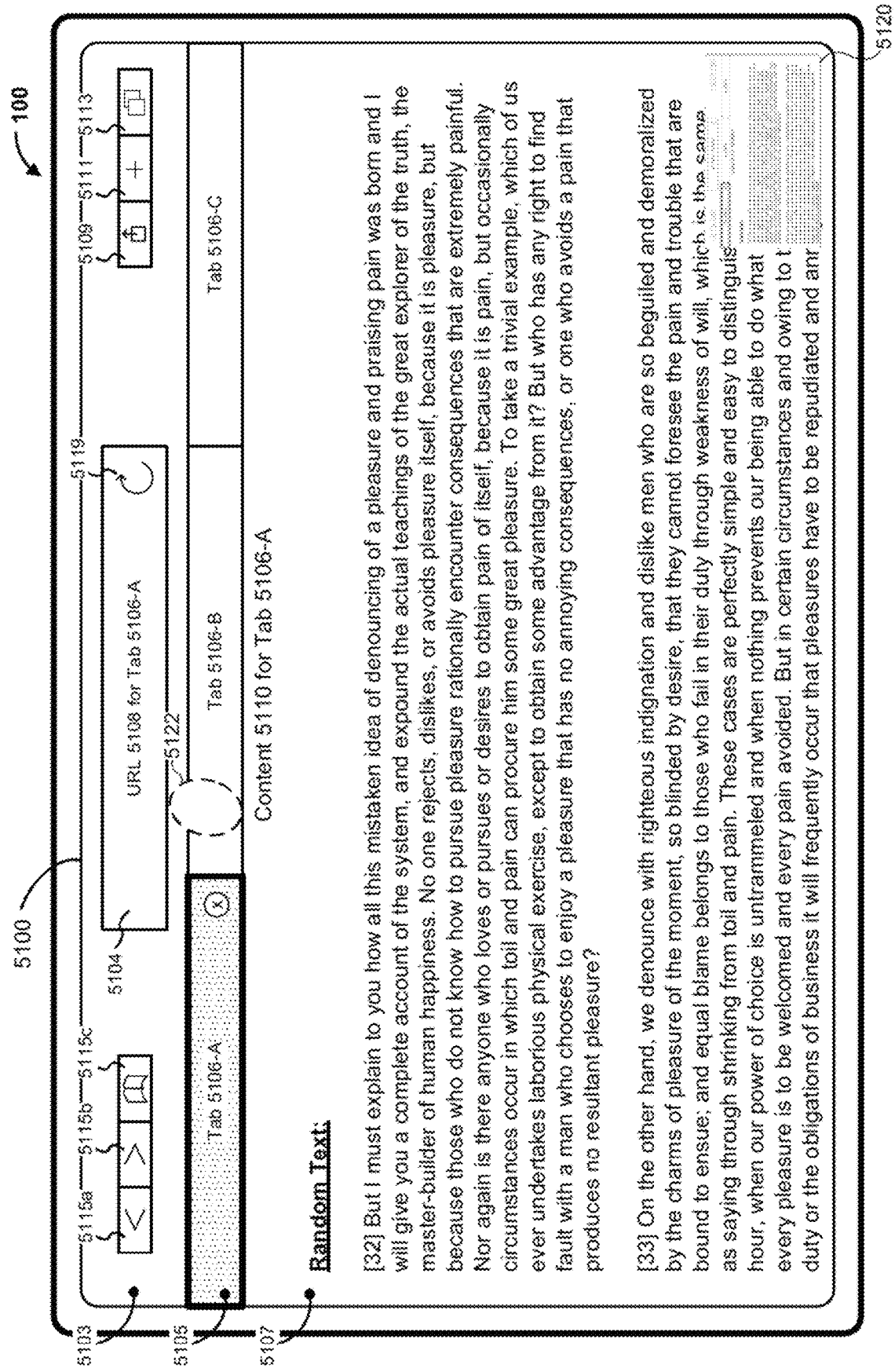

FIGS. 5P-5U show a sequence in which a group of thumbnail representations of screenshot images are overlaid on the web browser interface. For example, the device 100 detects a first screenshot capture input such as a predefined gesture, voice command, key combination (e.g., print screen key, power+home button combination, etc.), and/or the like. FIG. 5Q illustrates displaying a first thumbnail representation 5120 of a first screenshot image 5136 (e.g., the web browser interface 5100 displaying the content 5110 for the tab 5106-A) over the web browser interface 5100 in response to detecting the first screenshot capture input.

Figure 5R:
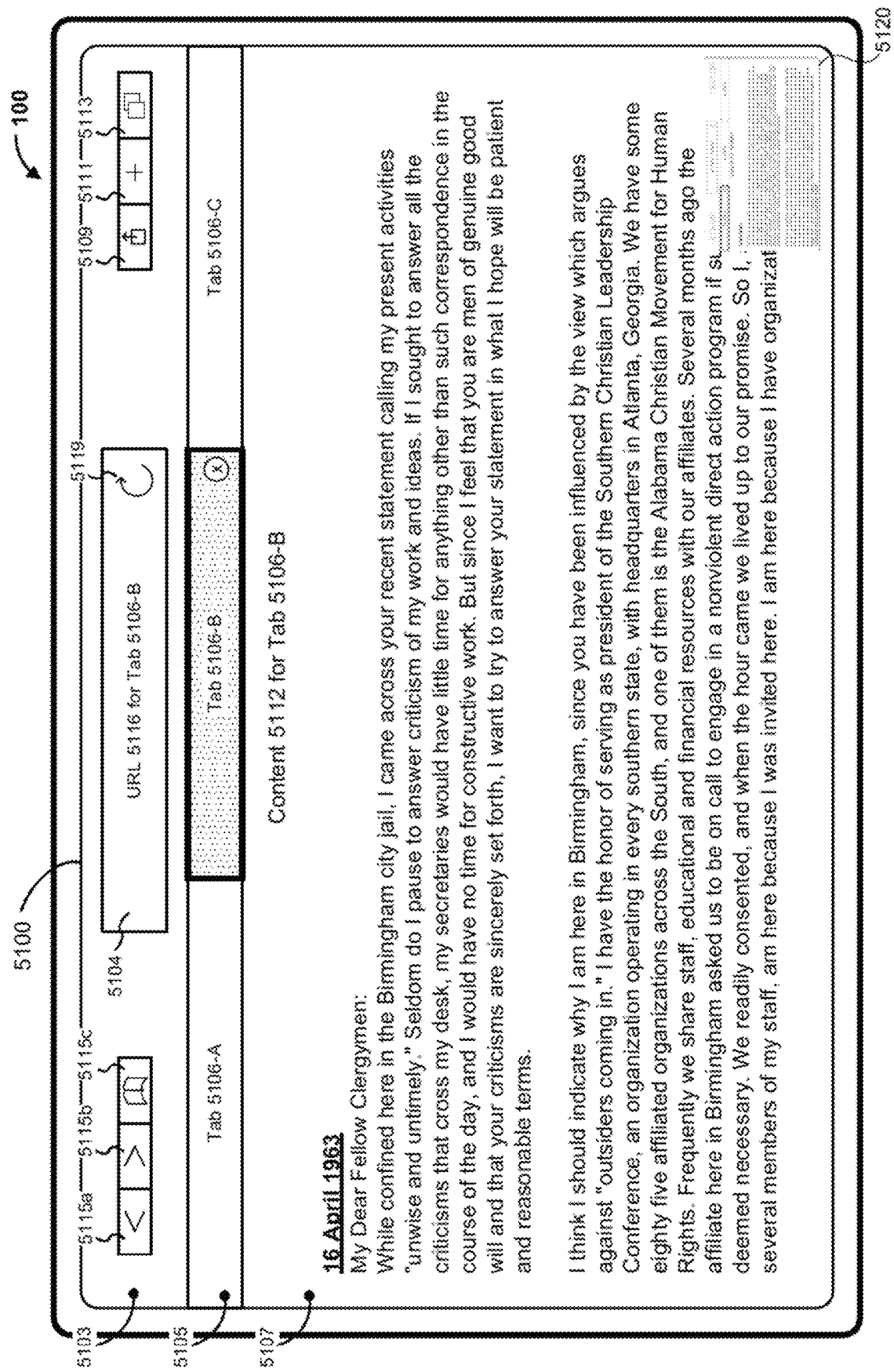
Figure 5S:
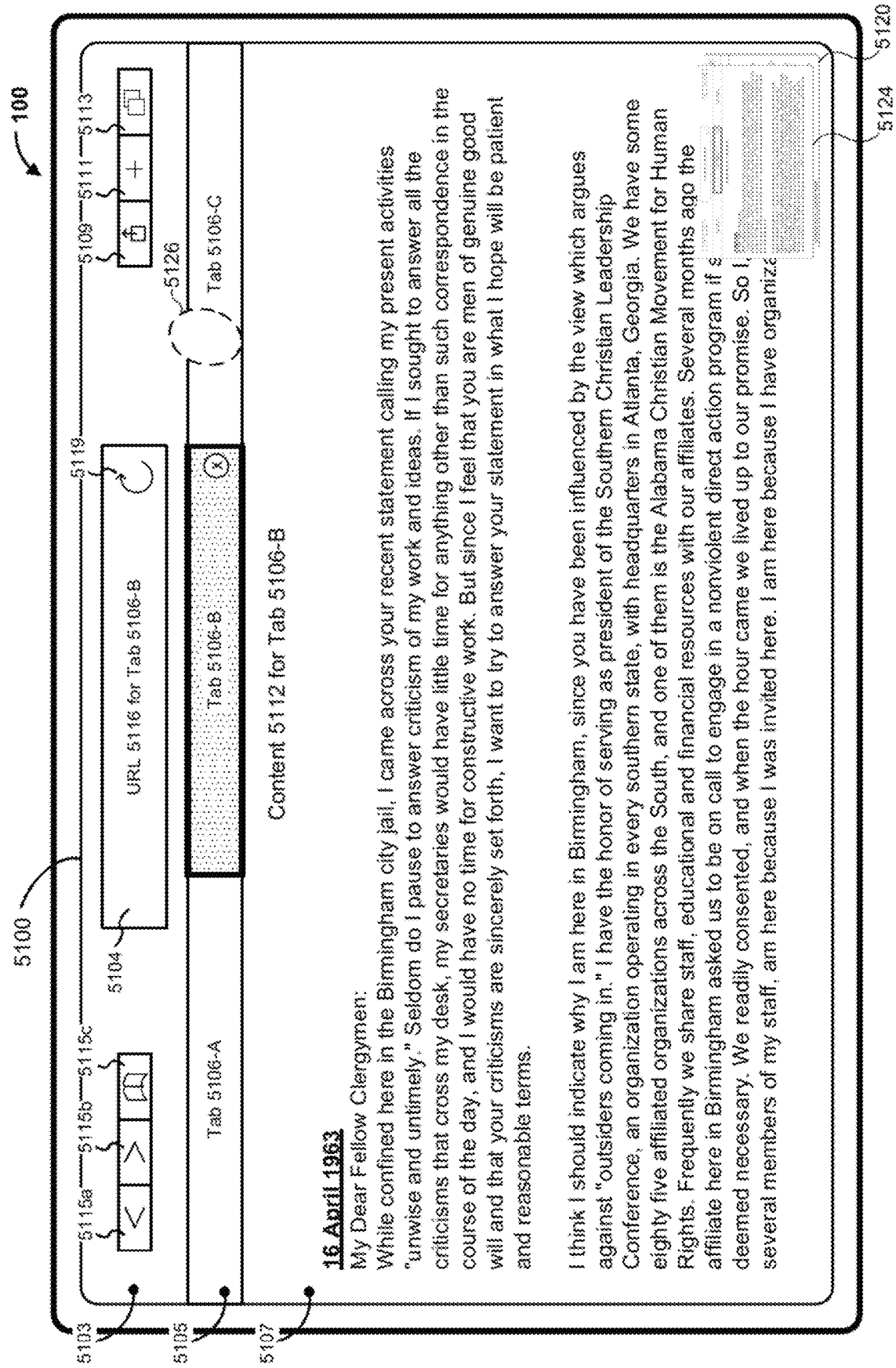

FIG. 5Q also illustrates detecting a contact 5122 (e.g., a tap/selection gesture) at a location corresponding to the tab 5106-B. FIG. 5R illustrates updating the web browser interface 5100 to shown the content 5112 for the tab 5106-B within the content region 5107 and the URL 5116 for the tab 5106-B within the address bar 5104 in response to the selection of the tab 5106-B in FIG. 5Q. For example, the tab 5106-B is currently selected in FIG. 5R in response to the selection of the tab 5106-B in FIG. 5Q. For example, the device 100 detects a second screenshot capture input such as a predefined gesture, voice command, key combination (e.g., print screen key, power+home button combination, etc.), and/or the like. FIG. 5S illustrates displaying a second thumbnail representation 5124 of a second screenshot image 5134 (e.g., the web browser interface 5100 displaying the content 5112 for the tab 5106-B) in addition to the first thumbnail representation 5120 of the first screenshot image 5136 over the web browser interface 5100 in response to detecting the second screenshot capture input.

Figure 5T:
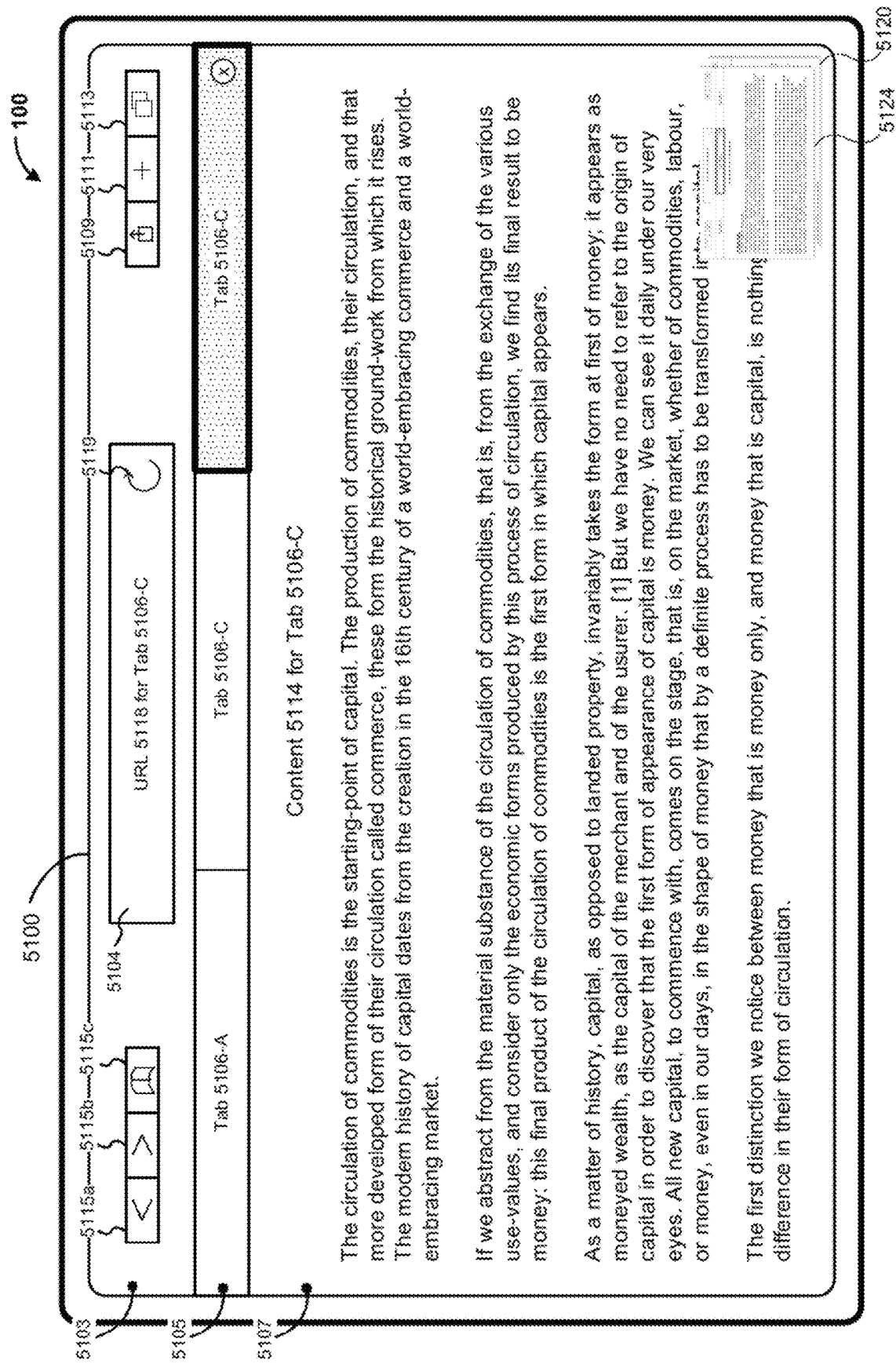
Figure 5U:
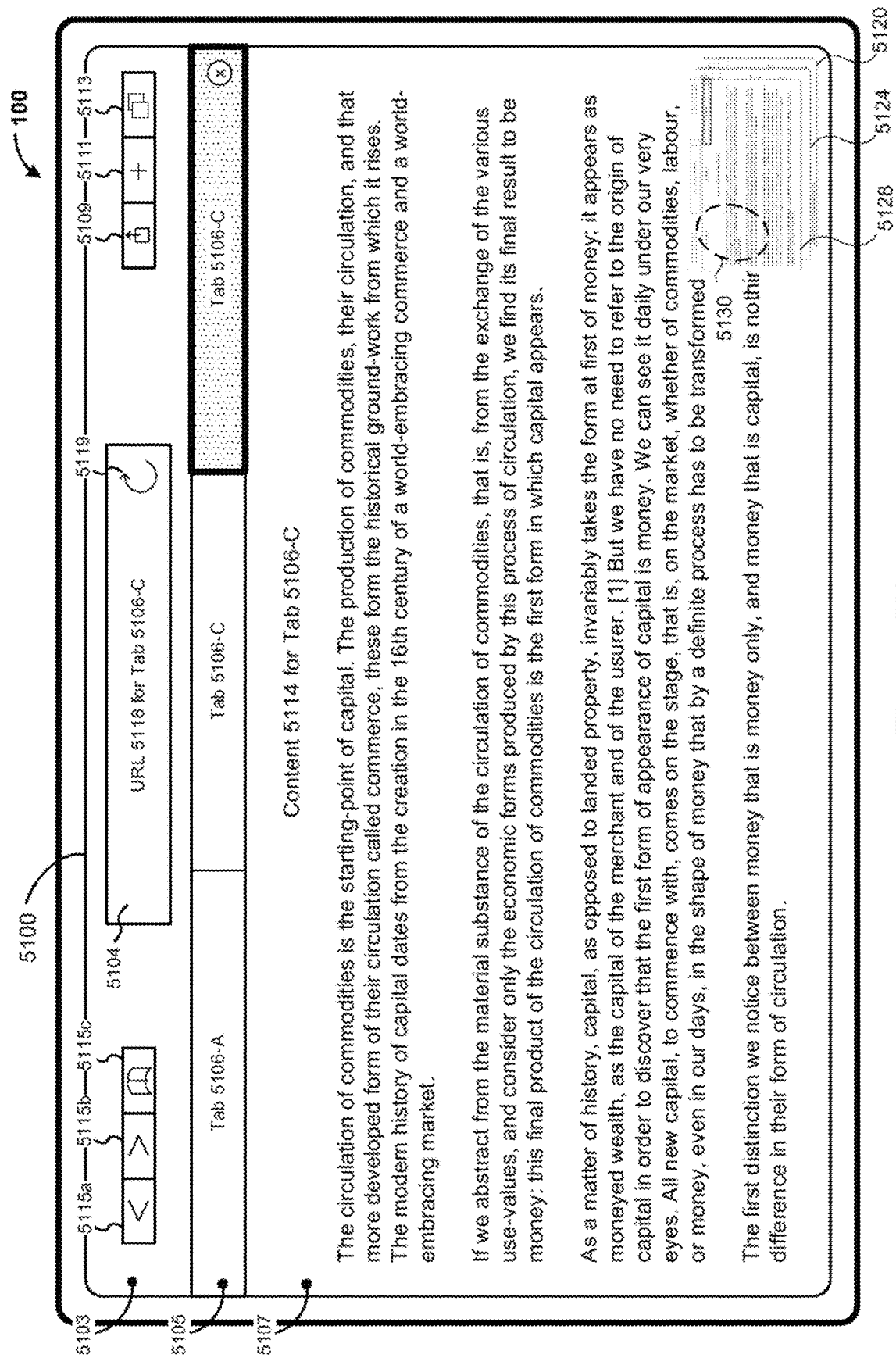

FIG. 5S also illustrates detecting a contact 5126 (e.g., a tap/selection gesture) at a location corresponding to the tab 5106-C. FIG. 5T illustrates updating the web browser interface 5100 to shown the content 5114 for the tab 5106-C within the content region 5107 and the URL 5118 for the tab 5106-C within the address bar 5104 in response to the selection of the tab 5106-C in FIG. 5S. For example, the tab 5106-C is currently selected in FIG. 5T in response to the selection of the tab 5106-C in FIG. 5S. For example, the device 100 detects a third screenshot capture input such as a predefined gesture, voice command, key combination (e.g., print screen key, power+home button combination, etc.), and/or the like. FIG. 5U illustrates displaying a third thumbnail representation 5128 of a third screenshot image 5132 (e.g., the web browser interface 5100 displaying the content 5114 for the tab 5106-A) in addition to the first thumbnail representation 5120 of the first screenshot image 5136 and the second thumbnail representation 5124 of the second screenshot image 5134 over the web browser interface 5100 in response to detecting the third screenshot capture input.

Figure 5V:
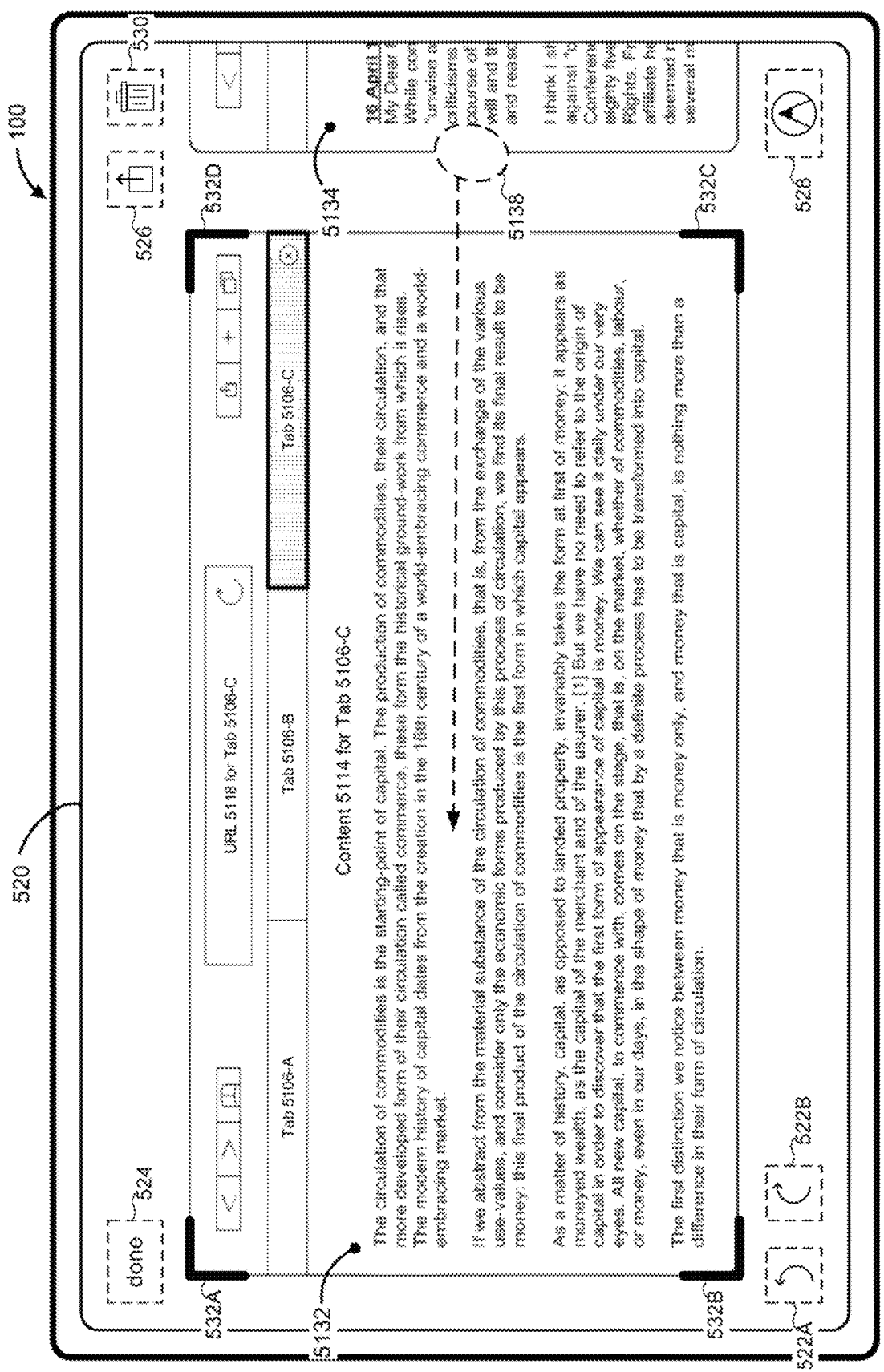

FIGS. 5U-5X show a sequence in which one of the screenshot images is edited (e.g., modified and/or annotated) within the screenshot editing interface. FIG. 5U also illustrates detecting a contact 5130 (e.g., a tap/selection gesture) at a location that corresponds to the group of thumbnail representations 5120, 5124, and 5128. FIG. 5V illustrates replacing display of the web browser interface 5100 with a screenshot editing interface 520 in response to the selection of the group of thumbnail representations 5120, 5124, and 5128 in FIG. 5U.

The screenshot editing interface 520 in FIG. 5V is similar to and adapted from the screenshot editing interface 520 in FIG. 5E. As such, FIG. 5E and FIG. 5V include similar user interfaces and elements labeled with the same reference number in both figures have the same function, with only the differences described herein for the sake of brevity. As shown in FIG. 5V, the screenshot editing interface 520 includes the third screenshot image 5132 (e.g., associated with the third thumbnail representation 5128 in FIG. 5U) within an image area bounded by cropping interface elements 532 (e.g., crop handles). As shown in FIG. 5V, the screenshot editing interface 520 includes a portion of the second screenshot image 5134 (e.g., associated with the second thumbnail representation 5124 in FIGS. 5S-5T). According to some embodiments, the user is able to individually modify the third screenshot image 5132, the second screenshot image 5134, and the first screenshot image 5136 within the screenshot editing interface 520. According to some embodiments, the user is able to navigate between the third screenshot image 5132, the second screenshot image 5134, and the first screenshot image 5136 within the screenshot editing interface 520 (e.g., with a swipe gesture as shown in FIGS. 5V-5W).

FIG. 5V also illustrates detecting a navigation gesture with a contact 5138 (e.g., a right-to-left swipe or tap-and-drag gesture) within the screenshot editing interface 520. FIG. 5W illustrates updating the screenshot editing interface 520 to show the second screenshot image 5134 (e.g., associated with the second thumbnail representation 5124 in FIGS. 5S-5T) within an image area bounded by cropping interface elements 532 (e.g., crop handles). As shown in FIG. 5W, the screenshot editing interface 520 also includes a portion of the third screenshot image 5132 (e.g., associated with the third thumbnail representation 5128 in FIG. 5U) and a portion of the first screenshot image 5136 (e.g., associated with the first thumbnail representation 5120 in FIGS. 5Q-5R).

Figure 5W:
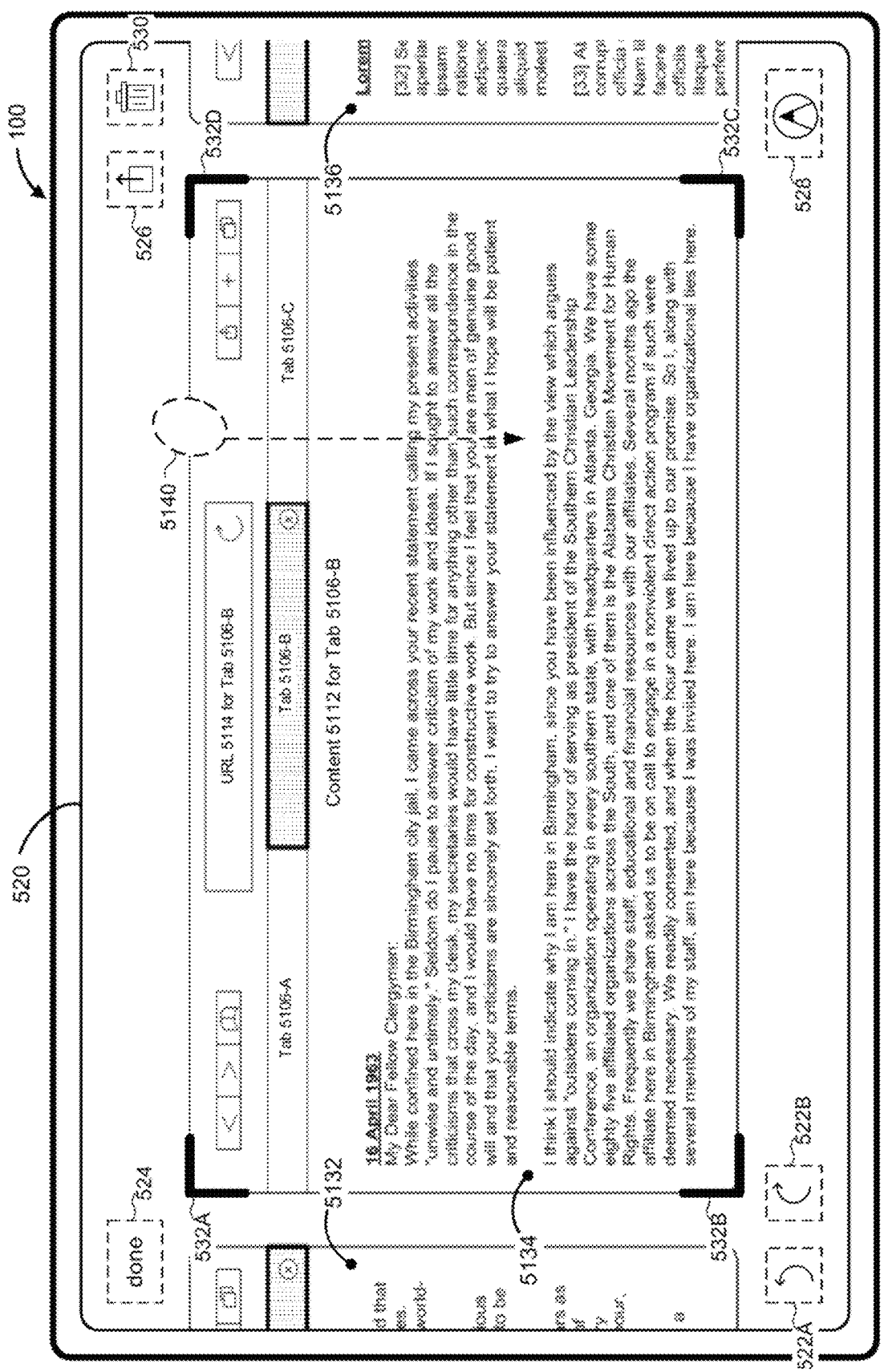
Figure 5X:
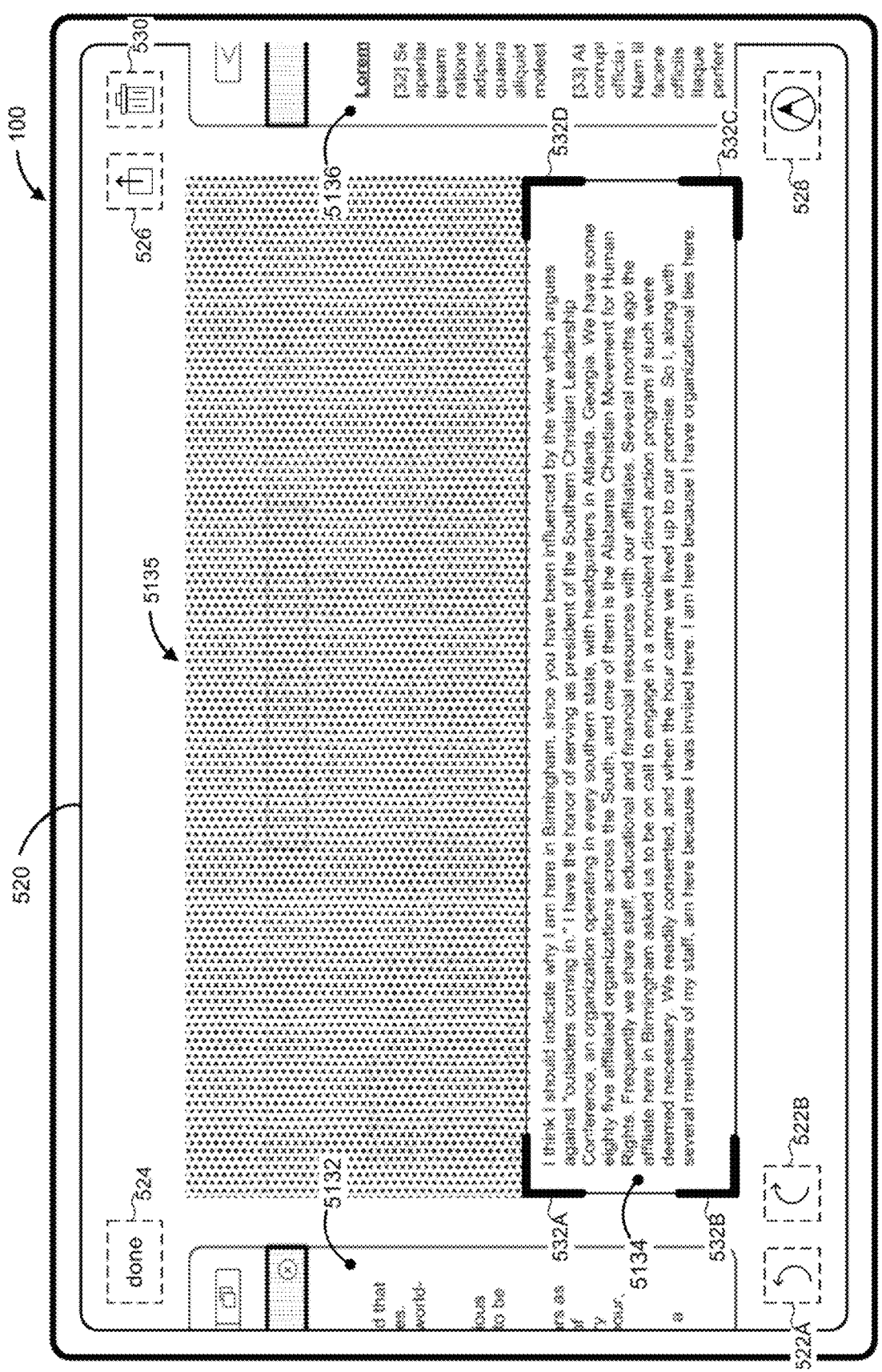

FIG. 5W also illustrates detecting a cropping input in a downward direction from a top edge of the second screenshot image 5134 with a contact 5140 (e.g., a tap-and-drag gesture). FIG. 5X illustrates displaying a cropped-out portion 5135 of the second screenshot image 5134 in response to detecting the cropping input in FIG. 5W. For example, the cropped-out portion 5135 has an opacity value and/or a blur value that is greater than the second screenshot image 5134. According to some embodiments, the device 100 adjusts the cropped-out portion 5135 based on paragraph breaks and/or carriage returns within the content 5112.

Figure 5Y:
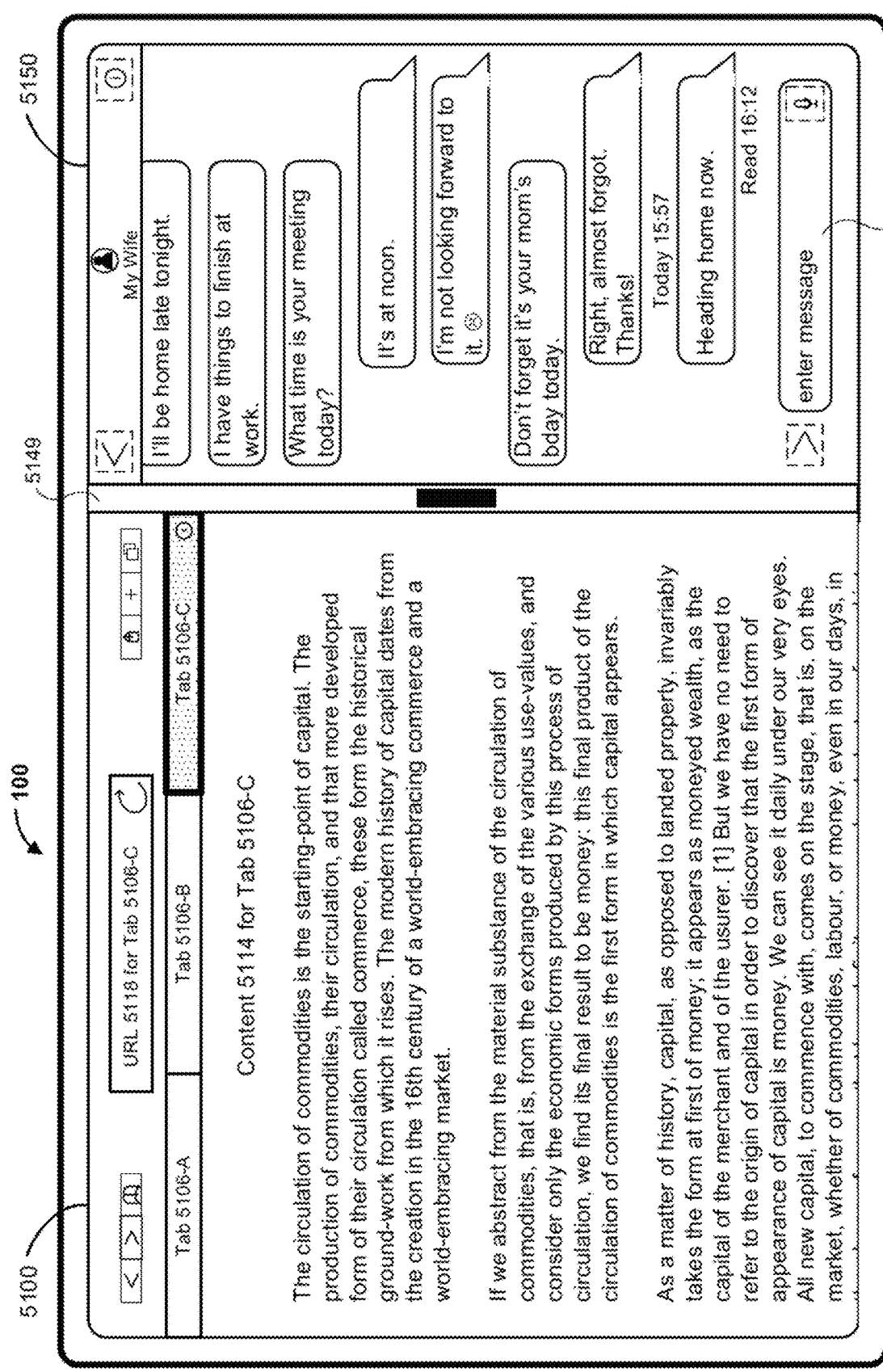

FIG. 5Y illustrates displaying a split-screen user interface that includes a first region associated with a web browser interface 5100 and a second region associated with a messaging interface 5150. For example, the web browser interface 5100 is associated with a web browser application executed by the device 100. For example, the messaging interface 5150 is associated with a messaging application (e.g., instant messaging, text messaging, etc.) executed by the device 100. As shown in FIG. 5Y, the first and second regions are separated by a divider element 5149. According to some embodiments, the device 100 updates at least one dimension (e.g., width) of the first and second regions in response to detecting a user input that interacts with the divider element 5149 (e.g., a tap-and-drag gesture in a left-to-right or right-to-left direction).

The web browser interface 5100 in FIG. 5Y is similar to and adapted from the web browser interface 5100 in FIG. 5T. As such, FIG. 5T and FIG. 5Y include similar user interfaces and elements labeled with the same reference number in both figures have the same function, with only the differences described herein for the sake of brevity. The messaging interface 5150 includes a message input field 5152 provided to receive one or more input characters (e.g., via a software keyboard or speech-to-text application), images, emoticons, and/or the like for a new message within the current messaging thread.

Figure 5Z:
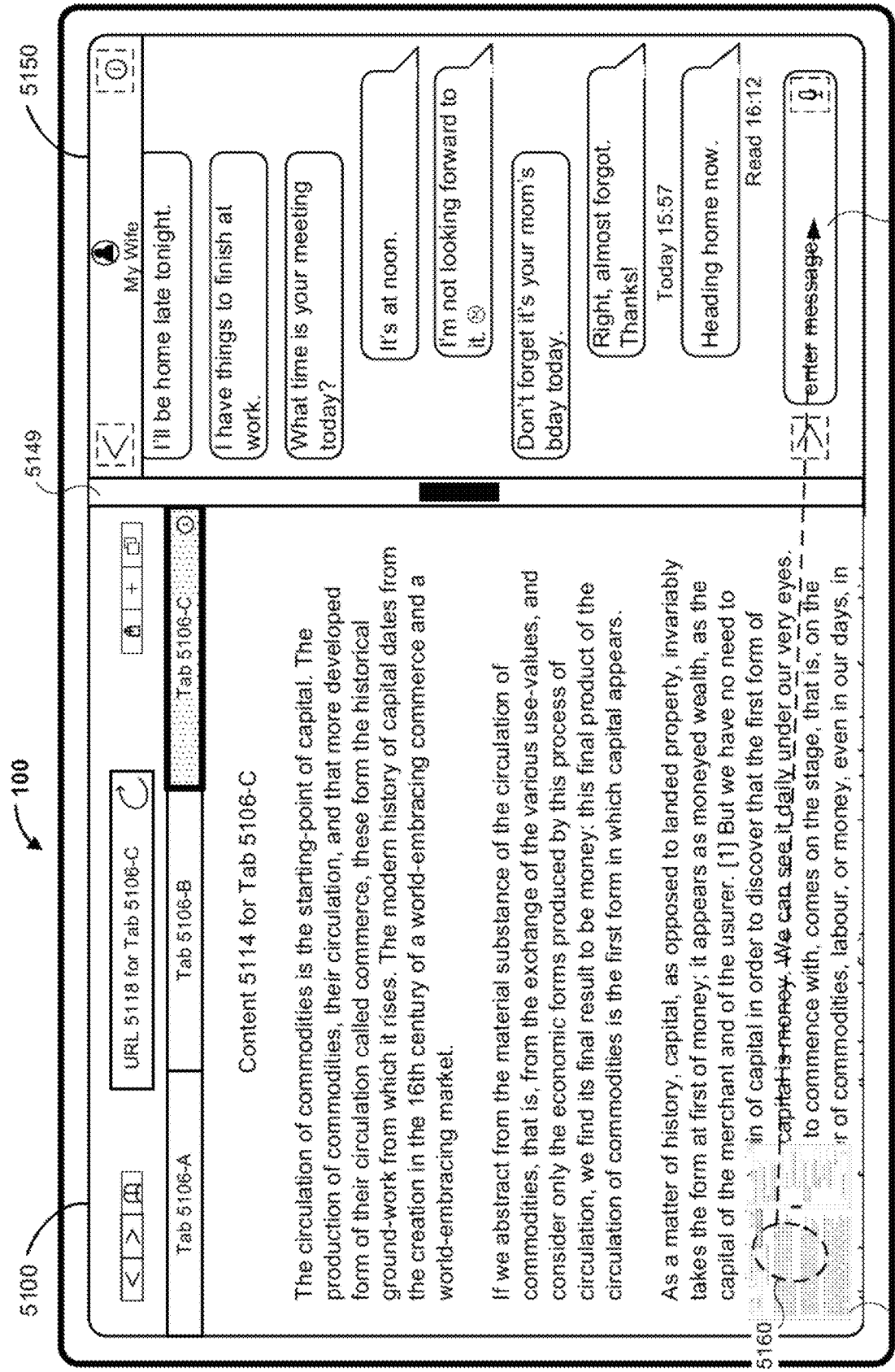
Figure 5A:
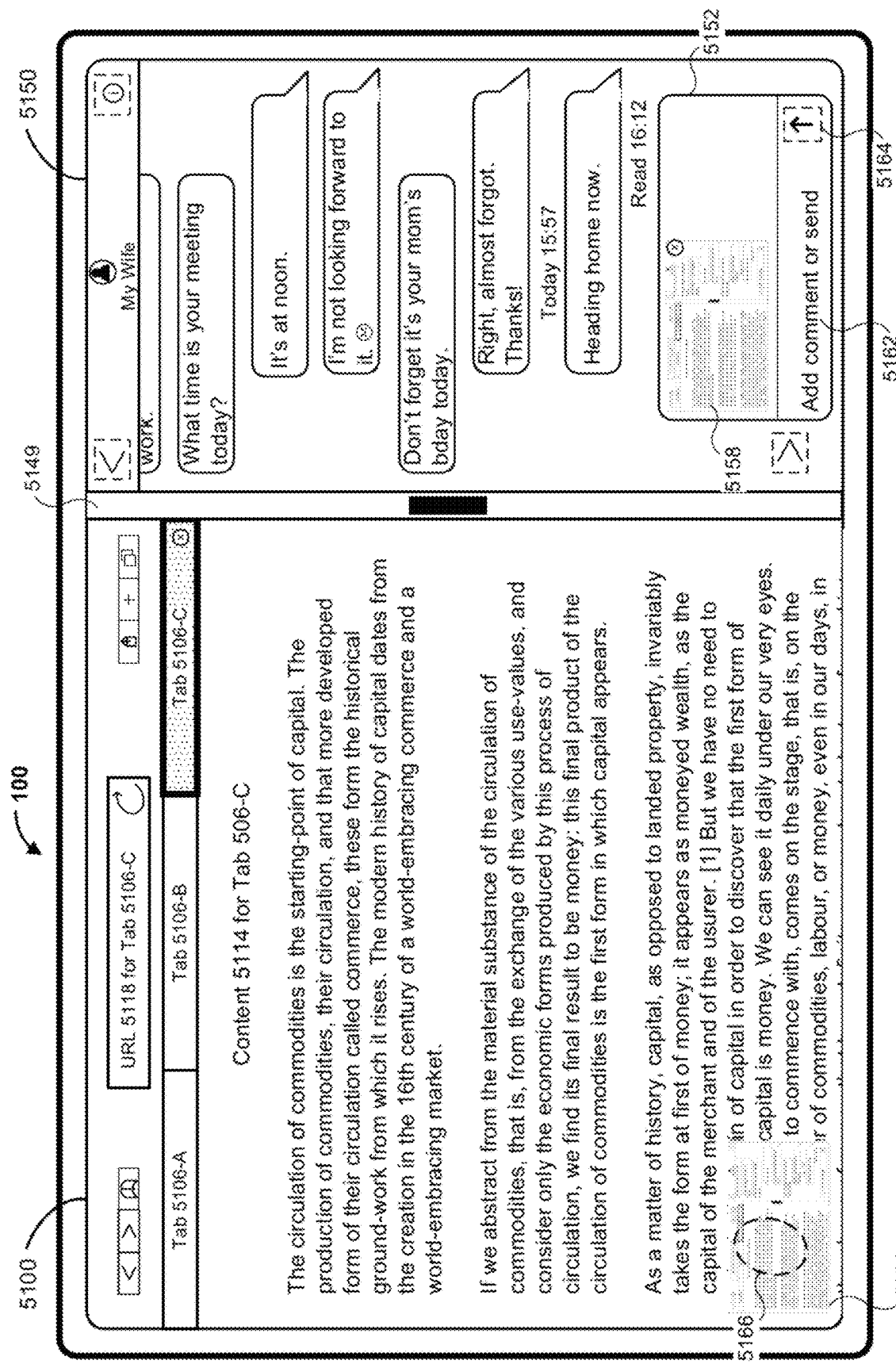
Figure 5B:
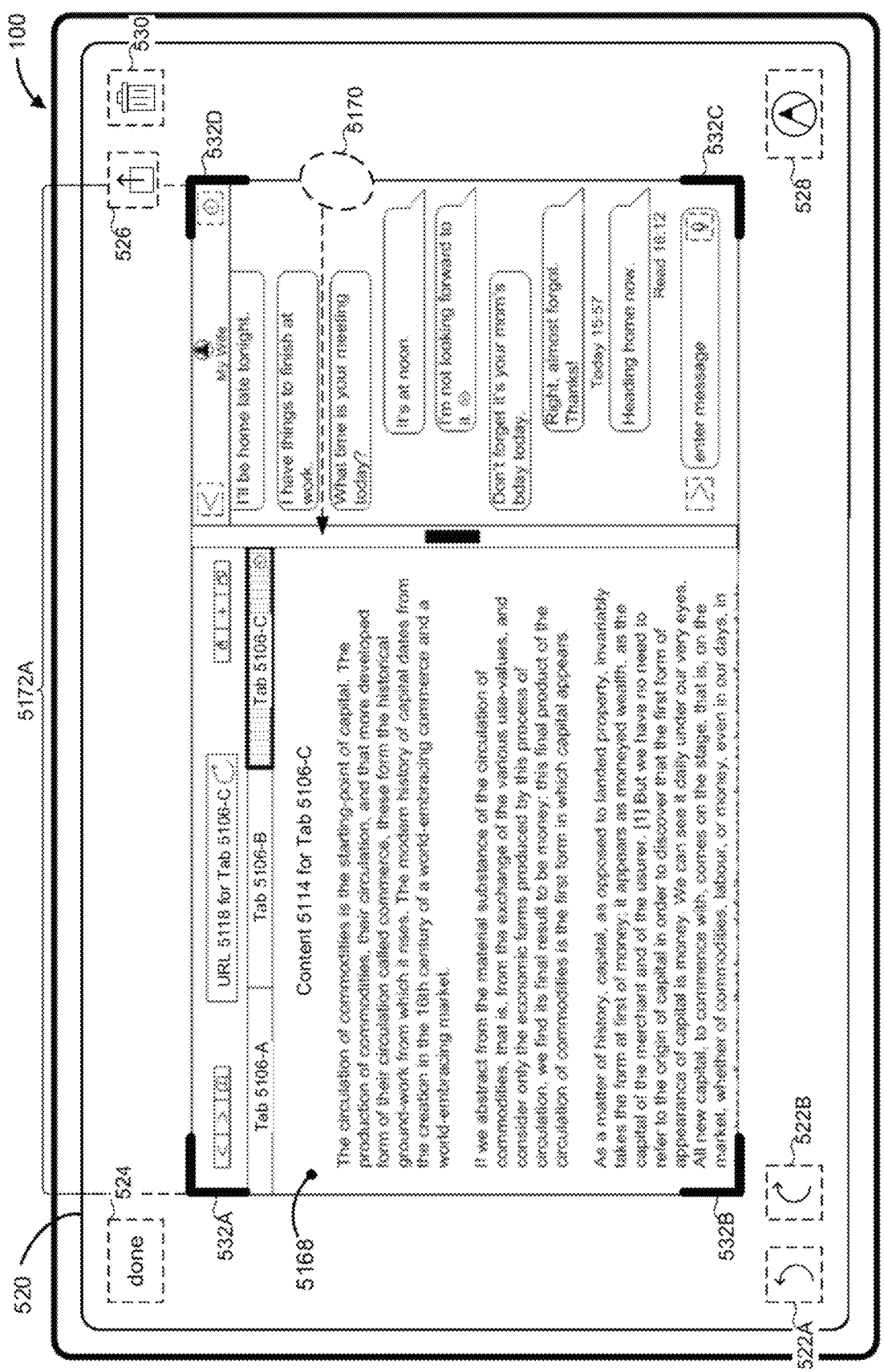
Figure 5C:
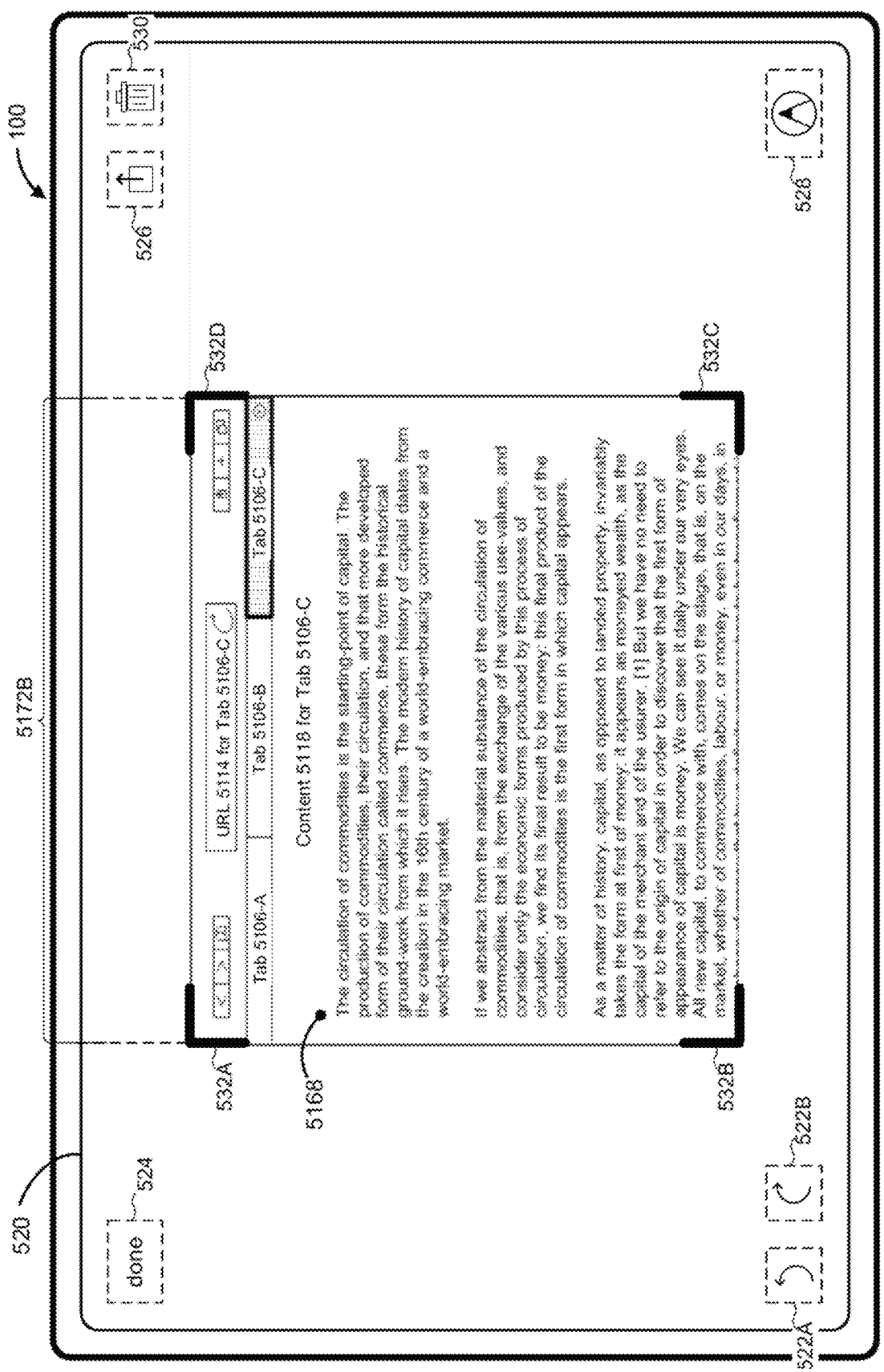

FIGS. 5Y-5Z show a sequence in which a thumbnail representation of a screenshot image is overlaid on a split-screen user interface. For example, the device 100 detects a screenshot capture input such as a predefined gesture, voice command, key combination (e.g., print screen key, power+home button combination, etc.), and/or the like. FIG. 5Z illustrates displaying a thumbnail representation 5158 of a screenshot image 5168 (e.g., the web browser interface 5100 displaying the content 5114 for the tab 5106-C) over the web browser interface 5100 in response to detecting the screenshot capture input.

FIGS. 5Z-5AA show a sequence in which the thumbnail representation of the screenshot image is dragged-and-dropped into one of the regions of the split-screen user interface. FIG. 5Z also illustrates detecting a drag-and-drop gesture with a contact 5160 that drags the thumbnail representation 5158 of the screenshot image 5168 into the second region associated with the messaging interface 5150 and drops the thumbnail representation 5158 of the screenshot image 5168 into the message input field 5152. FIG. 5AA illustrates displaying the thumbnail representation 5158 of the screenshot image 5168 within the message input field 5152 in response to detecting the drag-and-drop gesture in FIG. 5Z. As shown in FIG. 5AA, the message input field 5152 includes a comment field 5162 for adding a comment to the new message and a send affordance 5164 provided to send the new message in response to selection thereof.

FIGS. 5AA-5CC show a sequence in which the screenshot image is edited (e.g., modified and/or annotated) within the screenshot editing interface. FIG. 5AA also illustrates detecting a contact 5166 (e.g., a tap/selection gesture) at a location that corresponds to the thumbnail representation 5158 of the screenshot image 5168 within the first region associated with the web browser interface 5100. FIG. 5BB illustrates replacing display of the split-screen user interface with a screenshot editing interface 520 in response to the selection of the thumbnail representation 5158 of the screenshot image 5168 within the first region in FIG. 5AA.

The screenshot editing interface 520 in FIG. 5BB is similar to and adapted from the screenshot editing interface 520 in FIG. 5E. As such, FIG. 5E and FIG. 5BB include similar user interfaces and elements labeled with the same reference number in both figures have the same function, with only the differences described herein for the sake of brevity. As shown in FIG. 5BB, the screenshot editing interface 520 includes the screenshot image 5168 within an image area bounded by cropping interface elements 532 (e.g., crop handles).

FIG. 5BB also illustrates detecting a cropping input in a right-to-left direction from a right edge of the screenshot image 5168 with a contact 5170 (e.g., a tap-and-drag gesture). As shown in FIG. 5BB, a first dimension (e.g., width) of the screenshot image 5168 has a first value 5172A. FIG. 5CC illustrates displaying a cropped version of the screenshot image 5168 in response to detecting the cropping input in FIG. 5BB. As shown in FIG. 5CC, the first dimension (e.g., width) of the screenshot image 5168 has a second value 5172B that is less than the first value 5172A in FIG. 5BB. According to some embodiments, the device 100 adjusts the cropped version of the screenshot image 5168 based on the divider element 5149 and the first and second regions of the split-screen user interface.

FIGS. 6A-6N illustrate example user interfaces for expanding a screenshot image within a screenshot editing interface in accordance with some embodiments. The user interfaces in these figures are used to illustrate the processes described below, including the process in FIGS. 8A-8C. Although some of the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

FIG. 6A illustrates displaying a web browser interface 600 associated with a web browser application executed by the device 100. As shown in FIG. 6A, the web browser interface 600 includes a toolbar region 603, a tab bar region 605, and a content region 607. In FIG. 6A, the toolbar region 603 includes a back affordance 615a provided to display a previous web page in response to selection thereof (e.g., with a contact), a next affordance 615b provided to display a next web page in response to selection thereof, and a book mark affordance 615c provided to replace display of the web browser interface 600 with a bookmark management interface in response to selection thereof.

Figure 6B:
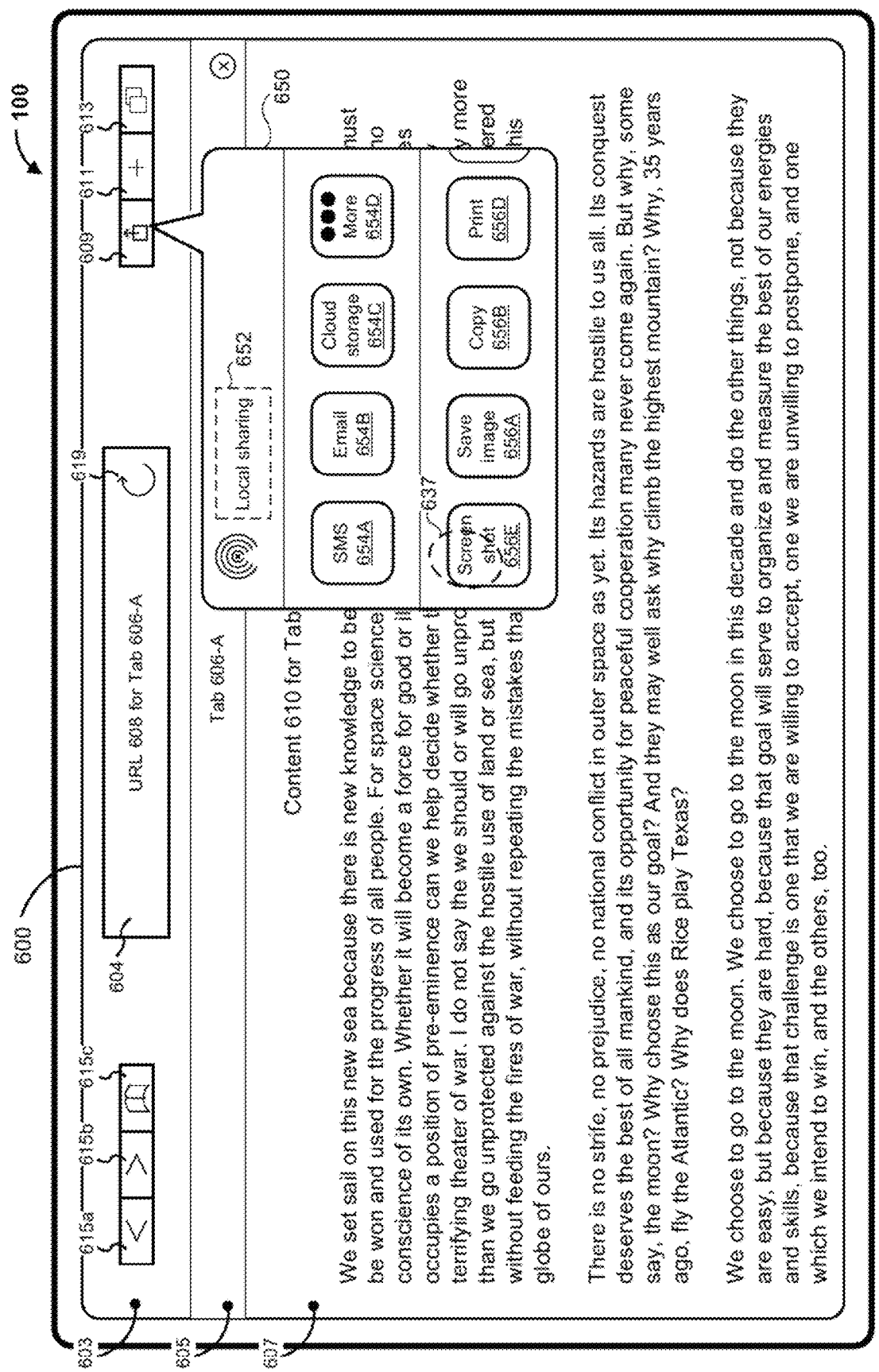

In FIG. 6A, the toolbar region 603 also includes an address bar 604 displaying URL 608 for tab 606-A and a refresh affordance 619 provided to refresh/reload the current web page in response to selection thereof (e.g., with a contact). In FIG. 6A, the toolbar region 603 further includes a sharing affordance 609 provided to display a transport interface over the web browser interface 600 in response to selection thereof (e.g., as shown in FIGS. 6A-6B), an add tab affordance 611 provided to add a tab to the web browser interface 600 in response to selection thereof (e.g., with a contact), and a tab view affordance 613 provided to replace display of the web browser interface 600 with a tab management interface in response to selection thereof. In FIG. 6A, the tab bar region 605 includes a user-selectable tab 606-A, and the content region 607 includes content 610 for the tab 606-A.

Figure 6C:
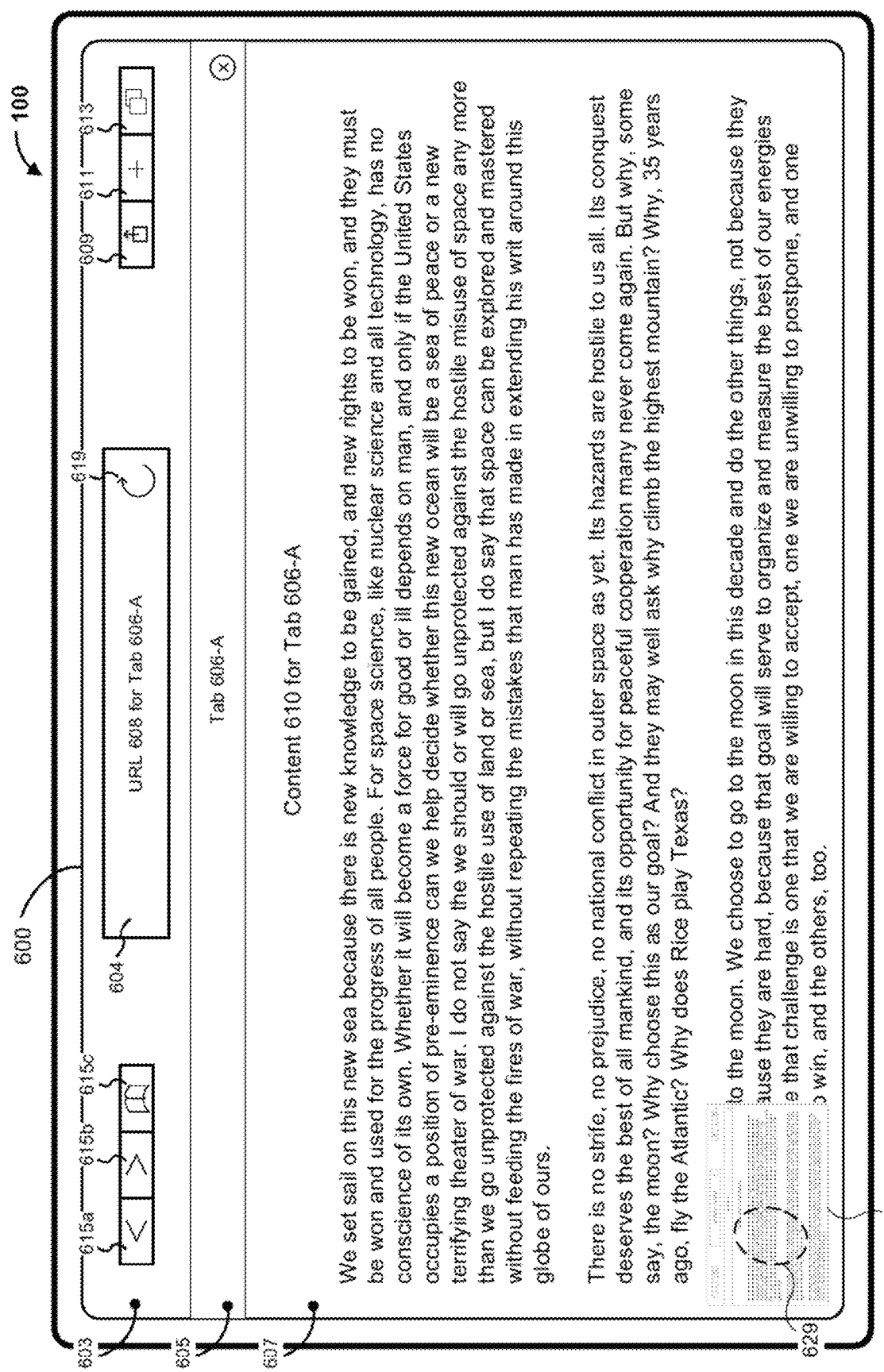

FIGS. 6A-6C show a sequence in which a thumbnail representation of a screenshot image is overlaid on the web browser interface. FIG. 6A illustrates detecting a contact 625 (e.g., a tap/selection gesture) at a location corresponding to the sharing affordance 609 (e.g., the share affordance). FIG. 6B illustrates displaying a transport interface 650 over the web browser interface 600 in response to the selection of the sharing affordance 609 in FIG. 6A.

As shown in FIG. 6B, the transport interface 650 includes a local sharing affordance 652 provided to share the web page via a local interface (e.g., BLUETOOTH, NFC, WiFi, and/or the like), sharing affordances 654A, 654B, 654C, and 654D (sometimes collectively referred to herein as the "sharing affordances 654") provided to share the web page via corresponding communication means (e.g., SMS, email, cloud storage, and others), and operation affordances 656E, 656A, 656B, and 656D (sometimes collectively referred to herein as the "operation affordances 656") provided to perform corresponding operations on the web page (e.g., screenshot capture, save, copy, print, etc.).

FIG. 6B also illustrates detecting a contact 637 (e.g., a tap/selection gesture) at a location corresponding to the operation affordance 656E (e.g., the screenshot capture operation). FIG. 6C illustrates displaying a thumbnail representation 627 of a screenshot image 640 over the web browser interface 600 in response to the selection of the operation affordance 656E in FIG. 6B. For example, the screenshot image 640 is shrunk to generate the thumbnail representation 627 based on predefined dimensions, a predefined aspect ratio, and/or a predefined resolution.

Figure 6D:
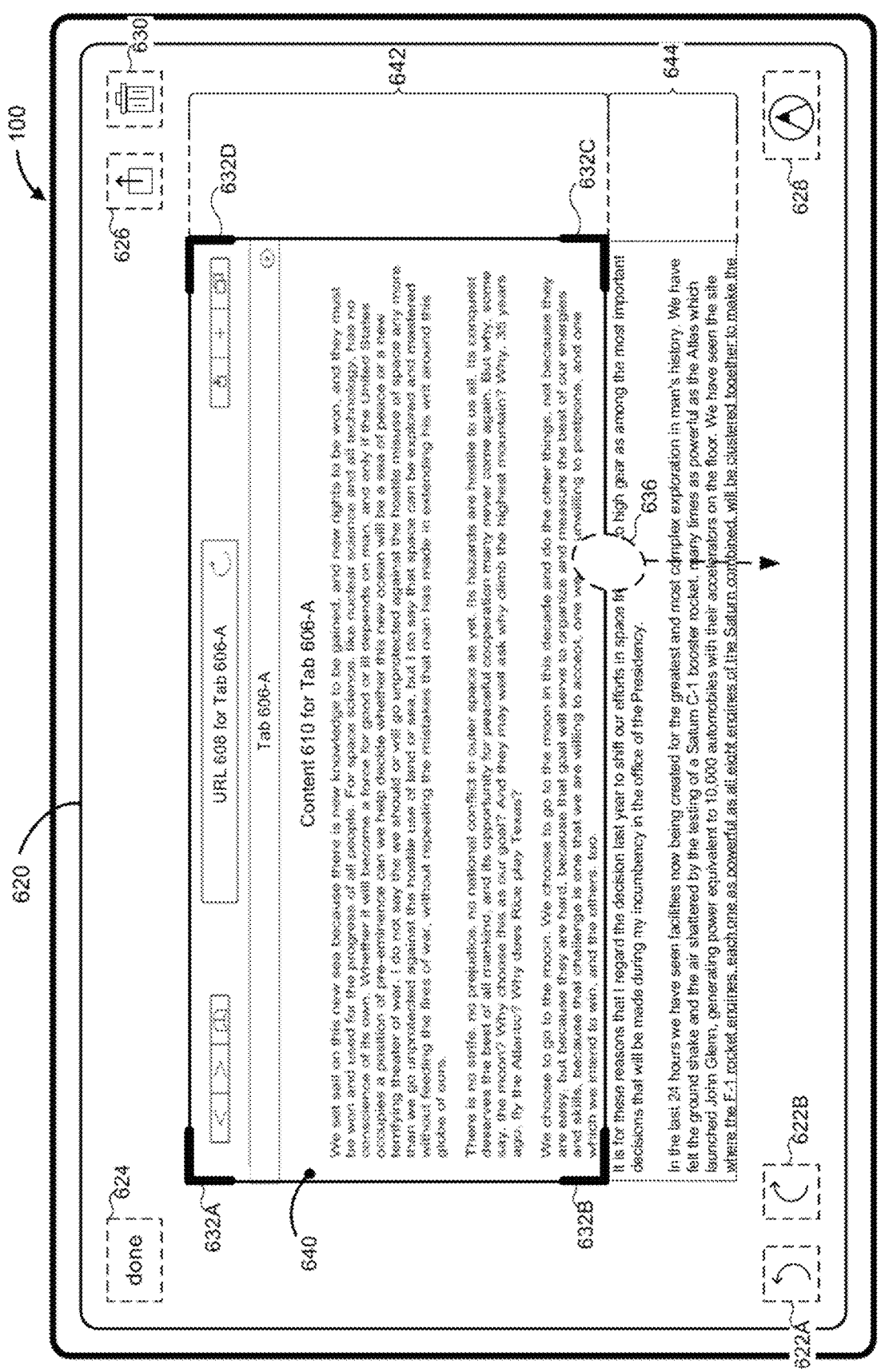
Figure 6E:
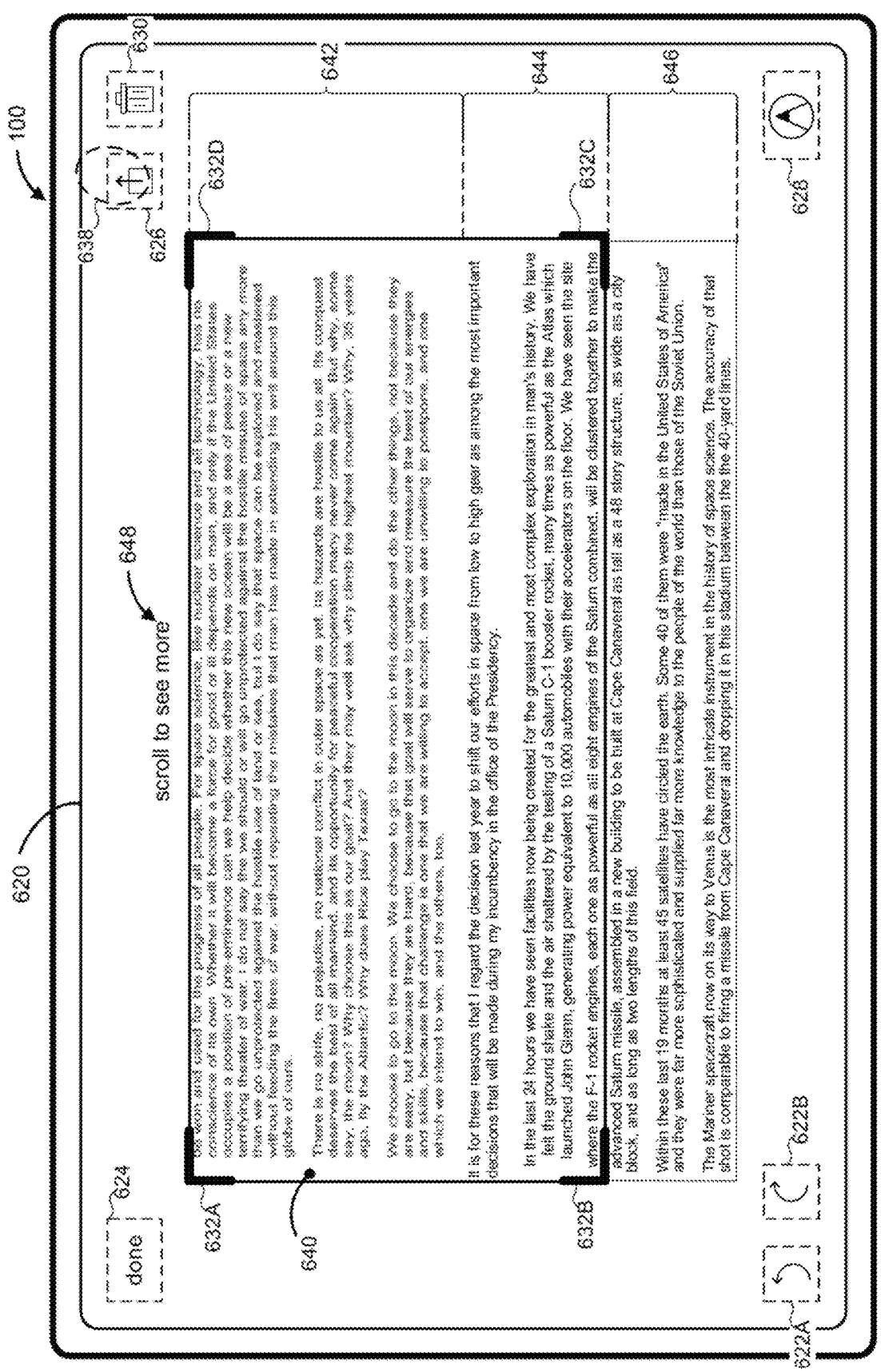

FIGS. 6C-6E show a sequence in which the screenshot image is expanded within the screenshot editing interface. FIG. 6C also illustrates detecting a contact 629 (e.g., a tap/selection gesture) at a location that corresponds to the thumbnail representation 627 of the screenshot image 640. FIG. 6D illustrates replacing display of the web browser interface 600 with a screenshot editing interface 620 in response to the selection of the thumbnail representation 627 of the screenshot image 640 in FIG. 6C.

As shown in FIG. 6D, the screenshot editing interface 620 includes the screenshot image 640 within an image area bounded by cropping interface elements (e.g., crop handles) 632A, 632B, 632C, and 632D (sometimes collectively referred to herein as the "cropping interface elements 632"). In FIG. 6D, a first portion 642 of the content associated with the URL 608 (e.g., content that was displayed within the web browser interface 600 in FIG. 6A) is displayed within the image area bounded by the cropping interface elements 632. Additionally, in FIG. 6D, a second portion 644 of the content associated with the URL 608 (e.g., content that was not displayed within the web browser interface 600 in FIG. 6A) is displayed outside of the image area bounded by the cropping interface elements 632.

According to some embodiments, the second portion 644 of the content associated with the URL 608 is pre-fetched by the web browser application. According to some embodiments, the second portion 644 of the content associated with the URL 608 is optionally displayed within the screenshot editing interface 620 in FIG. 6D to indicate that the user has the option to expand the screenshot image to include content that was not displayed within the web browser interface 600 in FIG. 6A.

As shown in FIG. 6D, the screenshot editing interface 620 includes affordances 622A, 622B, 624, 626, 628, and 630. According to some embodiments, in response to activation (e.g., selection with a contact) of the affordance 622A (e.g., the undo affordance), the device 100 reverts one or more previous modifications to the screenshot image 640. According to some embodiments, in response to activation (e.g., selection with a contact) of the affordance 622B (e.g., the redo affordance), the device 100 reapplies one or more previously reverted modifications to the screenshot image 640. According to some embodiments, in response to activation (e.g., selection with a contact) of the affordance 624 (e.g., the done affordance), the device 100 replaces display of the screenshot editing interface 620 with the web browser interface 600 in FIG. 6C. In some embodiments, the device 100 also saves/stores the modified screenshot image in addition to the unmodified screenshot image in an image storage repository (e.g., the camera roll or image/media content library) in response to the selection of the affordance 624. In some embodiments, the device 100 periodically saves/stores intermediate versions of the modified screenshot image in the image storage repository prior to detecting selection of the affordance 624.

According to some embodiments, in response to activation (e.g., selection with a contact) of the affordance 626 (e.g., the share affordance), the device 100 displays a transport interface overlaid on the screenshot editing interface 620 provided to share the screenshot image 640 via one or more communication means, such as email, SMS, etc., and/or to perform one of a plurality of operations on the web page such as a copy operation, a print operation, etc. (e.g., as shown in FIGS. 6E-6F and FIGS. 6L-6M). According to some embodiments, in response to activation (e.g., selection with a contact) of the affordance 628 (e.g., the markup affordance), the device 100 displays a plurality of markup tools and a color/appearance palate within the screenshot editing interface 620 (e.g., as shown in FIGS. 5F-5G).

According to some embodiments, in response to activation (e.g., selection with a contact) of the affordance 630 (e.g., the deletion affordance), the device 100 causes the modified screenshot image to be deleted from the image storage repository. In some embodiments, the device 100 also deletes the unmodified screenshot image from the image storage repository in response to the selection of the affordance 630. In some embodiments, the device 100 replaces display of the screenshot editing interface 620 with the web browser interface 600 in FIG. 6A in response to the selection of the affordance 630.

FIG. 6D also illustrates detecting an expansion input in a downward direction from a bottom edge of the screenshot image 640 with a contact 636 (e.g., a tap-and-drag gesture). As shown in FIG. 6D, the screenshot image 640 includes the first portion 642 of the content associated with the URL 608 displayed within the image area bounded by cropping interface elements 632.

FIG. 6E illustrates displaying the first portion 642 and the second portion 644 within the image area bounded by cropping interface elements 632 in response to detecting the expansion input in FIG. 6D. As such, in FIG. 6E, the screenshot image 640 includes the first portion 642 of the content associated with the URL 608 and the second portion 644 of the content associated with the URL 608. As shown in FIG. 6E, the dimensions of the screenshot image 640 are maintained between FIGS. 6D and 6E. As such, the device appends the second portion 644 of the content associated with the URL 608 to the first portion 642 of the content associated with the URL 608 and scrolls the screenshot image. As shown in FIG. 6E, the screenshot editing interface 620 includes a "scroll to see more" indicator 648 to alert the user that a portion of the screenshot image has been scrolled and may be viewed in response to detecting a scroll input within the screenshot interface 620 (e.g., a voice command, or an upward or downward swipe gesture over the screenshot image 640).

Additionally, in FIG. 6E, a third portion 646 of the content associated with the URL 608 (e.g., content that was not displayed within the web browser interface 600 in FIG. 6A) is displayed outside of the image area bounded by the cropping interface elements 632. According to some embodiments, the third portion 646 of the content associated with the URL 608 is pre-fetched by the web browser application. According to some embodiments, the third portion 646 of the content associated with the URL 608 is optionally displayed within the screenshot editing interface 620 in FIG. 6E to indicate that the user has the option to further expand the screenshot image to include content that was not displayed within the web browser interface 600 in FIG. 6A.

Figure 6F:
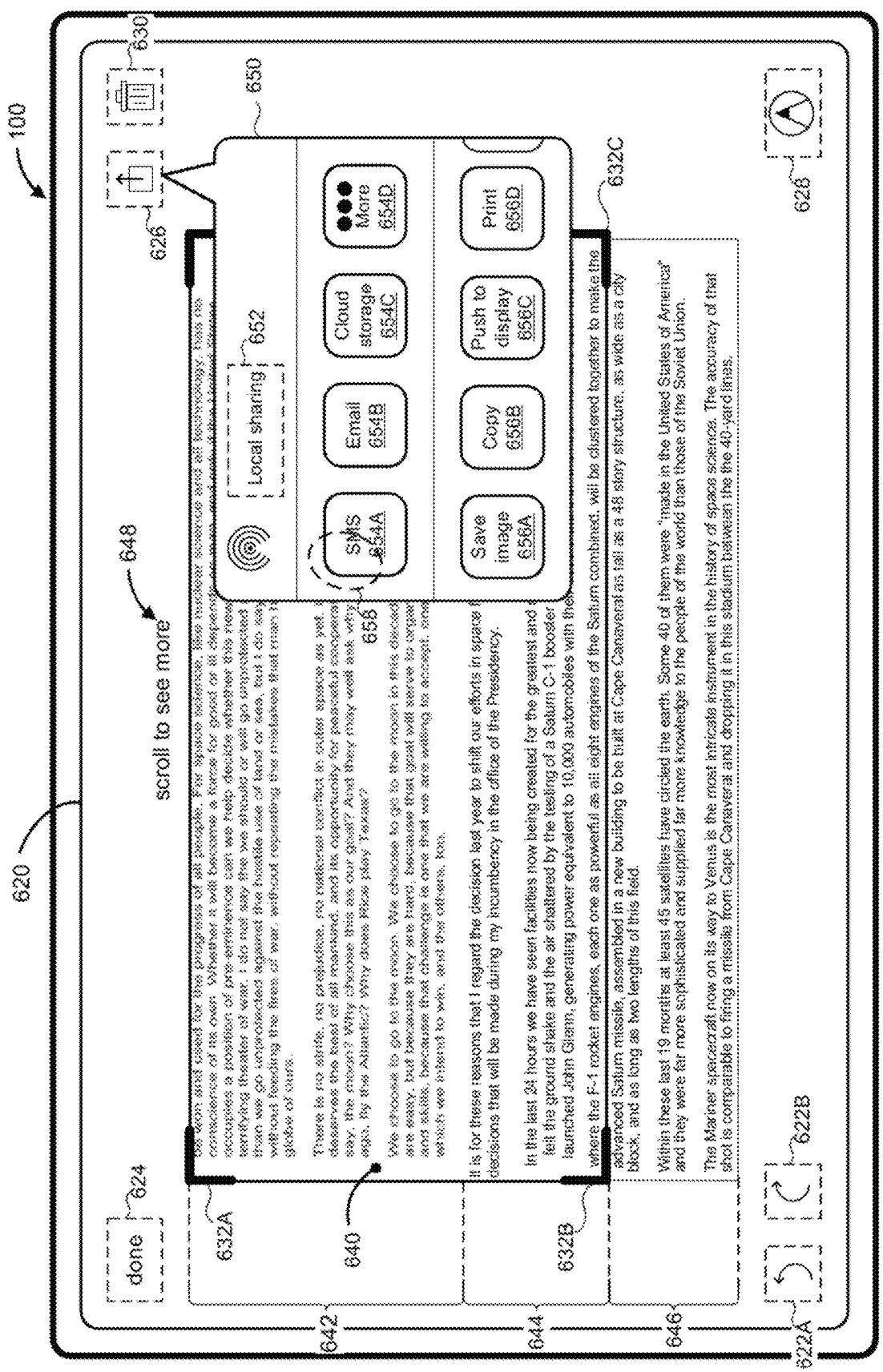
Figure 6G:
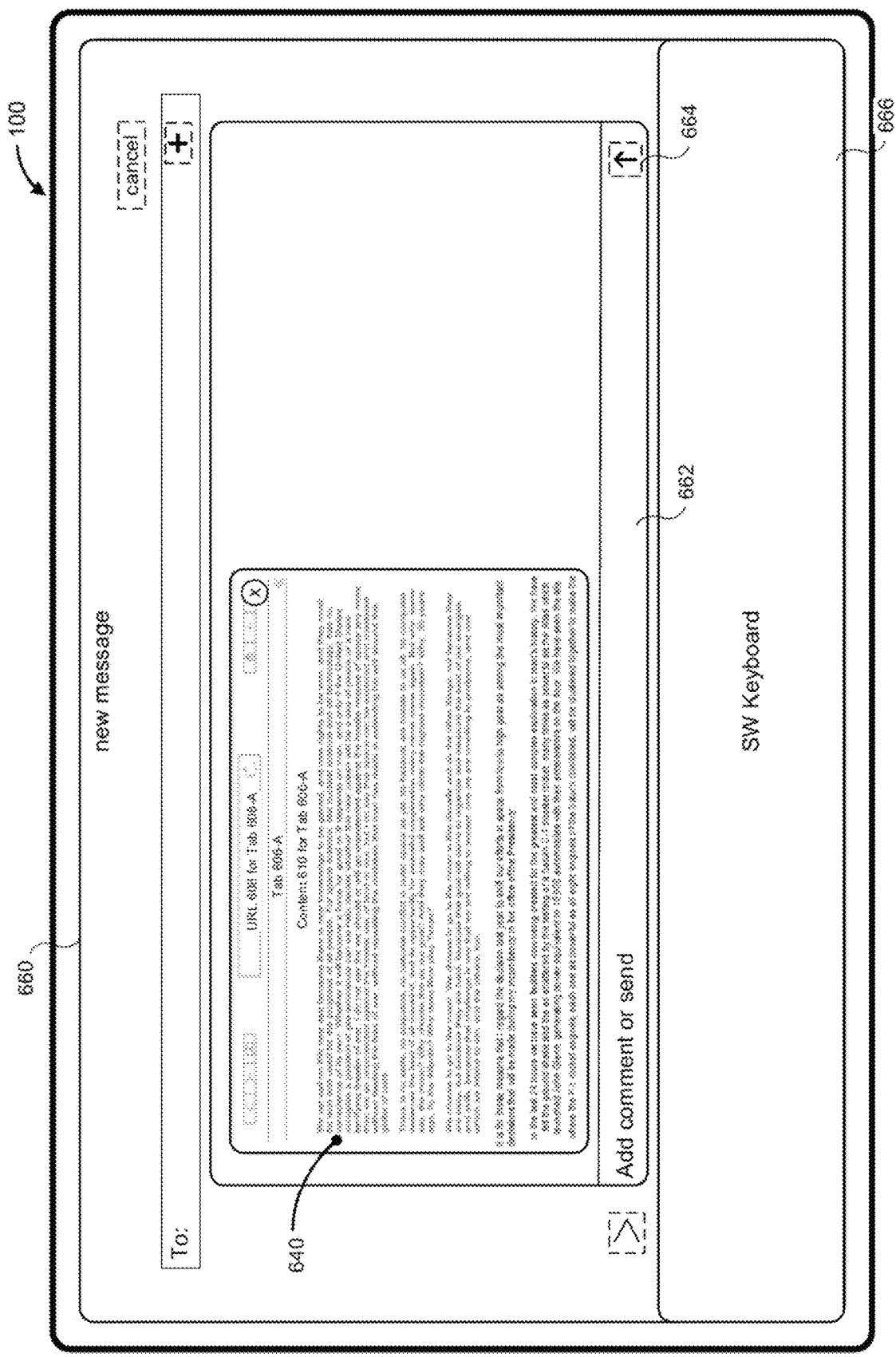

FIGS. 6E-6G show a sequence in which the expanded screenshot image is shared via a message. FIG. 6E also illustrates detecting a contact 638 (e.g., a tap/selection gesture) at a location corresponding to the affordance 626

(e.g., the share affordance). FIG. 6F illustrates displaying the transport interface 650 over the screenshot editing interface 620 in response to detecting selection of the affordance 626 in FIG. 6E. The web transport interface 650 in FIG. 6F is similar to and adapted from the transport interface 650 in FIG. 6B. As such, FIG. 6B and FIG. 6F include similar user interfaces and elements labeled with the same reference number in both figures have the same function, with only the differences described herein for the sake of brevity.

FIG. 6F also illustrates detecting a contact 658 (e.g., a tap/selection gesture) at a location corresponding to the sharing affordance 654A (e.g., the SMS sharing affordance). FIG. 6G illustrates replacing display of the screenshot editing interface 620 with a message composition interface 660 in response to the selection of the sharing affordance 654A in FIG. 6F. As shown in FIG. 6G, the message composition interface 660 includes the screenshot image 640 (e.g., as expanded in FIGS. 6D-6E), a comment field 662 for adding a comment to the new message via the software (SW) keyboard 666 (or other input means), and a send affordance 664 provided to send the new message in response to selection thereof.

Figure 6H:
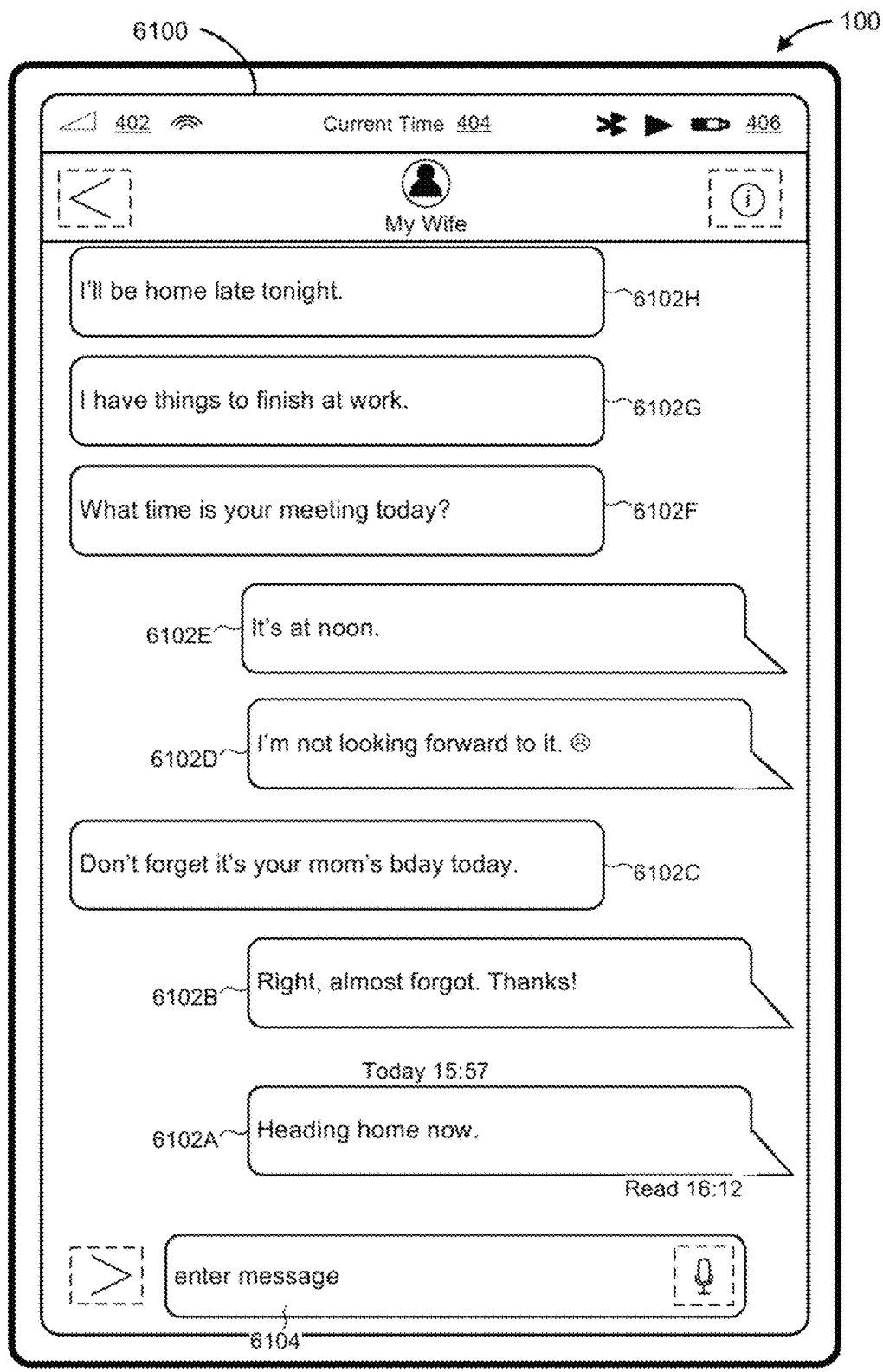

FIG. 6H illustrates displaying a messaging interface 6100 associated with a messaging application (e.g., instant messaging, text messaging, etc.) executed by the device 100. As shown in FIG. 6H, the messaging interface 6100 includes a plurality of messages 6102A, 6102B, 6102C, 6102D, 6102E, 6102F, 6102G, and 6102H (sometimes collectively referred to herein as the "messages 6102"). As shown in FIG. 6H, the messaging interface 6100 also includes a message input field 6104 provided to receive one or more input characters (e.g., via a software keyboard or speech-to-text application), images, emoticons, and/or the like for a new message within the current messaging thread.

Figure 6I:
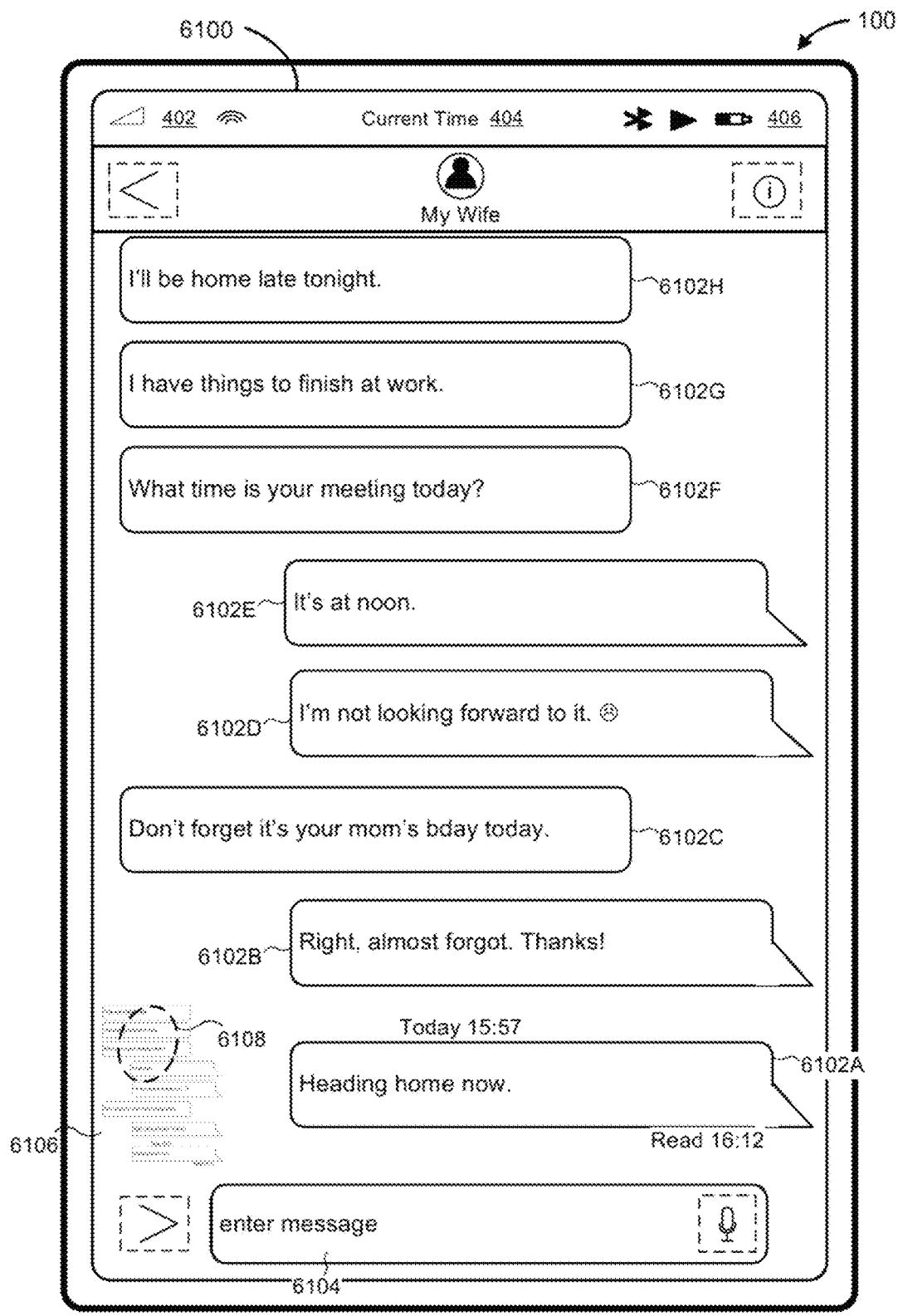

FIGS. 6H-6I show a sequence in which a thumbnail representation of a screenshot image is overlaid on the messaging interface. For example, the device 100 detects a screenshot capture input such as a predefined gesture, voice command, key combination (e.g., print screen key, power+home button combination, etc.), and/or the like. FIG. 6I illustrates displaying a thumbnail representation 6106 of a screenshot image 6110 overlaid on the messaging interface 6100 in response to detecting the screenshot capture input. For example, the screenshot image 6110 corresponds to the messaging interface 6100 displayed in FIG. 6H. For example, the screenshot image 6110 is shrunk to generate the thumbnail representation 6106 based on predefined dimensions, a predefined aspect ratio, and/or a predefined resolution.

Figure 6J:
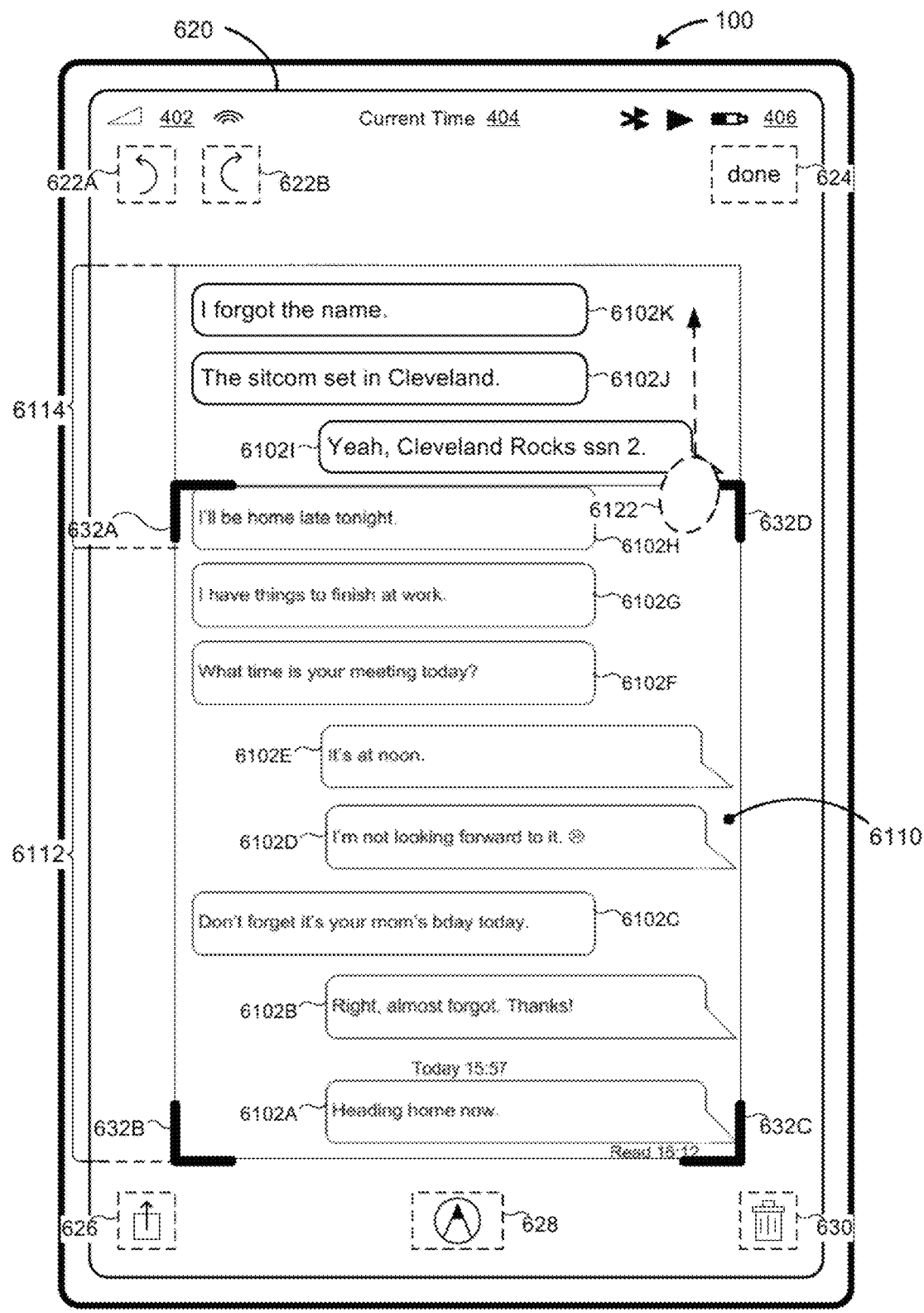

FIGS. 6I-6L show a sequence in which the screenshot image is expanded within the screenshot editing interface. FIG. 6I also illustrates detecting a contact 6108 (e.g., a tap/selection gesture) at a location that corresponds to the thumbnail representation 6106 of the screenshot image 6110. FIG. 6J illustrates replacing display of the messaging interface 6100 with a screenshot editing interface 620 in response to the selection of the thumbnail representation 6106 of the screenshot image 6110 in FIG. 6I.

The screenshot editing interface 620 in FIG. 6J is similar to and adapted from the screenshot editing interface 620 in FIG. 6D. As such, FIG. 6D and FIG. 6J include similar user interfaces and elements labeled with the same reference number in both figures have the same function, with only the differences described herein for the sake of brevity.

As shown in FIG. 6J, the screenshot editing interface 620 includes the screenshot image 6110 within an image area bounded by cropping interface elements 632 (e.g., crop handles). In FIG. 6J, a first portion 6112 of the messaging content associated with messages 6102A, 6102B, 6102C, 6102D, 6102E, 6102F, 6102G, and 6102H (e.g., content that was displayed within the messaging interface 610 in FIG. 6H) is displayed within the image area bounded by the cropping interface elements 632. Additionally, in FIG. 6J, a second portion 6114 of the messaging content associated with messages 6102I, 6102J, and 6102K (e.g., content that was not displayed within the messaging interface 610 in FIG. 6H) is displayed outside of the image area bounded by the cropping interface elements 632.

According to some embodiments, the second portion 6114 of the messaging content associated with messages 6102I, 6102J, and 6102K is pre-fetched by the messaging application. According to some embodiments, the second portion 6114 of the messaging content associated with messages 6102I, 6102J, and 6102K is optionally displayed within the screenshot editing interface 620 in FIG. 6J to indicate that the user has the option to expand the screenshot image to include messaging content that was not displayed within the messaging interface 6100 in FIG. 6H.

FIG. 6J also illustrates detecting an expansion input in an upward direction from a top edge of the screenshot image 6110 with a contact 6122 (e.g., a tap-and-drag gesture). As shown in FIG. 6J, the screenshot image 6110 includes the first portion 6112 of the messaging content associated with messages 6102A, 6102B, 6102C, 6102D, 6102E, 6102F, 6102G, and 6102H displayed within the image area bounded by cropping interface elements 632.

Figure 6K:
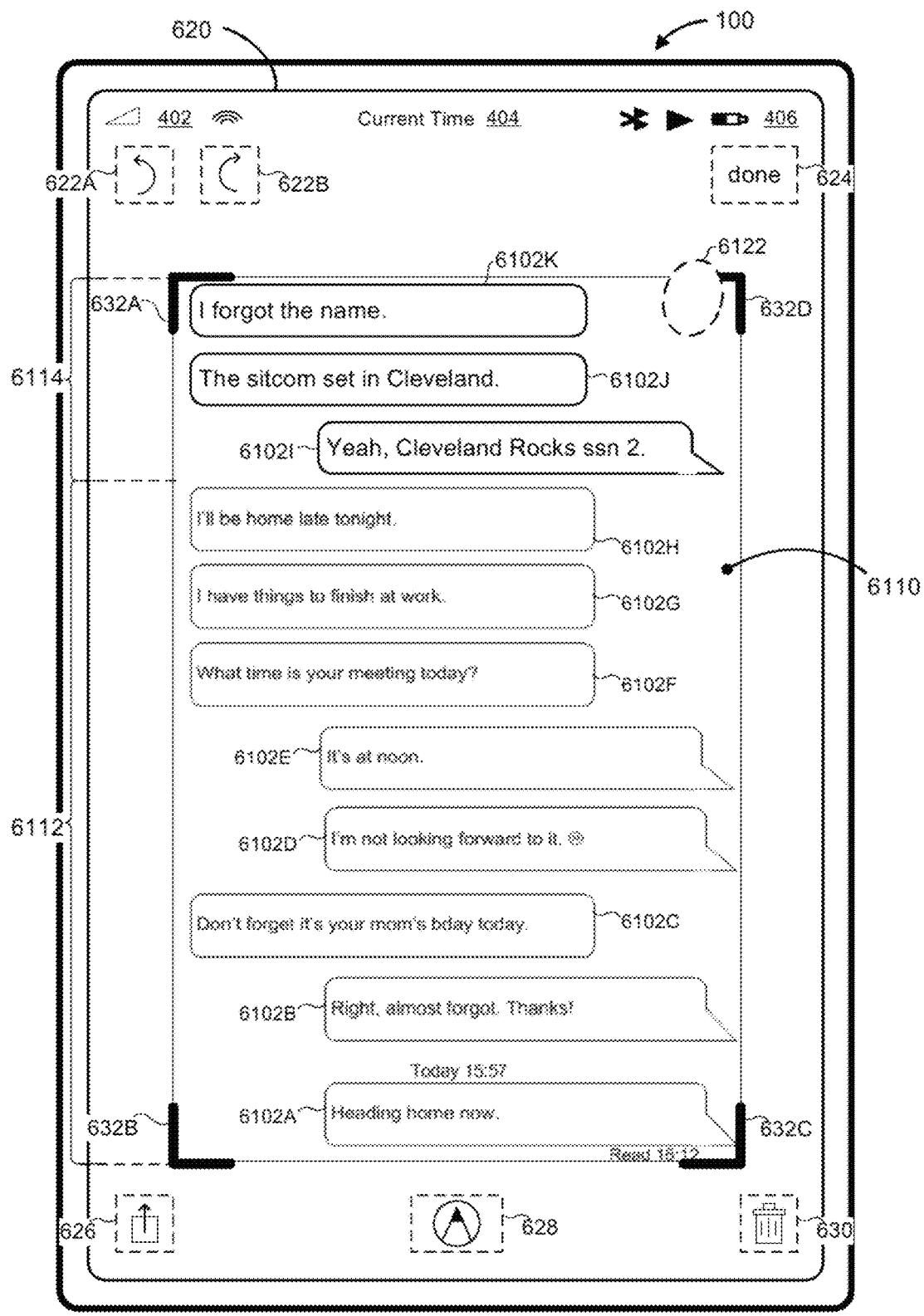
Figure 6L:
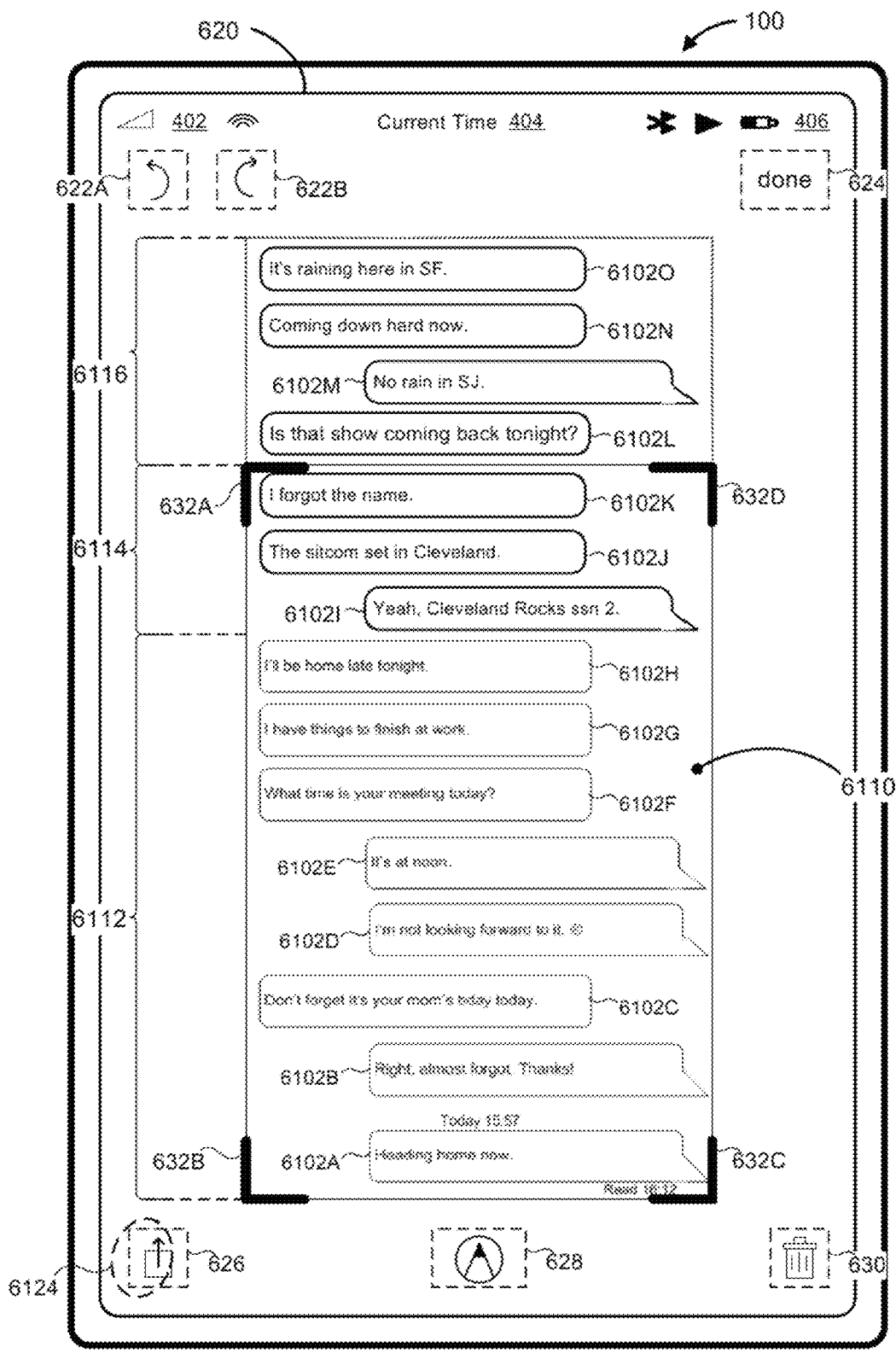

FIG. 6K illustrates displaying the first portion 6112 and the second portion 6114 within the image area bounded by cropping interface elements 632 in response to detecting the extent of the dragging portion of the expansion input in FIG. 6J (but not lift-off of the contact 6122). FIG. 6L illustrates displaying a third portion 6116 of the messaging content associated with messages 6102L, 6102M, 6102N, and 6102O (e.g., content that was not displayed within the messaging interface 610 in FIG. 6H) outside of the image area bounded by the cropping interface elements 632 in response to detecting lift-off of the expansion input in FIGS. 6J-6K. As such, in FIG. 6L, the screenshot image 6110 includes the first portion 6112 of the messaging content associated with messages 6102A, 6102B, 6102C, 6102D, 6102E, 6102F, 6102G, and 6102H and the second portion 6114 of the messaging content associated with messages 6102I, 6102J, and 6102K. As shown in FIG. 6L, the device 100 shrinks the dimensions of the screenshot image 6110 between FIGS. 6J-6L to display the entirety of the expanded screenshot image.

According to some embodiments, the third portion 6116 of the messaging content associated with messages 6102L, 6102M, 6102N, and 6102O is pre-fetched by the messaging application. According to some embodiments, the third portion 6116 of the messaging content associated with messages 6102L, 6102M, 6102N, and 6102O is optionally displayed within the screenshot editing interface 620 in FIG. 6L to indicate that the user has the option to further expand the screenshot image to include content that was not displayed within the messaging interface 6100 in FIG. 6H.

Figure 6M:
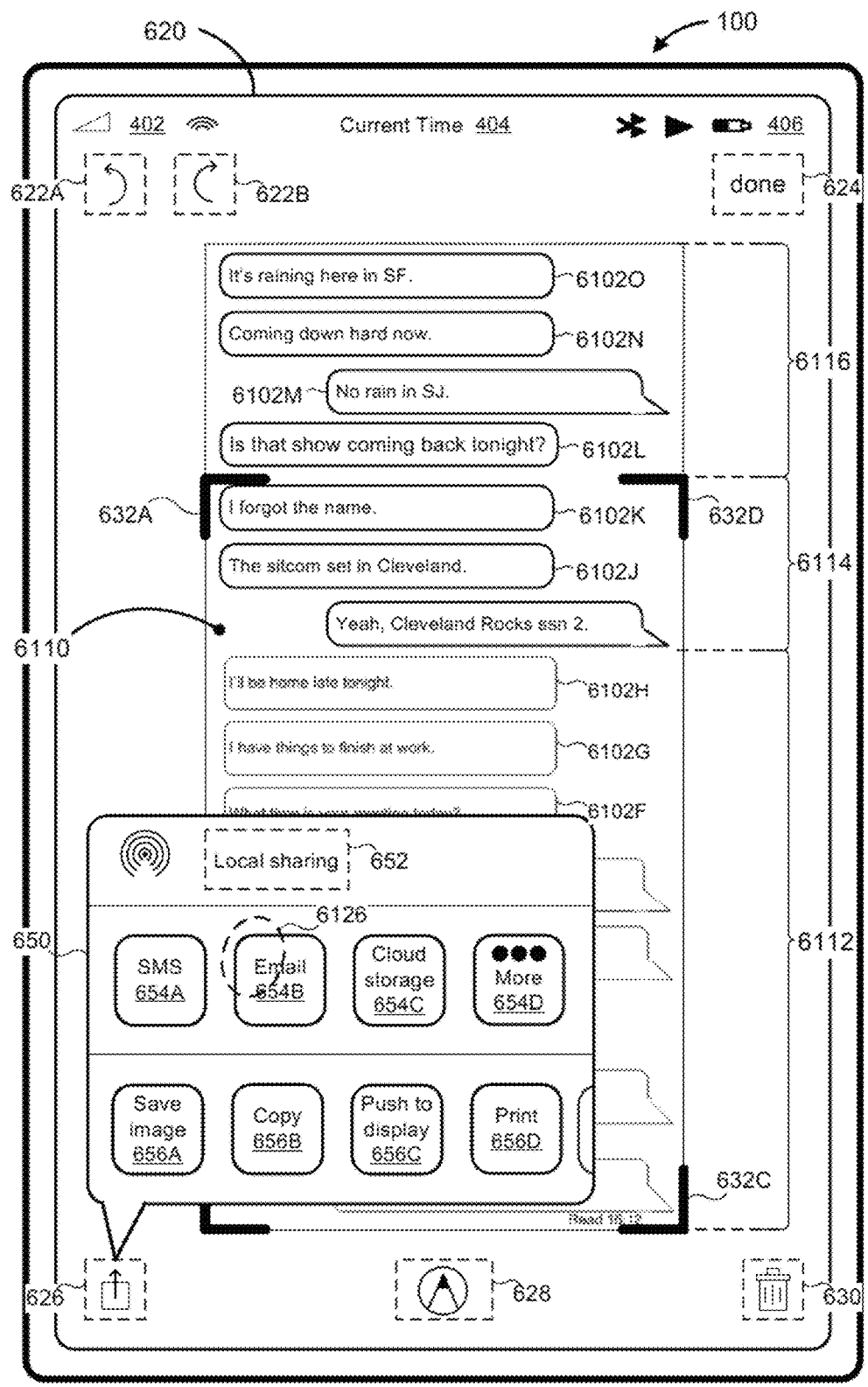
Figure 6N:
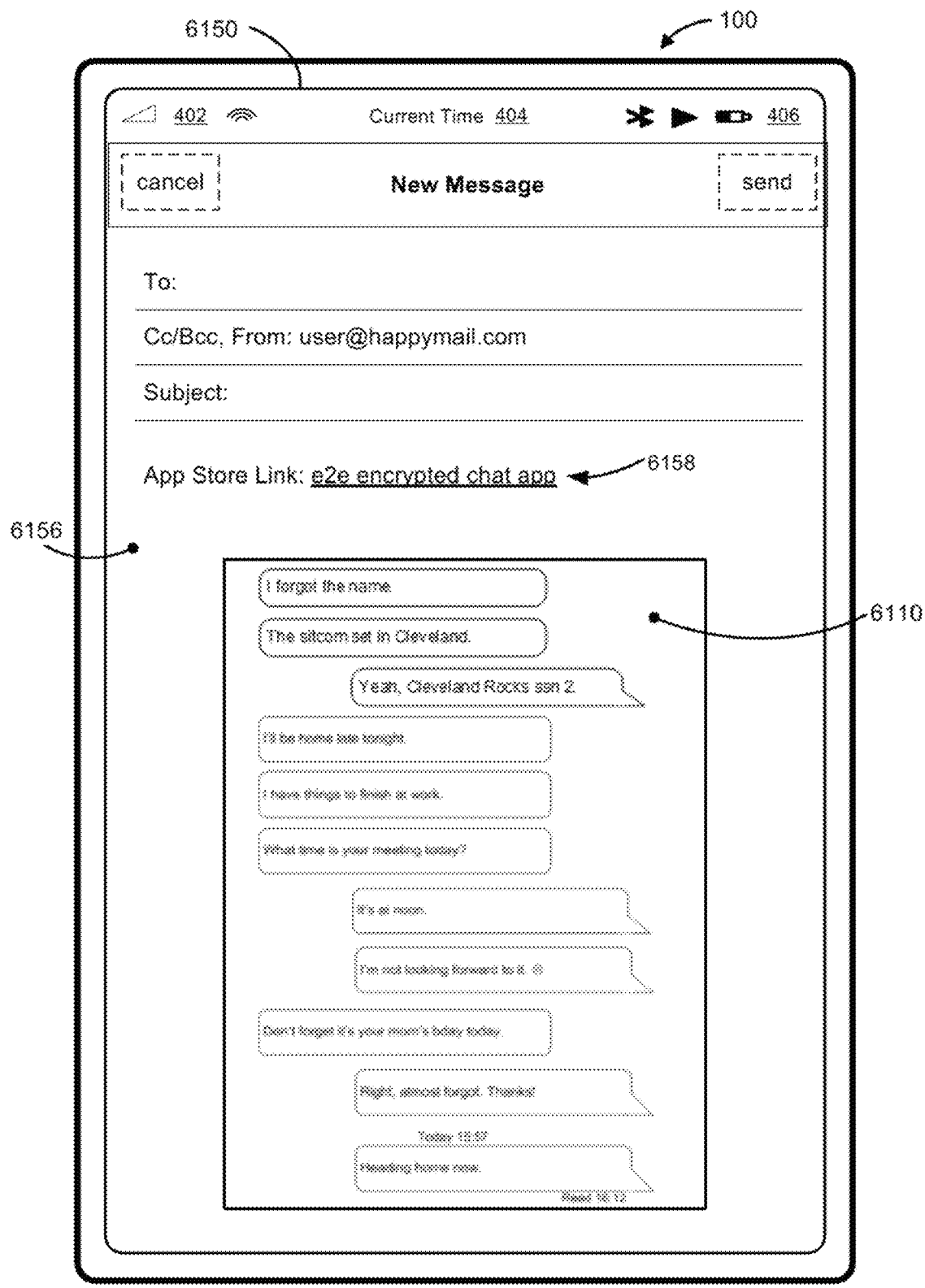
Figure 7A:
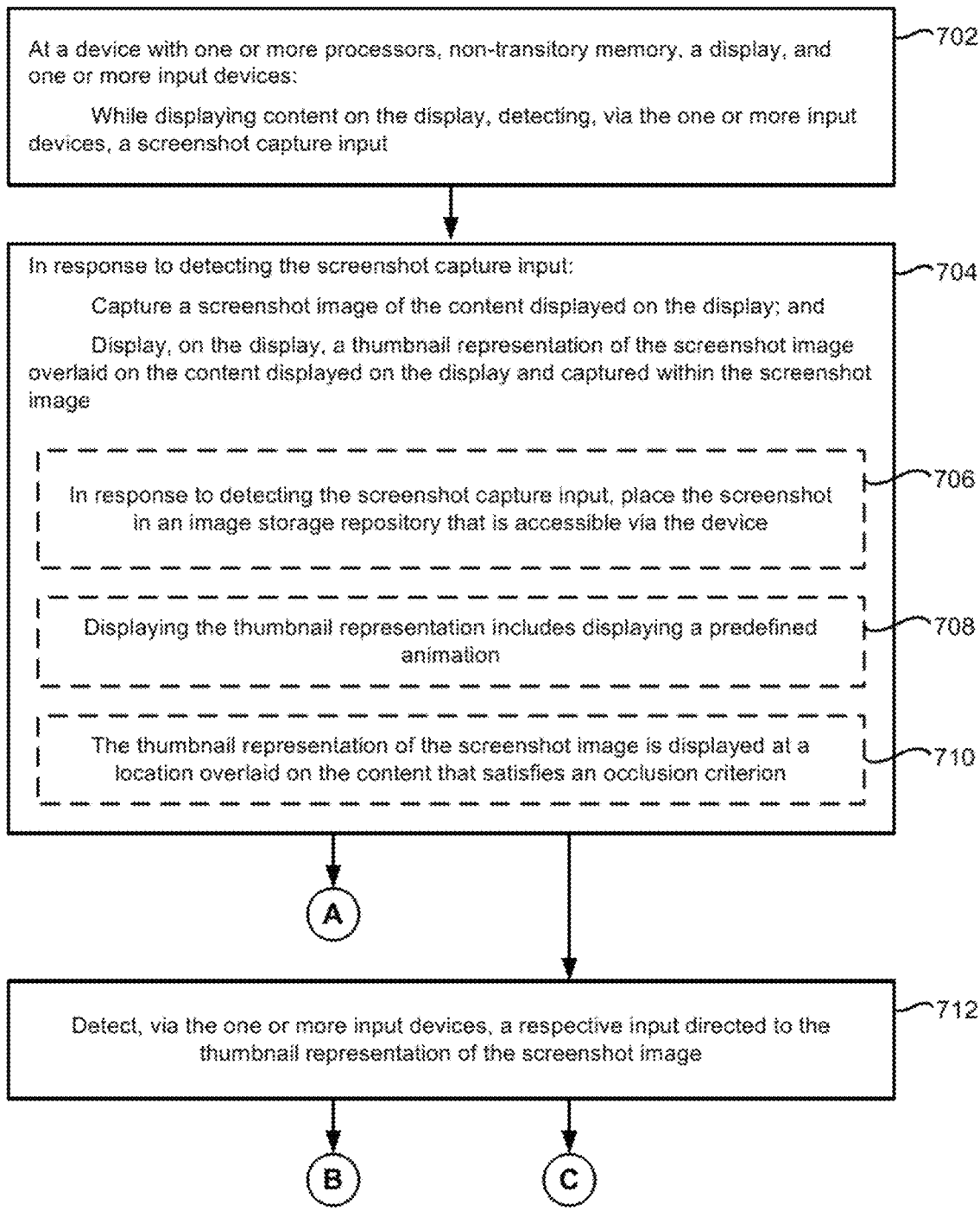
Figure 7B:
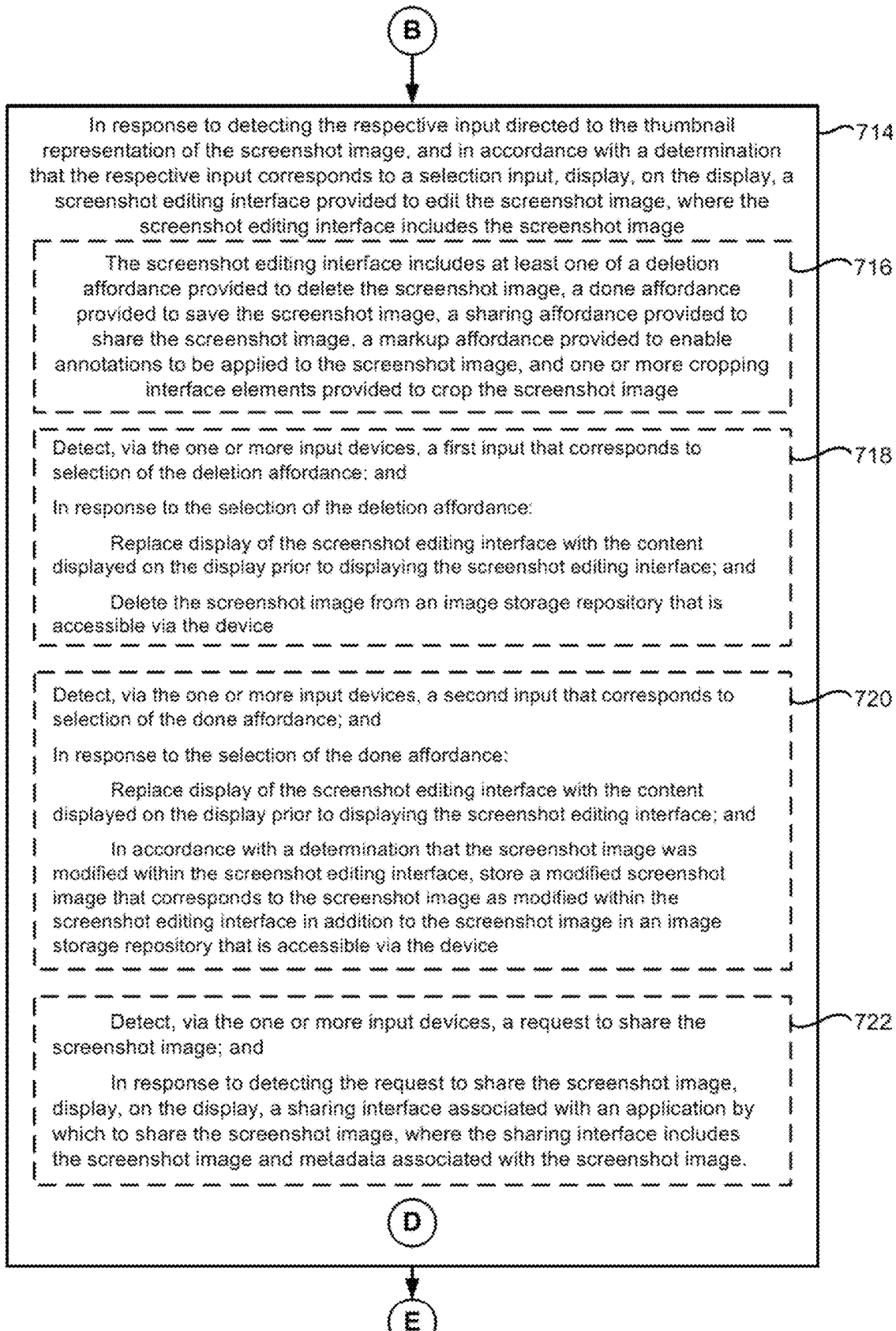
Figure 7C:
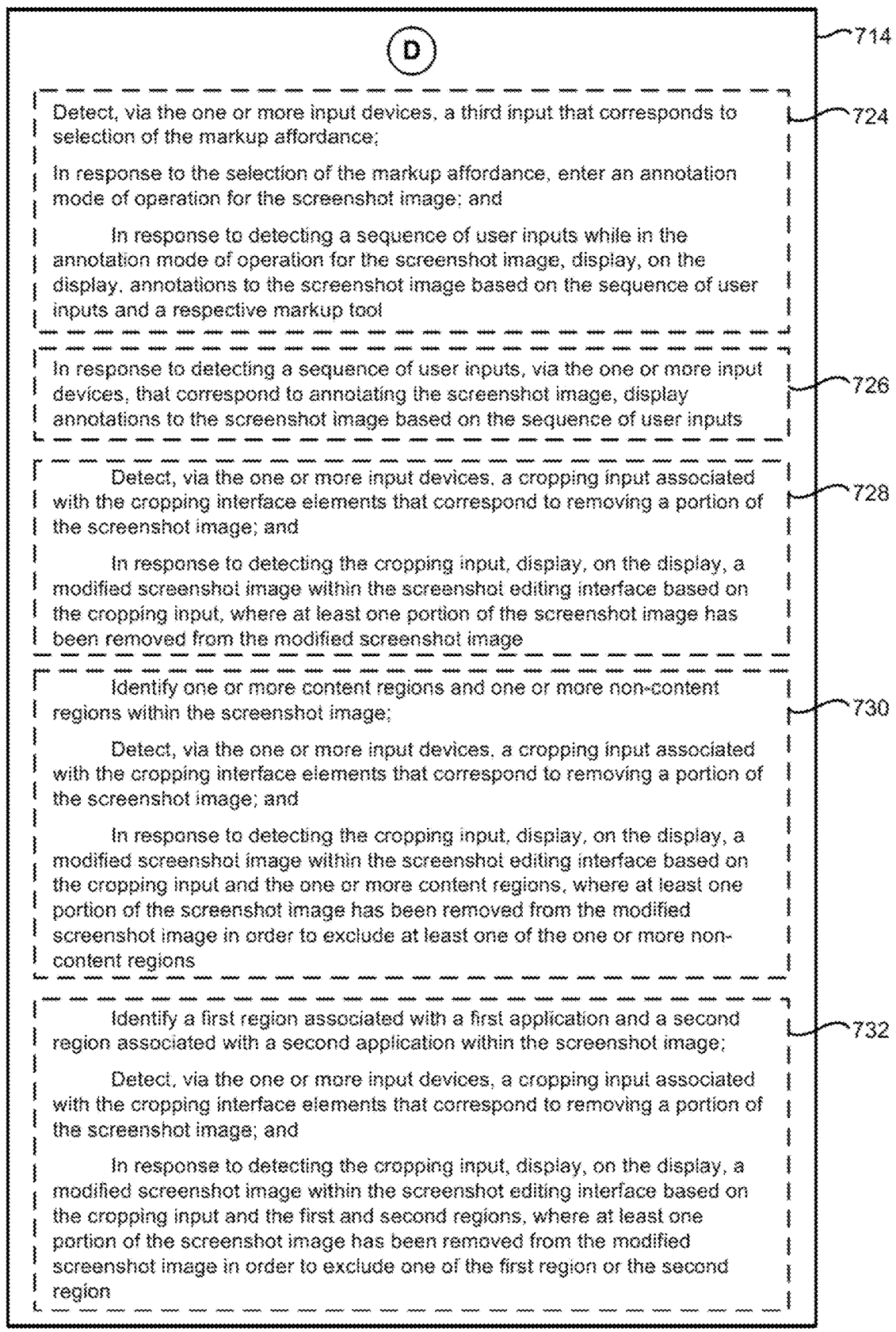

FIGS. 6L-6N show a sequence in which the expanded screenshot image is shared via an email. FIG. 6L also illustrates detecting a contact 6124 (e.g., a tap/selection gesture) at a location corresponding to the affordance 626 (e.g., the share affordance). FIG. 6M illustrates displaying the transport interface 650 over the screenshot editing interface 620 in response to detecting selection of the affordance 626 in FIG. 6L. The web transport interface 650 in FIG. 6M is similar to and adapted from the transport interface 650 in FIGS. 6B and 6F. As such, FIG. 6B, FIG. 6F, and FIG. 6M include similar user interfaces and elements labeled with the same reference number in both figures have the same function, with only the differences described herein for the sake of brevity.

FIG. 6M also illustrates detecting a contact 6126 (e.g., a tap/selection gesture) at a location corresponding to the sharing affordance 654B (e.g., the email sharing affordance). FIG. 6N illustrates replacing display of the screenshot editing interface 620 with an email composition interface 6150 in response to the selection of the sharing affordance 654B in FIG. 6M. As shown in FIG. 6N, the email composition interface 6150 includes an email content/body region 6156 with the screenshot image 6110 (e.g., as expanded in FIGS. 6J-6L) and an application store or download link 6158 (e.g., a URI or URL) to the messaging application associated with the messaging interface 6100 in FIG. 6H.

FIGS. 7A-7E illustrate a flow diagram of a method 700 of editing a screenshot image in accordance with some embodiments. The method 700 is performed at an electronic device (e.g., the portable multifunction device 100 in FIG. 1A, or the device 300 in FIG. 3) with one or more processors, non-transitory memory, a display, and one or more input devices. In some embodiments, the display is a touch-screen display and the one or more input devices are on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 700 are, optionally, combined and/or the order of some operations is, optionally, changed.

As described below, the method 700 provides an intuitive way to edit a screenshot image. The method reduces the cognitive burden on a user when editing a screenshot image, thereby creating a more efficient human-machine interface. For battery-operated electronic devices, enabling a user to edit a screenshot image faster and more efficiently conserves power and increases the time between battery charges.

While displaying content on the display, the device detects (702), via the one or more input devices, a screenshot capture input. According to some embodiments, the "content" displayed on the display generally corresponds to an application interface. For example, the content corresponds to a web page displayed within a web browser application, a message thread within an email application or messaging application, all or a portion of a PDF file, all or a portion of an image file, all or a portion of a document file, or the like. In another example, the content includes objects/icons associated with media items displayed within a media consumption/organization application, within a file explorer application, or within a device home screen. In some embodiments, the screenshot capture input corresponds to a keypress (e.g., print screen key) or a keypress combination (e.g., home button+power button). In some embodiments, the screenshot capture input corresponds to selection of an associated affordance (e.g., through a sharing panel or transport interface).

In response to detecting the screenshot capture input, the device (704): captures a screenshot image of the content displayed on the display; and displays, on the display, a thumbnail representation of the screenshot image overlaid on the content displayed on the display and captured within the screenshot image. In some embodiments, in response to detecting the screenshot capture input, the device saves/stores the screenshot image in an image storage repository such as the camera roll or image/media content library. In some embodiments, the screenshot image includes the entire display area of the device. In some embodiments, the screenshot image includes a portion of the display area of the device (e.g., including application related content but excluding OS related content such as an OS chrome bar). In some embodiments, the thumbnail representation is displayed at a location that reduces occlusion of the underlying content. According to some embodiments, the thumbnail representation of the screenshot image provides a visual cue indicating that the screenshot capture input was successful and that the screenshot image may be modified or interacted with.

As one example, in FIG. 5B, the device 100 displays a thumbnail representation 514A of a screenshot image 534 in a first state (e.g., a first opacity and/or sharpness level or a first fade-in state) overlaid on the web browser interface 502 in response to detecting the screenshot capture input. For example, the screenshot image 534 corresponds to the web browser interface 502 displayed in FIG. 5A. For example, the screenshot image 534 is shrunk to generate the thumbnail representation 514A based on predefined dimensions, a predefined aspect ratio, and/or a predefined resolution. As another example, in FIG. 5Q, the device 100 displays a first thumbnail representation 5120 of a first screenshot image 5136 (e.g., of the web browser interface 5100 with the tab 5106-A open) over the web browser interface 5100 in response to detecting the first screenshot capture input.

In some embodiments, in response to detecting the screenshot capture input, the device places (706) the screenshot in an image storage repository that is accessible via the device. In some embodiments, in response to detecting the screenshot capture input, the device saves/stores the screenshot image in an image storage repository such as the camera roll or image/media content library. According to some embodiments, placing the screenshot image in the camera roll or image/media content library provides a seamless user experience that requires less time and user inputs when saving/storing screenshot images, which, additionally, reduces power usage and improves battery life of the device by enabling the user to use the device more quickly and efficiently.

In some embodiments, displaying the thumbnail representation includes (708) displaying a predefined animation. For example, the predefined animation corresponds to a fade-in animation. In another example, the predefined animation represents a simulation of film developing such as a gradual fade-in of the image from the edges toward the center or a gradual fade-in of the image from the center toward the edges. FIGS. 5B-5D show a sequence in which the thumbnail representation transitions between states 514A, 514B, and 514C, respectively, where the opacity decreases and the sharpness increases in order to illustrate a fade-in animation. According to some embodiments, the predefined animation provides a visual cue indicating that the screenshot capture input was successful.

In some embodiments, the thumbnail representation of the screenshot image is displayed (710) at a location overlaid on the content that satisfies an occlusion criterion. In some embodiments, the thumbnail representation is overlaid at a location that reduces occlusion of the content. As such, the location of the thumbnail representation reduces cluttering the display area and reduces intruding on the user experience. According to some embodiments, displaying the thumbnail representation of the screenshot image at a location that satisfies the occlusion criteria provides a seamless and non-intrusive user experience when capturing screenshot images, which, additionally, reduces power usage and improves battery life of the device by enabling the user to use the device more quickly and efficiently.

As one example, in FIG. 5D, the thumbnail representation 514C is displayed at a location over the web browser interface 502 that satisfies the occlusion criterion (e.g., the bottom-left corner of the web browser interface 502). In one example, the selected location of the representation 514C in FIG. 5D that satisfies the occlusion criterion occludes the least number of pixels of the web browser interface 502. In another example, the selected location of the representation 514C in FIG. 5D that satisfies the occlusion criterion occludes the least number of pixels of the content displayed within the content region 504.

The device detects (712), via the one or more input devices, a respective input directed to the thumbnail representation of the screenshot image. In some embodiments, the respective input corresponds to a predetermined gesture, such as a tap, pinch, flick, or swipe, at a location associated with the thumbnail representation. In some embodiments, the respective input corresponds to a mouse click at a location associated with the thumbnail representation. In some embodiments, the respective input corresponds to a predefined keypress combination. In some embodiments, the respective input corresponds to a predefined voice command. As one example, in FIG. 5D, the device 100 detects a contact 516 (e.g., a tap/selection gesture) at a location that corresponds to the thumbnail representation 514C of the screenshot image 534. As another example, in FIG. 5N, the device 100 detects a swipe right-to-left gesture over the thumbnail representation 514C of the screenshot image with a contact 580 (e.g., a tap-and-drag gesture).

In response to detecting the respective input directed to the thumbnail representation of the screenshot image, and in accordance with a determination that the respective input corresponds to a selection input, the device displays (714), on the display, a screenshot editing interface provided to edit the screenshot image, where the screenshot editing interface includes the screenshot image. In some embodiments, the application associated with the content ceases to be displayed on the display. For example, the application associated with the content transitions to the background. In some embodiments, the content is replaced with the screenshot editing interface display. In some embodiments, the screenshot editing interface is overlaid on the content. According to some embodiments, the screenshot editing interface provides a seamless user experience that requires less time and user inputs when modifying screenshot images, which, additionally, reduces power usage and improves battery life of the device by enabling the user to use the device more quickly and efficiently.

In some embodiments, the selection input (e.g., the first type of input) corresponds to a tap or click on the thumbnail representation to enter the screenshot editing interface. In some embodiments, a second type of input (e.g., a request to cease display of the thumbnail representation) corresponds to a right-to-left swipe gesture that causes the device to remove the thumbnail representation from the display and (optionally) delete the screenshot image from the camera roll. In some embodiments, a third type of selection input corresponds to a left-to-right swipe gesture that causes the device to remove the thumbnail representation from the display and maintain storage of the screenshot image in the camera roll.

As one example, FIGS. 5D-5E show a sequence in which the device replaces display of the web browser interface 502 with the screenshot editing interface 520 in response to detecting selection of the thumbnail representation 514C with the contact 516 in FIG. 5D (e.g., with a tap/selection input). As shown in FIG. 5E, the screenshot editing interface 520 includes the screenshot image 534 associated with the thumbnail representation 514C. As another example, FIGS. 5U-5V show a sequence in which the device replaces display of the web browser interface 5100 with the screenshot editing interface 520 in response to detecting selection of the group of thumbnail representations 5120, 5124, and 5128 with the contact 5130 in FIG. 5U (e.g., with a tap/selection input). As shown in FIG. 5V, the screenshot editing interface 520 includes the screenshot image 5132 associated with the third thumbnail representation 5128.

In some embodiments, the screenshot editing interface includes (716) at least one of a deletion affordance provided to delete the screenshot image, a done affordance provided to save the screenshot image, a sharing affordance provided to share the screenshot image, a markup affordance provided to enable annotations to be applied to the screenshot image, and one or more cropping interface elements (e.g., crop handles that frame the corners of the screenshot image) provided to crop the screenshot image. In some embodiments, the screenshot editing interface also includes undo and redo affordances for rolling back or reapplying modifications to the screenshot image. According to some embodiments, the affordances within the screenshot editing interface provides a seamless user experience that requires less time and user inputs when modifying screenshot images, which, additionally, reduces power usage and improves battery life of the device by enabling the user to use the device more quickly and efficiently.

As one example, in FIG. 5E, the screenshot editing interface 520 includes an undo affordance 522A, a redo affordance 522B, a done affordance 524, a share affordance 526, a markup affordance 528, and a deletion 530. In this example, in FIG. 5E, the screenshot editing interface 520 also includes the screenshot image 534 within an image area bounded by cropping interface elements (e.g., crop handles) 532A, 532B, 532C, and 532D (sometimes collectively referred to herein as the "cropping interface elements 532").

In some embodiments, the device (718): detects, via the one or more input devices, a first input that corresponds to selection of the deletion affordance; and, in response to the selection of the deletion affordance: replaces display of the screenshot editing interface with the content displayed on the display prior to displaying the screenshot editing interface; and deletes the screenshot image from an image storage repository that is accessible via the device. For example, the first input corresponds to a tap gesture at a location associated with the deletion affordance. In another example, the first input corresponds to a mouse click at a location associated with the deletion affordance. In yet another example, the first input corresponds to a predefined voice command. In some embodiments, the device deletes the screenshot image from the camera roll or image/media content library in response to the selection of the deletion affordance. According to some embodiments, the deletion affordance within the screenshot editing interface provides a seamless user experience that requires less time and user inputs when deleting screenshot images, which, additionally, reduces power usage and improves battery life of the device by enabling the user to use the device more quickly and efficiently.

For example, with reference to FIG. 5E, in response to activation (e.g., selection with a contact) of the affordance 530 (e.g., the deletion affordance), the device 100 causes the modified screenshot image to be deleted from the image storage repository. Continuing with this example, with reference to FIG. 5E, the device 100 also deletes the unmodified screenshot image and/or modified screenshot images (if any) from the image storage repository in response to the selection of the affordance 530.

In some embodiments, the device (720): detects, via the one or more input devices, a second input that corresponds to selection of the done affordance; and, in response to the selection of the done affordance: replaces display of the screenshot editing interface with the content displayed on the display prior to displaying the screenshot editing interface; and, in accordance with a determination that the screenshot image was modified within the screenshot editing interface, stores a modified screenshot image that corresponds to the screenshot image as modified within the screenshot editing interface in addition to the screenshot image in an image storage repository that is accessible via the device. For example, the second input corresponds to a tap gesture at a location associated with the done affordance. In another example, the second input corresponds to a mouse click at a location associated with the done affordance. In yet another example, the second input corresponds to a predefined voice command. According to some embodiments, the done affordance within the screenshot editing interface provides a seamless user experience that requires less time and user inputs upon completing modifications to screenshot images, which, additionally, reduces power usage and improves battery life of the device by enabling the user to use the device more quickly and efficiently.

In some embodiments, the device saves/stores both the unmodified screenshot image(s) and the modified screenshot image saved in the image storage repository. In some embodiments, if the screenshot image is not modified within the screenshot editing interface and the screenshot image was previously stored in the image storage repository upon capturing the screenshot image, the screenshot editing interface ceases to be displayed.

For example, with reference to FIG. 5E, in response to activation (e.g., selection with a contact) of the affordance 524 (e.g., the done affordance), the device 100 replaces display of the screenshot editing interface 520 with the web browser interface 502 in FIG. 5A. Continuing with this example, with reference to FIG. 5E, the device 100 also saves/stores the modified screenshot image in addition to the unmodified screenshot image in an image storage repository (e.g., the camera roll or image/media content library) in response to the selection of the affordance 524. In some embodiments, the device 100 periodically saves/stores intermediate versions of the modified screenshot image in the image storage repository prior to detecting selection of the affordance 524.

In some embodiments, the device (722): detects, via the one or more input devices, a request to share the screenshot image; and, in response to detecting the request to share the screenshot image, displays, on the display, a sharing interface (e.g., a transport interface, or an email or SMS composition interface) associated with an application by which to share the screenshot image, where the sharing interface includes the screenshot image and metadata associated with the screenshot image. In some embodiments, the request to share to screenshot image corresponds to a user input selecting a share affordance within the screenshot editing interface followed by a subsequent user input selecting an application or communication means by which to share the screenshot image. For example, the user input corresponds to a tap gesture at a location associated with the sharing affordance. In another example, the user input corresponds to a mouse click at a location associated with the sharing affordance. In yet another example, the user input corresponds to a predefined voice command. According to some embodiments, the screenshot editing interface provides a seamless user experience that requires less time and user inputs when sharing screenshot images, which, additionally, reduces power usage and improves battery life of the device by enabling the user to use the device more quickly and efficiently.

In some embodiments, intermediate steps associated with display of the sharing affordance includes displaying a sharing options panel (e.g., the transport interface) with a plurality of sharing options and detecting selection of a respective sharing option from among the plurality of sharing options that corresponds to the application by which to share the screenshot image. In some embodiments, the metadata corresponds to the time, date, and application associated with the screenshot image. In some embodiments, the metadata corresponds to a URL or title associated with screenshot image (e.g., when the screenshot image corresponds to a web page). In some embodiments, the metadata corresponds to a download link or application store link to the application associated with the screenshot image from which to retrieve and/or download the associated application.

As one example, FIGS. 5K-5M show a sequence in which the screenshot image (e.g., as modified/annotated in FIGS. 5E-5K) is shared via an email. In this example, the email includes metadata associated with the screenshot image (e.g., the link 588). As another example, FIGS. 6E-6G show a sequence in which the screenshot image (e.g., as modified/expanded in FIGS. 6D-6E) is shared via a message. As yet another example, FIGS. 6L-6N show a sequence in which the screenshot image (e.g., as modified/expanded in FIGS. 6J-6L) is shared via an email. In this example, the email includes metadata associated with the screenshot image (e.g., the link 6158).

In some embodiments, the device (724): detects, via the one or more input devices, a third input that corresponds to selection of the markup affordance; in response to the selection of the markup affordance, enters an annotation mode of operation for the screenshot image; and, in response to detecting a sequence of user inputs while in the annotation mode of operation for the screenshot image, displays, on the display, annotations to the screenshot image based on the sequence of user inputs and a respective markup tool. For example, the third input corresponds to a tap gesture at a location associated with the markup affordance. In another example, the third input corresponds to a mouse click at a location associated with the markup affordance. In yet another example, the third input corresponds to a predefined voice command. In some embodiments, the sequence of user inputs corresponds to writing, underling, circling, sketching, etc. within the screenshot image with a stylus or user touch inputs. According to some embodiments, the markup affordance within the screenshot editing interface provides a seamless user experience that requires less time and user inputs when modifying screenshot images, which, additionally, reduces power usage and improves battery life of the device by enabling the user to use the device more quickly and efficiently.

In some embodiments, intermediate steps include displaying a plurality of markup tools within the screenshot editing interface and detecting selection of a respective markup tool among the plurality of markup tools. In some embodiments, inputs from a stylus cause the device to annotate the screenshot image without selection of the markup affordance, but touch inputs do not cause the device to annotate the screenshot image unless the markup affordance is selected. In some embodiments, the ability to annotate the screenshot image is inactive until the markup affordance is selected.

As one example, FIGS. 5E-5F show a sequence in which a first annotation 540 is applied to the screenshot image 534 (e.g., circling the word "Caesar"). As another example, FIGS. 5H-5I show a sequence in which a second annotation 556 is applied to the screenshot image 534 (e.g., underling and/or highlighting the word "Germans").

In some embodiments, in response to detecting a sequence of user inputs, via the one or more input devices, that correspond to annotating the screenshot image, the device displays (726), on the display, annotations to the screenshot image based on the sequence of user inputs. In some embodiments, the sequence of user inputs corresponds to writing, underling, circling, sketching, etc. within the screenshot image with a stylus implement or user touch inputs. In some embodiments, inputs from a stylus cause the device to annotate the screenshot image without selection of the markup affordance, but touch inputs cause the device to annotate the screenshot image without selection of the markup affordance. According to some embodiments, the ability to annotate screenshot images within the screenshot editing interface provides a seamless user experience that requires less time and user inputs when modifying screenshot images, which, additionally, reduces power usage and improves battery life of the device by enabling the user to use the device more quickly and efficiently. As one example, FIGS. 5E-5F show a sequence in which a first annotation 540 is applied to the screenshot image 534 (e.g., circling the word "Caesar"). As another example, FIGS. 5H-5I show a sequence in which a second annotation 556 is applied to the screenshot image 534 (e.g., underling and/or highlighting the word "Germans").

In some embodiments, the device (728): detects, via the one or more input devices, a cropping input associated with the cropping interface elements that correspond to removing a portion of the screenshot image; and, in response to detecting the cropping input, displays, on the display, a modified screenshot image within the screenshot editing interface based on the cropping input, where at least one portion of the screenshot image has been removed from the modified screenshot image. In some embodiments, the cropping interface elements correspond to modifying at least one dimension of the screenshot image. According to some embodiments, the ability to crop screenshot images within the screenshot editing interface provides a seamless user experience that requires less time and user inputs when modifying screenshot images, which, additionally, reduces power usage and improves battery life of the device by enabling the user to use the device more quickly and efficiently.

In some embodiments, the size of the at least one portion depends on the magnitude of the cropping input. In some embodiments, the at least one portion depends on the direction of the cropping input. For example, the cropping input corresponds to a sequence of one or more tap-and-drag gestures associated with a cropping handle or edge of the screenshot image that cause diagonal cropping, vertical cropping, and/or horizontal cropping of the screenshot image.

As one example, FIGS. 5I-5J show a sequence in which a first cropping input crops out a portion 565A of the screenshot image 534. As a result, the first dimension (e.g., height) of the screenshot image 534 has a second value 558B that is less than the first value 558A in FIG. 5I. As another example, FIGS. 5J-5K show a sequence in which a second cropping input crops out a portion 565B of the screenshot image 534. As a result, the first dimension (e.g., height) of the screenshot image 534 has a third value 558C that is less than the first value 558A in FIG. 5I and the second value 558B in in FIG. 5J.

In some embodiments, the device (730): identifies one or more content regions and one or more non-content regions within the screenshot image; detects, via the one or more input devices, a cropping input associated with the cropping interface elements that correspond to removing a portion of the screenshot image; and, in response to detecting the cropping input, displays, on the display, a modified screenshot image within the screenshot editing interface based on the cropping input and the one or more content regions, where at least one portion of the screenshot image has been removed from the modified screenshot image in order to exclude at least one of the one or more non-content regions. According to some embodiments, the ability to crop screenshot images based on content and non-content regions provides a seamless user experience that requires less time and user inputs when modifying screenshot images to crop out non-content from screenshot images, which, additionally, reduces power usage and improves battery life of the device by enabling the user to use the device more quickly and efficiently.

In some embodiments, non-content regions correspond to chrome regions, sidebars, navigation regions/bars, address bars, title bars, toolbars, and/or the like. In some embodiments, content regions correspond to other regions with actual content. In some embodiments, the cropping interface elements correspond to modifying at least one dimension of the screenshot image. In some embodiments, the device crops the screenshot image based on the identified content and non-content regions. For example, the device reduces the magnitude of the cropping input that is detected within a content region in order to crop out a non-content region but not a portion of a content region. In another example, the device increases the magnitude of the cropping input that is detected within a non-content region in order to crop out an entire non-content region.

As one example, FIGS. 5I-5J show a sequence in which a first cropping input crops out a portion 565A of the screenshot image 534 based on the content regions of the screenshot image 534. In this example, the device 100 adjusts the cropped-out portion 565A based on the locations of the chrome region (e.g., the display region that includes the indicator(s) 402, the time 404, and the battery status indicator 406), the address bar 506, and the content region 504. As another example, FIGS. 5J-5K show a sequence in which a second cropping input crops out a portion 565B of the screenshot image 534 based on the content regions of the screenshot image 534. In this example, the device 100 adjusts the cropped-out portion 565B based on the locations of the content region 504 and the toolbar region that includes the affordances 510A, 510B, 512A, 512B, and 512C.

In some embodiments, the device (732): identifies a first region associated with a first application and a second region associated with a second application within the screenshot image; detects, via the one or more input devices, a cropping input associated with the cropping interface elements that correspond to removing a portion of the screenshot image; and, in response to detecting the cropping input, displays, on the display, a modified screenshot image within the screenshot editing interface based on the cropping input and the first and second regions, where at least one portion of the screenshot image has been removed from the modified screenshot image in order to exclude one of the first region or the second region. In some embodiments, the captured screenshot image includes a multitasking or split-screen view with a first sub-portion of the content within the first region for the first application and a second sub-portion of the content within the second region for the second application. According to some embodiments, the ability to crop screenshot images based on application regions provides a seamless user experience that requires less time and user inputs when modifying screenshot images to crop out portions of a split-screen view from screenshot images, which, additionally, reduces power usage and improves battery life of the device by enabling the user to use the device more quickly and efficiently.

In some embodiments, the device crops the screenshot image based on the identified first and second regions. For example, the device reduces the magnitude of the cropping input that is detected within a second region in order to crop out the first region but not a portion of the second region. In another example, the device increases the magnitude of the cropping input that is detected within the first region in order to crop out the entire first region.

As one example, in FIG. 5Y, the device 100 displays a split-screen user interface that includes a first region associated with a web browser interface 5100 and a second region associated with a messaging interface 5150. In this example, FIGS. 5BB-5CC show a sequence in which a cropping input crops out the second region of the screenshot image 534 based on the identified first and second content regions of the screenshot image 5168. In this example, the device 100 adjusts the cropped version of the screenshot image 5168 based on the divider element 5149 and the first and second regions of the split-screen user interface.

In some embodiments, the device (734): prior to detecting the respective input directed to the thumbnail representation of the screenshot image, detecting, via the one or more input devices, a subsequent screenshot capture input; and, in response to detecting the subsequent screenshot capture input: captures a second screenshot image of content displayed on the display; and displays, on the display, a group of thumbnail representations that represents a first thumbnail representation corresponding to the screenshot image and the second thumbnail representation corresponding to the second screenshot image. In some embodiments, the subsequent screenshot input corresponds to a keypress (e.g., print screen key) or a keypress combination (e.g., home button+ power button). In some embodiments, the subsequent screenshot input corresponds to selection of an associated affordance (e.g., through a sharing panel or transport interface).

In some embodiments, the subsequent screenshot capture input is detected prior to expiration of the timeout period, else the previous thumbnail representation is removed from the display and the associated screenshot image is removed from the camera roll and the subsequent screenshot image is not part of a batch but a standalone screenshot image. In some embodiments, detection of the subsequent screenshot capture input resets the timeout period. As such, the user has the option to add additional screenshots to the group.

For example, the group of thumbnail representations corresponds to a stack of thumbnail representations. In some embodiments, the user is able to select the group of thumbnail representations for editing or dismissing the group of thumbnail representations using analogous gestures to those described above (e.g., a tap on the group of thumbnail representations opens the screenshot editing interface for editing the group of screenshot images, a swipe on the group of thumbnail representations to dismiss the group of thumbnail representations, etc.).

In some embodiments, the device saves/stores subsequent screenshot image in the image storage repository. In some embodiments, the subsequent screenshot image includes different content due to a navigation command (e.g., scrolling) that changes the content displayed on the display as compared to the content captured within the previous screenshot image. According to some embodiments, the ability to perform a batched screenshot capture operation provides a seamless user experience that requires less time and user inputs when viewing and modifying multiple screenshot images, which, additionally, reduces power usage and improves battery life of the device by enabling the user to use the device more quickly and efficiently.

As one example, FIGS. 5P-5U show a sequence in which a group of thumbnail representations of screenshot images are overlaid on the web browser interface in response to multiple screenshot capture inputs. In this example, with reference to FIG. 5U, the device 100 displays a group of thumbnail representations 5120, 5124, and 5128 overlaid on the web browser interface 5100.

In some embodiments, the respective input is directed to (736) the group of thumbnail representations, and the screenshot editing interface includes the second screenshot image. In some embodiments, the screenshot editing interface optionally includes at least a portion of the previous screenshot image. In some embodiments, the screenshot editing interface for batched screenshots includes the most recent screenshot image and a peak of at least the second most recent screenshot image to indicate that multiple screenshot images are available for editing within the screenshot editing interface. According to some embodiments, the screenshot editing interface associated with the batched screenshot capture operation provides a seamless user experience that requires less time and user inputs when viewing and modifying multiple screenshot images, which, additionally, reduces power usage and improves battery life of the device by enabling the user to use the device more quickly and efficiently.

As one example, in FIG. 5U, the device 100 detects a contact 5130 (e.g., a tap/selection gesture) at a location that corresponds to the group of thumbnail representations 5120, 5124, and 5128. Continuing with this example, in FIG. 5V, in FIG. 5U, the device 100 replaces display of the web browser interface 5100 with a screenshot editing interface 520 in response to the selection of the group of thumbnail representations 5120, 5124, and 5128 in FIG. 5U. As shown in FIG. 5V, the screenshot editing interface 520 includes the third screenshot image 5132 (e.g., associated with the third thumbnail representation 5128 in FIG. 5U) within an image area bounded by cropping interface elements 532 (e.g., crop handles). As shown in FIG. 5V, the screenshot editing interface 520 includes a portion of the second screenshot image 5134 (e.g., associated with the second thumbnail representation 5124 in FIGS. 5S-5T). According to some embodiments, the user is able to individually modify the third screenshot image 5132, the second screenshot image 5134, and the first screenshot image 5136 within the screenshot editing interface 520. According to some embodiments, the user is able to navigate between the third screenshot image 5132, the second screenshot image 5134, and the first screenshot image 5136 within the screenshot editing interface 520 (e.g., with a swipe gesture as shown in FIGS. 5V-5W).

In some embodiments, the device (738): detects, via the one or more input devices, a navigation input that corresponds to navigating among screenshot images in the screenshot editing interface; and, in response to detecting the navigation input, updates the screenshot editing interface by displaying the screenshot image. In some embodiments, the navigation input corresponds to a scrolling gesture such as moving a scroll bar or a swipe gesture. In some embodiments, the screenshot editing interface optionally includes at least a portion of the second screenshot image. According to some embodiments, the user is able to quickly navigate between the batched screenshot images. In some embodiments, the batched screenshot images are separately editable such that a user has the option to individually crop, annotate, etc. one or more of the screenshot images within the screenshot editing interface. According to some embodiments, the ability to navigate between multiple screenshot images within the screenshot editing interface associated with the batched screenshot capture operation provides a seamless user experience that requires less time and user inputs when viewing and modifying multiple screenshot images, which, additionally, reduces power usage and improves battery life of the device by enabling the user to use the device more quickly and efficiently.

As one example, in FIG. 5V, the device 100 detects a navigation gesture with a contact 5138 (e.g., a right-to-left swipe or tap-and-drag gesture) within the screenshot editing interface 520. Continuing with this example, in FIG. 5W, in FIG. 5V, the device 100 updates the screenshot editing interface 520 to show the second screenshot image 5134 (e.g., associated with the second thumbnail representation 5124 in FIGS. 5S-5T) within an image area bounded by cropping interface elements 532 (e.g., crop handles). As shown in FIG. 5W, the screenshot editing interface 520 also includes a portion of the third screenshot image 5132 (e.g., associated with the third thumbnail representation 5128 in FIG. 5U) and a portion of the first screenshot image 5136 (e.g., associated with the first thumbnail representation 5120 in FIGS. 5Q-5R).

In some embodiments, the content is displayed (740) within an application window, and the device: detects, via the one or more input devices, a sequence of inputs that corresponds to dragging and dropping the thumbnail representation into the application window; and, in response to detecting the sequence of user inputs, displays, on the display, the screenshot image within the application window. As one example, the application window corresponds to an email application and the screenshot image corresponds to the email application. In this example, the thumbnail representation is dragged from its origin location into the email application, and, as a result, the screenshot image is displayed within the body of an email being composed within the email application. For example, with reference to FIG. 6I, in response to a user input dragging-and-dropping the thumbnail representation 6106 of the screenshot image 6110 into the message input field 6104, the device 100 would populate the message input field 6104 with the screenshot image 6110 (or a thumbnail thereof) in order to send the screenshot image 6110 in a new message. According to some embodiments, the ability to perform a drag-and-drop operation on the thumbnail representation of a screenshot image provides a seamless user experience that requires less time and user inputs when inserting/exporting the screenshot image into an application, which, additionally, reduces power usage and improves battery life of the device by enabling the user to use the device more quickly and efficiently.

In some embodiments, the content includes (742) a first content sub-portion displayed within a first region associated with a first application and a second content sub-portion displayed within a second region associated with a second application, and the device: detects, via the one or more input devices, a sequence of inputs that corresponds to dragging and dropping the thumbnail representation into the first region; and, in response to detecting the sequence of user inputs, displays, on the display, the screenshot image within the first region. As one example, the content is displayed in a multitasking or split-screen view where the first region corresponds to a first application window for the first application (e.g., a messaging application) and the second region corresponds to a second application window for the second application (e.g., a web browser application. Alternatively, the thumbnail representation is dragged and dropped into the second region. As one example, FIGS. 5Z-5AA show a sequence in which the thumbnail representation of the screenshot image is dragged-and-dropped into one of the regions of the split-screen user interface. According to some embodiments, the ability to perform a drag-and-drop operation on the thumbnail representation of a screenshot image provides a seamless user experience that requires less time and user inputs when inserting/exporting the screenshot image into an application, which, additionally, reduces power usage and improves battery life of the device by enabling the user to use the device more quickly and efficiently.

In some embodiments, in response to detecting the respective input directed to the thumbnail representation of the screenshot image, and in accordance with a determination that the respective input corresponds to a request to cease to display the thumbnail representation, the device (744) ceases to display the thumbnail representation of the screenshot image overlaid on the content displayed on the display. In some embodiments, the request to cease to display the thumbnail representation (e.g., the second type of input) corresponds to a left-to-right or right-to-left swipe gesture starting at a location associated with the thumbnail representation that swipes the thumbnail representation off of the display. In some embodiments, the request to cease to display the thumbnail representation corresponds to dragging-and-dropping the thumbnail representation to a deletion/removal region. According to some embodiments, the ability to quickly dismiss the thumbnail representation of a screenshot image provides a seamless user experience that requires less time and user inputs, which, additionally, reduces power usage and improves battery life of the device by enabling the user to use the device more quickly and efficiently.

In some embodiments, in response to detecting the respective input, and in accordance with a determination that the respective input corresponds to a request to cease to display the thumbnail representation, the device also deletes the screenshot image from the camera roll. As one example, FIGS. 5N-5O show a sequence in which the thumbnail representation of the screenshot image ceases to be displayed over the web browser interface.

In some embodiments, the device (746): after handling the screenshot image (e.g., editing or dismissing the first screenshot image), detects, via the one or more input devices, a subsequent screenshot capture input; in response to detecting the subsequent screenshot capture input: captures a second screenshot image of the content displayed on the display; and displays, on the display, a second thumbnail representation of the second screenshot image overlaid on the content displayed on the display and captured within the screenshot image; and, in accordance with a determination that the timeout period has expired (and no input has been detected that is directed to the thumbnail representation), ceases to display the second thumbnail representation of the second screenshot image overlaid on the content displayed on the display. For example, the timeout period corresponds to an X seconds timer. In some embodiments, the second screenshot image is also deleted from the camera roll. According to some embodiments, expiration of the timeout period indicates disinterest in the screenshot image and causes dismissal of the thumbnail representation of the screenshot image in order to provide a seamless and non-intrusive user experience that requires less time and user inputs, which, additionally, reduces power usage and improves battery life of the device by enabling the user to use the device more quickly and efficiently.

In some embodiments, the subsequent screenshot input corresponds to a keypress (e.g., print screen key) or a keypress combination (e.g., home button+power button). In some embodiments, the subsequent screenshot input corresponds to selection of an associated affordance (e.g., through a sharing panel or transport interface). In some embodiments, the screenshot image is saved in the camera roll. In some embodiments, the screenshot image includes the entire display area of the device. In some embodiments, the screenshot image includes a portion of the display area of the device (e.g., including application related content but excluding OS related content such as an OS chrome bar).

It should be understood that the particular order in which the operations in FIGS. 7A-7E have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 800) are also applicable in an analogous manner to method 700 described above with respect to FIGS. 7A-7E. For example, the screenshot capture inputs, screenshot thumbnail representations, screenshot images, and screenshot editing interface described above with reference to method 700 optionally have one or more of the characteristics of the screenshot capture inputs, screenshot thumbnail representations, screenshot images, and screenshot editing interface described herein with reference to other methods described herein (e.g., the method 800). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 7A-7E, optionally, implemented by components depicted in FIGS. 1A-1B. For example, the screenshot capture inputs, cropping inputs, and navigation inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8C illustrate a flow diagram of a method 800 of expanding a screenshot image in accordance with some embodiments. The method 800 is performed at an electronic device (e.g., the portable multifunction device 100 in FIG. 1A, or the device 300 in FIG. 3) with one or more processors, non-transitory memory, a display, and one or more input devices. In some embodiments, the display is a touchscreen display and the one or more input devices are on or integrated with the display (e.g., the device is a tablet or smartphone). In some embodiments, the display is separate from the one or more input devices (e.g., the device is a laptop with a separate display and touchpad, or desktop computer with a separate display and mouse). Some operations in method 800 are, optionally, combined and/or the order of some operations is, optionally, changed.

As described below, the method 800 provides an intuitive way to expand a screenshot image. The method reduces the cognitive burden on a user when expanding a screenshot image, thereby creating a more efficient human-machine interface. For battery-operated electronic devices, enabling a user to expand a screenshot image faster and more efficiently conserves power and increases the time between battery charges.

The device displays (802), on the display, a first sub-portion of content within an application interface. For example, the sub-portion of the content corresponds to a first page of a multi-page web article or a first portion of a scrollable web page displayed within a web browser application. In another example, the sub-portion of the content corresponds to a first page or a first portion of a PDF displayed in a web browser application or a PDF viewer application. In yet another example, the sub-portion of the content corresponds to a subset of a plurality of messages (e.g., a portion of a message thread or a conversation) displayed within a messaging application or an email application. In yet another example, the sub-portion of the content corresponds to a portion of a spreadsheet displayed within a spreadsheet application. In yet another example, the sub-portion of the content corresponds to a portion of a word processing document displayed within a word processing application.

As one example, in FIG. 6A, the device 100 displays a web browser interface 600 associated with a web browser application executed by the device 100 that includes a content region 607 with a first portion of the content 610 for the tab 606-A (e.g., associated with the URL 608). As another example, in FIG. 6H, the device displays a messaging interface 6100 associated with a messaging application (e.g., instant messaging, text messaging, etc.) executed by the device 100. In this example, the messaging interface 6100 includes a plurality of messages 6102A, 6102B, 6102C, 6102D, 6102E, 6102F, 6102G, and 6102H.

While displaying the first sub-portion of the content, the device detects (804), via the one or more input devices, a screenshot capture input. In some embodiments, the screenshot input corresponds to a keypress (e.g., print screen key) or a keypress combination (e.g., home button+power button). In some embodiments, the screenshot input corresponds to selection of an associated affordance (e.g., through a sharing panel or transport interface). As one example, in FIG. 6B, the screenshot capture input corresponds to selection of the operation affordance 656E with the contact 637 (e.g., with a tap/selection input).

In response to detecting the screenshot capture input, the device (806): captures a screenshot image of the first sub-portion of the content within the application interface; and displays, on the display, a screenshot editing interface provided to edit the screenshot image, where the screenshot editing interface includes the screenshot image of the first sub-portion of the content within an image area and one or more expansion affordances provided to expand the screenshot image in a corresponding direction. In some embodiments, the device replaces display of the application interface with the screenshot editing interface. In some embodiments, the screenshot editing interface is overlaid on the application interface. In some embodiments, the device stores/saves the screenshot image in an image storage repository (e.g., the camera roll or image/media content library). In some embodiments, the screenshot image includes the entire display area of the device. In some embodiments, the screenshot image includes a portion of the display area of the device (e.g., including application related content but excluding OS related content such as an OS chrome bar). According to some embodiments, the screenshot editing interface provides a seamless user experience that requires less time and user inputs when expanding screenshot images, which, additionally, reduces power usage and improves battery life of the device by enabling the user to use the device more quickly and efficiently.

In some embodiments, the one or more expansion affordances are provided to expand the content in a vertical dimension (e.g., height) either upward or downward. In some embodiments, the one or more expansion affordances are provided to expand the content in a horizontal dimension (e.g., width) either left or right. In some embodiments, the one or more expansion affordances are provided to expand the content in two dimensions diagonally. In some embodiments, the device displays the one or more expansion affordances proximate to the perimeter of the image area such as proximate to each corner of the image area.

As one example, in FIG. 6D, the screenshot editing interface 620 includes the screenshot image 640 within an image area bounded by cropping interface elements 632 (e.g., crop handles). In this example, in FIG. 6D, a first portion 642 of the content associated with the URL 608 (e.g., content that was displayed within the web browser interface 600 in FIG. 6A) is displayed within the image area bounded by the cropping interface elements 632. As another example, in FIG. 6J, the screenshot editing interface 620 includes the screenshot image 6110 within an image area bounded by cropping interface elements 632 (e.g., crop handles). In this example, in FIG. 6J, a first portion 6112 of the messaging content associated with messages 6102A, 6102B, 6102C, 6102D, 6102E, 6102F, 6102G, and 6102H (e.g., content that was displayed within the messaging interface 610 in FIG. 6H) is displayed within the image area bounded by the cropping interface elements 632.

In some embodiments, displaying the screenshot editing interface includes (808) displaying the second sub-portion of the content outside of the image area prior to detecting the expansion input. In some embodiments, one or more additional sub-portions of the content are displayed within the screenshot editing interface for expanding the screenshot image in one or more directions and/or one or more dimensions. For example, the device displays an additional pre-fetched content above and below the first sub-portion within the screenshot editing interface. In this example, the additional pre-fetched content is associated with a predefined length in lines or size in pixels. According to some embodiments, the display of the second sub-portion of the content outside of the image area provides a visual cue indicating that the screenshot image may be expanded to include the second sub-portion.

As one example, in FIG. 6D, a second portion 644 of the content associated with the URL 608 (e.g., content that was not displayed within the web browser interface 600 in FIG. 6A) is displayed outside of the image area bounded by the cropping interface elements 632. As another example, in FIG. 6J, a second portion 6114 of the messaging content associated with messages 6102I, 6102J, and 6102K (e.g., content that was not displayed within the messaging interface 610 in FIG. 6H) is displayed outside of the image area bounded by the cropping interface elements 632.

While displaying the screenshot editing interface, the device detects (810), via the one or more input devices, an expansion input that corresponds to expanding the screenshot image in one or more dimensions. As one example, in FIG. 6D, the device 100 detects an expansion input in a downward direction from a bottom edge of the screenshot image 640 with a contact 636 (e.g., a tap-and-drag gesture). As another example, in FIG. 6J, the device 100 detects an expansion input in an upward direction from a top edge of the screenshot image 6110 with a contact 6122 (e.g., a tap-and-drag gesture).

In some embodiments, the expansion input corresponds to (812) a vertical expansion of the screenshot image in order to expand a vertical dimension of the screenshot image. As one example, FIGS. 6D-6E show a sequence in which an expansion input expands the screenshot image 640 vertically to include both the first portion 642 and the second portion 644 within the image area bounded by cropping interface elements 632. As another example, FIGS. 6J-6L show a sequence in which an expansion input expands the screenshot image 6110 vertically to include both the first portion 6112 and the second portion 6114 within the image area bounded by cropping interface elements 632.

In some embodiments, the expansion input corresponds to (814) a horizontal expansion of the screenshot image in order to expand a horizontal dimension of the screenshot image. As one example, a screenshot image associated with a spreadsheet interface has the option be expanded in a horizontal direction to include additional columns or in a vertical direction to include additional rows in response to a user input.

In some embodiments, the expansion input corresponds to (816) a diagonal expansion of the screenshot image in order to expand two dimensions of the screenshot image. As one example, a screenshot image associated with a spreadsheet interface has the option to be expanded in a diagonal direction to include additional columns and additional rows in response to a user input.

In response to detecting the expansion input, the device modifies (818) the screenshot image by displaying a second sub-portion of the content within the image area in addition to the first sub-portion of the content (e.g., appended or prepended to the first sub-portion of the content), where the second sub-portion of the content was not displayed within the application interface before detecting the screenshot capture input. According to some embodiments, the ability to expand screenshot images within the screenshot editing interface provides a seamless user experience that requires less time and user inputs, which, additionally, reduces power usage and improves battery life of the device by enabling the user to use the device more quickly and efficiently.

As one example, FIGS. 6D-6E show a sequence in which an expansion input expands the screenshot image 640 to include both the first portion 642 and the second portion 644 within the image area bounded by cropping interface elements 632. In this example, prior to detecting the expansion input, the device 100 did not display the second portion 644 within the web browser interface 600 in FIG. 6A. As another example, FIGS. 6J-6L show a sequence in which an expansion input expands the screenshot image 6110 to include both the first portion 6112 and the second portion 6114 within the image area bounded by cropping interface elements 632. In this example, prior to detecting the expansion input, the device 100 did not display the second portion 6114 within the messaging interface 610 in FIG. 6H.

In some embodiments, in response to detecting the expansion input, the device stores (820) the modified screenshot image that includes the first and second sub-portions of the content in an image storage repository that is accessible via the device in addition to the screenshot image that includes the first sub-portion of the content. For example, the device stores the modified screenshot image in the image storage repository such as the camera roll or image/media content library. In some embodiments, at least one dimension of the modified screenshot image is larger than a corresponding dimension of the display (e.g., the modified screenshot image has a height or width that is larger than the height or width of the display). According to some embodiments, the saving/storing the expanded/modified screenshot image provides a seamless user experience that requires less time and user inputs, which, additionally, reduces power usage and improves battery life of the device by enabling the user to use the device more quickly and efficiently.

As one example, FIGS. 6D-6E show a sequence in which an expansion input expands the screenshot image 640 to include both the first portion 642 and the second portion 644 within the image area bounded by cropping interface elements 632. In this example, the device 100 stores/saves the expanded screenshot image 640 that includes the first portion 642 and the second portion 644 in FIG. 6E in the camera roll or image/media content library in addition to the unexpanded screenshot image that includes the first portion 642 in FIG. 6D.

In some embodiments, the second sub-portion is determined (822) based on a direction of the expansion input. In some embodiments, the second sub-portion corresponds to content proximate to the first sub-portion based on the directionality of the expansion input. For example, in accordance with a determination that the expansion input indicates a first direction of expansion, the second sub-portion is a sub-portion of the content that precedes the first sub-portion. In another example, in accordance with a determination that the expansion input indicates a second direction of expansion, the second sub-portion is a sub-portion of the content that follows the first sub-portion. According to some embodiments, the ability to expand screenshot images based on the directionality of the expansion input provides a seamless user experience that requires less time and user inputs when expanding screenshot images within the screenshot editing interface, which, additionally, reduces power usage and improves battery life of the device by enabling the user to use the device more quickly and efficiently.

In some embodiments, a size of the second sub-portion is determined (824) based on a magnitude of the expansion input. In some embodiments, the second sub-portion corresponds to content proximate to the first sub-portion based on the magnitude of the expansion input. For example, in accordance with a determination that the expansion input has a first magnitude, the second sub-portion has a first size. In another example, in accordance with a determination that the expansion input has a second magnitude that is greater than the first magnitude, the second sub-portion has a second size that is greater than the first size). In some embodiments, the magnitude is based on the duration of the input. In some embodiments, the magnitude is based on a distance of movement of the input. In some embodiments, the magnitude is based on a speed of movement of the input. According to some embodiments, the ability to expand screenshot images based on the magnitude of the expansion input provides a seamless user experience that requires less time and user inputs when expanding screenshot images within the screenshot editing interface, which, additionally, reduces power usage and improves battery life of the device by enabling the user to use the device more quickly and efficiently.

In some embodiments, modifying the screenshot image includes (826) scrolling at least a portion of the image area in order to maintain a dimension of the screenshot image. For example, if the screenshot image is expanded vertically, the device maintains the width dimension of the screenshot image and scrolls a portion of the first sub-portion off of the display area. According to some embodiments, scrolling the expanded/modified screenshot image to maintain one or more dimension of the screenshot image provides a seamless and intuitive user experience when expanding screenshot images within the screenshot editing interface, which, additionally, reduces power usage and improves battery life of the device by enabling the user to use the device more quickly and efficiently.

As one example, FIGS. 6D-6E show a sequence in which an expansion input expands the screenshot image 640 to include both the first portion 642 and the second portion 644 within the image area bounded by cropping interface elements 632. In this example, in FIG. 6E, the screenshot editing interface 620 includes a "scroll to see more" indicator 648 to alert the user than a portion of the screenshot image has been scrolled and may be viewed in response to detecting a scroll input within the screenshot interface 620 (e.g., a voice command, or an upward or downward swipe gesture over the screenshot image 640). As shown in FIG. 6E, the dimensions of the screenshot image 640 are maintained between FIGS. 6D and 6E. As such, the device appends the second portion 644 of the content associated with the URL 608 to the first portion 642 of the content associated with the URL 608 and scrolls the screenshot image.

In some embodiments, modifying the screenshot image includes (828) shrinking the screenshot image in order to concurrently display the first and second sub-portions of the content within the image area. For example, if the screenshot image is expanded vertically, the device shrinks the first and second sub-portions so that the first sub-portion and the second sub-portion are concurrently displayed within the screenshot editing interface. According to some embodiments, shrinking the screenshot image to display the entirety of the expanded/modified screenshot image provides a seamless and intuitive user experience when expanding screenshot images within the screenshot editing interface, which, additionally, reduces power usage and improves battery life of the device by enabling the user to use the device more quickly and efficiently.

As another example, FIGS. 6J-6L show a sequence in which an expansion input expands the screenshot image 6110 to include both the first portion 6112 and the second portion 6114 within the image area bounded by cropping interface elements 632. In this example, in FIG. 6L, the device 100 shrinks the dimensions of the screenshot image 6110 between FIGS. 6J-6L to display the entirety of the expanded screenshot image.

In some embodiments, the second sub-portion of the content is rendered (830) by an application associated with the content and subsequently displayed within the screenshot editing interface. In some embodiments, the device 100 pre-fetches one or more additional sub-portions of the content for display within the screenshot editing interface. As one example, with reference to FIG. 6D, the second portion 644 of the content associated with the URL 608 is pre-fetched by the web browser application. As another example, with reference to FIG. 6J, the second portion 6114 of the messaging content associated with messages 6102I, 6102J, and 6102K is pre-fetched by the messaging application.

In some embodiments, the device (832): detects, via the one or more input devices, a subsequent expansion input that corresponds to expanding the screenshot image in one or more dimensions; and, in response to detecting the subsequent expansion input, modifies the screenshot image by displaying a third sub-portion of the content within the image area in addition to the first and second sub-portions of the content (e.g., appended or prepended to the first sub-portion of the content), where the third sub-portion of the content was not displayed before detecting the screenshot capture input. According to some embodiments, the ability to further expand screenshot images within the screenshot editing interface provides a seamless user experience that requires less time and user inputs, which, additionally, reduces power usage and improves battery life of the device by enabling the user to use the device more quickly and efficiently.

As one example, with reference to FIG. 6E, in response to detecting a subsequent expansion input in a downward direction from the bottom edge of the screenshot image 640, the device 100 would expand the screenshot image to include the third portion 646 (or at least a portion thereof) within the image area bounded by cropping interface elements 632 in addition to the first portion 642 and the second portion 644.

It should be understood that the particular order in which the operations in FIGS. 8A-8C have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 700) are also applicable in an analogous manner to method 800 described above with respect to FIGS. 8A-8C. For example, the screenshot capture inputs and expansion inputs described above with reference to method 800 optionally have one or more of the characteristics of the screenshot capture inputs and expansion inputs described herein with reference to other methods described herein (e.g., the method 700). For brevity, these details are not repeated here.

The operations in the information processing methods described above are, optionally, implemented by running one or more functional modules in an information processing apparatus such as general purpose processors (e.g., as described with respect to FIGS. 1A, 3, and 5A) or application specific chips. Further, the operations described above with reference to FIGS. 8A-8C, optionally, implemented by components depicted in FIGS. 1A-1B. For example, the screenshot capture inputs and expansion inputs are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
   at a device with one or more processors, non-transitory memory, a touch-sensitive display, and one or more input devices:
   while displaying content on the touch-sensitive display, detecting, via the one or more input devices, a screenshot capture input;
   in response to detecting the screenshot capture input:
   capturing a screenshot image of the content displayed on the touch-sensitive display; and
   displaying, on the touch-sensitive display, a thumbnail representation of the screenshot image overlaid on the content displayed on the touch-sensitive display and captured within the screenshot image;
   detecting, via the one or more input devices, a respective input directed to the thumbnail representation of the screenshot image; and
   in response to detecting the respective input directed to the thumbnail representation of the screenshot image, and in accordance with a determination that the respective input corresponds to a tap input:
   displaying, on the touch-sensitive display, a screenshot editing interface provided to edit the screenshot image, wherein the screenshot editing interface includes the screenshot image; and
   while displaying the screenshot image in the screenshot editing user interface, concurrently displaying, on the touch-sensitive display, a plurality of screenshot annotation tools with the screenshot image, wherein the plurality of screenshot annotation tools include a first screenshot annotation tool for annotating the screenshot in a first manner and a second screenshot annotation tool for annotating the screenshot in a second manner that is different from the first manner.

2. The method of claim 1, further comprising:
in response to detecting the respective input directed to the thumbnail representation of the screenshot image, and in accordance with a determination that the respective input corresponds to a swipe input, ceasing to display, on the touch-sensitive display, the thumbnail representation of the screenshot image overlaid on the content displayed on the touch-sensitive display.

3. The method of claim 1, further comprising:
after handling the screenshot image, detecting, via the one or more input devices, a subsequent screenshot capture input;
in response to detecting the subsequent screenshot capture input:
  capturing a second screenshot image of the content displayed on the touch-sensitive display; and
  displaying, on the touch-sensitive display, a second thumbnail representation of the second screenshot image overlaid on the content displayed on the touch-sensitive display and captured within the screenshot image; and
  in accordance with a determination that a timeout period has expired, ceasing to display the second thumbnail representation of the second screenshot image overlaid on the content displayed on the touch-sensitive display.

4. The method of claim 1, further comprising, in response to detecting the screenshot capture input, placing the screenshot image in an image storage repository that is accessible via the device.

5. The method of claim 1, wherein the screenshot editing interface includes at least one of a deletion affordance provided to delete the screenshot image, a done affordance provided to save the screenshot image, a sharing affordance provided to share the screenshot image, a markup affordance provided to enable annotations to be applied to the screenshot image, and one or more cropping interface elements provided to crop the screenshot image.

6. The method of claim 5, further comprising:
detecting, via the one or more input devices, a first input that corresponds to selection of the deletion affordance; and
in response to the selection of the deletion affordance:
  replacing display of the screenshot editing interface with the content displayed on the touch-sensitive display prior to displaying the screenshot editing interface; and
  deleting the screenshot image from an image storage repository that is accessible via the device.

7. The method of claim 5, further comprising:
detecting, via the one or more input devices, a second input that corresponds to selection of the done affordance; and
in response to the selection of the done affordance:
  replacing display of the screenshot editing interface with the content displayed on the touch-sensitive display prior to displaying the screenshot editing interface; and
  in accordance with a determination that the screenshot image was modified within the screenshot editing interface, storing a modified screenshot image that corresponds to the screenshot image as modified within the screenshot editing interface in addition to the screenshot image in an image storage repository that is accessible via the device.

8. The method of claim 5, further comprising:
detecting, via the one or more input devices, a request to share the screenshot image; and
in response to detecting the request to share the screenshot image, displaying, on the touch-sensitive display, a sharing interface associated with an application by which to share the screenshot image, wherein the sharing interface includes the screenshot image and metadata associated with the screenshot image.

9. The method of claim 5, further comprising:
detecting, via the one or more input devices, a third input that corresponds to selection of the markup affordance;
in response to the selection of the markup affordance, entering an annotation mode of operation for the screenshot image; and
in response to detecting a sequence of user inputs while in the annotation mode of operation for the screenshot image, displaying, on the touch-sensitive display, annotations to the screenshot image based on the sequence of user inputs and a respective markup tool.

10. The method of claim 5, further comprising, in response to detecting a sequence of user inputs, via the one or more input devices, that correspond to annotating the screenshot image, displaying, on the touch-sensitive display, annotations to the screenshot image based on the sequence of user inputs.

11. The method of claim 5, further comprising:
detecting, via the one or more input devices, a cropping input associated with the one or more cropping interface elements that correspond to removing a portion of the screenshot image; and
in response to detecting the cropping input, displaying, on the touch-sensitive display, a modified screenshot image within the screenshot editing interface based on the cropping input, wherein at least one portion of the screenshot image has been removed from the modified screenshot image.

12. The method of claim 5, further comprising:
identifying one or more content regions and one or more non-content regions within the screenshot image;
detecting, via the one or more input devices, a cropping input associated with the one or more cropping interface elements that correspond to removing a portion of the screenshot image; and
in response to detecting the cropping input, displaying, on the touch-sensitive display, a modified screenshot image within the screenshot editing interface based on the cropping input and the one or more content regions, wherein at least one portion of the screenshot image has been removed from the modified screenshot image in order to exclude at least one of the one or more non-content regions.

13. The method of claim 5, further comprising:
identifying a first region associated with a first application and a second region associated with a second application within the screenshot image;
detecting, via the one or more input devices, a cropping input associated with the cropping interface elements that correspond to removing a portion of the screenshot image; and
in response to detecting the cropping input, displaying, on the touch-sensitive display, a modified screenshot image within the screenshot editing interface based on the cropping input and the first and second regions, wherein at least one portion of the screenshot image has been removed from the modified screenshot image in order to exclude one of the first region or the second region.

14. The method of claim 1, further comprising:
prior to detecting the respective input directed to the thumbnail representation of the screenshot image, detecting, via the one or more input devices, a subsequent screenshot capture input; and
in response to detecting the subsequent screenshot capture input:
   capturing a second screenshot image of content displayed on the touch-sensitive display; and
   displaying, on the touch-sensitive display, a group of thumbnail representations that represents a first thumbnail representation corresponding to the screenshot image and the second thumbnail representation corresponding to the second screenshot image.

15. The method of claim 14, wherein the respective input is directed to the group of thumbnail representations, and wherein the screenshot editing interface includes the second screenshot image.

16. The method of claim 15, further comprising:
detecting, via the one or more input devices, a navigation input that corresponds to navigating among screenshot images in the screenshot editing interface; and
in response to detecting the navigation input, updating the screenshot editing interface by displaying the screenshot image.

17. The method of claim 1, wherein displaying the thumbnail representation includes displaying a predefined animation.

18. The method of claim 1, wherein the thumbnail representation of the screenshot image is displayed at a location overlaid on the content that satisfies an occlusion criterion.

19. An electronic device comprising:
a touch-sensitive display;
one or more input devices;
one or more processors;
non-transitory memory; and
one or more programs, wherein the one or more programs are stored in the non-transitory memory and configured to be executed by the one or more processors, the one or more programs including instructions for:
   while displaying content on the touch-sensitive display, detecting, via the one or more input devices, a screenshot capture input;
   in response to detecting the screenshot capture input:
      capturing a screenshot image of the content displayed on the touch-sensitive display; and
      displaying, on the touch-sensitive display, a thumbnail representation of the screenshot image overlaid on the content displayed on the touch-sensitive display and captured within the screenshot image;
   detecting, via the one or more input devices, a respective input directed to the thumbnail representation of the screenshot image; and
   in response to detecting the respective input directed to the thumbnail representation of the screenshot image, and in accordance with a determination that the respective input corresponds to a tap input:
      displaying, on the touch-sensitive display, a screenshot editing interface provided to edit the screenshot image, wherein the screenshot editing interface includes the screenshot image; and
      while displaying the screenshot image in the screenshot editing user interface, concurrently displaying, on the touch-sensitive display, a plurality of screenshot annotation tools with the screenshot image, wherein the plurality of screenshot annotation tools include a first screenshot annotation tool for annotating the screenshot in a first manner and a second screenshot annotation tool for annotating the screenshot in a second manner that is different from the first manner.

20. A non-transitory computer readable storage medium storing one or more programs, the one or more programs comprising instructions, which, when executed by an electronic device with a touch-sensitive display and one or more input devices, cause the electronic device to:
while displaying content on the touch-sensitive display, detect, via the one or more input devices, a screenshot capture input;
in response to detecting the screenshot capture input:
   capture a screenshot image of the content displayed on the touch-sensitive display; and
   display, on the touch-sensitive display, a thumbnail representation of the screenshot image overlaid on the content displayed on the touch-sensitive display and captured within the screenshot image;
detect, via the one or more input devices, a respective input directed to the thumbnail representation of the screenshot image; and
in response to detecting the respective input directed to the thumbnail representation of the screenshot image, and in accordance with a determination that the respective input corresponds to a tap input:
   display, on the touch-sensitive display, a screenshot editing interface provided to edit the screenshot image, wherein the screenshot editing interface includes the screenshot image; and
   while displaying the screenshot image in the screenshot editing user interface, concurrently display, on the touch-sensitive display, a plurality of screenshot annotation tools with the screenshot image, wherein the plurality of screenshot annotation tools include a first screenshot annotation tool for annotating the screenshot in a first manner and a second screenshot annotation tool for annotating the screenshot in a second manner that is different from the first manner.

* * * * *